(12) United States Patent
Ando et al.

(10) Patent No.: US 9,911,459 B2
(45) Date of Patent: Mar. 6, 2018

(54) INFORMATION PROCESSING DEVICE AND METHOD, RECORDING MEDIUM, AND PROGRAM

(71) Applicant: SONY CORPORATION, Tokyo (JP)

(72) Inventors: Hideki Ando, Tokyo (JP); Junichi Horigome, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/319,285

(22) PCT Filed: Aug. 6, 2015

(86) PCT No.: PCT/JP2015/072320
§ 371 (c)(1),
(2) Date: Dec. 15, 2016

(87) PCT Pub. No.: WO2016/027681
PCT Pub. Date: Feb. 25, 2016

(65) Prior Publication Data
US 2017/0154650 A1  Jun. 1, 2017

(30) Foreign Application Priority Data

Aug. 19, 2014 (JP) .................................. 2014-166559

(51) Int. Cl.
*G11B 7/24* (2013.01)
*G11B 20/12* (2006.01)
*G11B 7/0045* (2006.01)

(52) U.S. Cl.
CPC ........ *G11B 20/1217* (2013.01); *G11B 7/0045* (2013.01); *G11B 2020/1232* (2013.01)

(58) Field of Classification Search
CPC . G11B 2220/216; G11B 27/24; G11B 7/0053; G11B 2220/20; G11B 20/1883;
(Continued)

(56) References Cited

U.S. PATENT DOCUMENTS 5,854,778 A * 12/1998 Shimizu ................ G06F 3/0601
369/275.3
8,760,983 B2   6/2014 Suzuki et al.
(Continued)

FOREIGN PATENT DOCUMENTS

JP   2004-342204   12/2004
JP   2008-305510   12/2008
(Continued)

*Primary Examiner* — Nabil Hindi
(74) *Attorney, Agent, or Firm* — Paratus Law Group, PLLC

(57) ABSTRACT

The present technology relates to an information processing device and method, a recording medium, and a program, which can improve a data transfer speed. In the recording medium, a recording area is divided into a plurality of simulated zones and a set of the plurality of simulated zones composes a simulated zone group. Then, an address is set to each area in the simulated zones so that the addresses are interleaved between the simulated zones composing the simulated zone group. By interleaving the addresses between the simulated zones in this manner, a local seek operation or a rotational delay can be reduced and the data transfer speed can be improved when recording or reproducing data to the recording medium in more than one channel at the same time. The present technology can be applied to an optical disk.

20 Claims, 32 Drawing Sheets

(58) Field of Classification Search
CPC .............. G11B 7/0956; G11B 7/00745; G11B 27/3027; G11B 7/243
USPC ..... 369/94, 47.1, 47, 27, 53.2, 53.14, 274.2, 369/275.3, 30.25
See application file for complete search history.

(56) References Cited

U.S. PATENT DOCUMENTS

2004/0268034 A1\* 12/2004 Lim ..................... G11B 19/04
711/112
2005/0154818 A1\* 7/2005 Chen ................... G06F 12/0246
711/103

FOREIGN PATENT DOCUMENTS

JP   2010-049793   3/2010
WO  WO2012-147267  11/2012

\* cited by examiner

INFORMATION PROCESSING DEVICE AND METHOD, RECORDING MEDIUM, AND PROGRAM

CROSS REFERENCE TO PRIOR APPLICATION

This application is a National Stage Patent Application of PCT International Patent Application No. PCT/JP2015/072320 (filed on Aug. 6, 2015) under 35 U.S.C. § 371, which claims priority to Japanese Patent Application No. 2014-166559 (filed on Aug. 19, 2014), which are all hereby incorporated by reference in their entirety.

TECHNICAL FIELD

The present technology relates to an information processing device and method, a recording medium, and a program and, more particularly, relates to an information processing device and method, a recording medium, and a program that improve a data transfer speed.

BACKGROUND ART

Conventionally, as a write-once optical recording medium to and from which signals are recorded or reproduced by emitting light, for example, an optical disk recording medium (hereinafter, simply referred to as an optical disk) such as a Blu-ray Disc (BD, registered trademark) is widely used (for example, see Patent Document 1).

When data is recorded or reproduced with such an optical disk, there is a technique, which is called striping, for recording or reproducing in more than one channel. In striping, data is read from a plurality of different areas on the optical disk at the same time or data is recorded to those plurality areas at the same time.

CITATION LIST

Patent Document

Patent Document 1: Japanese Patent Application Laid-Open No. 2010-49793

SUMMARY OF THE INVENTION

Problems to be Solved by the Invention

Here, conventionally, in an optical disk, addresses are sequentially allocated to sequential recording areas. Thus, when recording or reproducing is performed in more than one channel in the optical disk, the striping efficiency is reduced and this results in a reduction of the data transfer efficiency.

More specifically, for example, in a case that data of each channel is recorded alternately in a small unit of recording in sequential recording areas, the data transfer speed is reduced since, when the data is read, a local seek and a rotational delay frequently occur to access a target area.

Further, for example, when the data is divided into a large unit for striping, that is, in a large stripe length, if the size of the recording target data is small, striping is not performed in some parts or striping is not performed at all when the data is recorded or read. This reduces the data transfer speed.

The present technology has been made in view of the above and can improve the data transfer speed.

Solutions to Problems

In a recording medium according to a first aspect of the present technology, sequential recording areas are divided into a plurality of simulated zones in a predetermined size, and addresses are set to the respective areas of the simulated zones so that a set of the plurality of simulated zones composes a simulated zone group and the addresses are interleaved between the plurality of simulated zones composing the simulated zone group.

The addresses may be logical addresses, and sequential physical addresses may be set to sequential areas in the recording area.

A block, which is a smallest unit of recording or reproducing in the simulated zone, may include a plurality of sectors, which is a smallest unit of a logical access, and the sequential addresses may be set to the sequential sectors in the block.

The recording medium may record, as management information, at least one of information for specifying an area to be set as a simulated zone, information for specifying a size of the simulated zone, information for specifying a number of simulated zones composing the simulated zone group, and information for specifying the address of each area in the simulated zones composing the simulated zone group.

The recording medium may be an optical disk.

The optical disk may have two faces, and on each face, one or more recording layers including the recording areas are provided.

The recording area may include a user data area for recording user data and a variable area which is different from the user data area and is variable in its size.

The variable area may be at least one of areas of an extended management area for recording management information to manage the recording area and an alternation area used as an alternative of a defective area.

A size of the variable area may be an integral multiple of the size of the simulated zones.

According to a first aspect of the present technology, sequential recording areas are divided into a plurality of simulated zones in a predetermined size, a set of the plurality of simulated zones composes a simulated zone group, and addresses are set to the respective areas of the simulated zones so that the addresses are interleaved between the plurality of simulated zones composing the simulated zone group.

According to a second aspect of the present technology, the information processing device includes a plurality of access processing units configured to record or reproduce data by performing an access control of a recording medium in which sequential recording areas are divided into a plurality of simulated zones in a predetermined size, a set of the plurality of simulated zones composes a simulated zone group, and addresses are set to the respective areas of the simulated zones so that the addresses are interleaved between the plurality of simulated zones composing the simulated zone group, and a control unit configured to control the plurality of access processing units so that the accesses to the recording medium is performed at the same time on the basis of controls by the plurality of access processing units.

It may be made that the addresses are logical addresses and sequential physical addresses are set to sequential areas in the recording areas.

A block, which is a smallest unit of recording or reproducing in the simulated zones, may include a plurality of sectors, which is a smallest unit of a logical access, and the sequential addresses are set to the sequential sectors in the block.

The recording medium may record, as management information, at least one of information for specifying an area as a target for setting simulated zones, information for specifying a size of the simulated zone, information for specifying a number of simulated zones composing the simulated zone group, and information for specifying the address of each area in the simulated zones composing the simulated zone group.

The recording medium may be an optical disk.

A number of the access processing units that perform an access control to the recording medium at the same time may be an integral multiple of the number of the simulated zones composing the simulated zone group.

A number of the access processing units that perform an access control to the recording medium at the same time may be a divisor of the number of the simulated zones composing the simulated zone group.

The control unit may control the plurality of access processing units so that, while some of the plurality of access processing units record data to the recording medium at the same time, other of the plurality of access processing units reproduce data recorded in the recording medium at the same time.

The number of the access processing units that record data at the same time, may be same as the number of the access processing units that reproduce data at the same time.

An information processing method according to a second aspect of the present technology includes the steps of: by a plurality of access processing units, recording or reproducing data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and controlling the plurality of the access processing units so that accesses to the recording medium according to the control by the plurality of access processing units are performed at the same time.

According to the second aspect of the present technology, the access processing unit is configured to record or reproduce data by performing an access control of a recording medium in which sequential recording areas are divided into a plurality of simulated zones in a predetermined size, a set of the plurality of simulated zones composes a simulated zone group, and addresses are set to the respective areas of the simulated zones so that the addresses are interleaved between the plurality of simulated zones composing the simulated zone group, and the plurality of access processing units are controlled so that accesses to the recording medium are performed at the same time on the basis of controls by the plurality of the access processing units.

Effects of the Invention

According to the first and second aspects of the present technology, a data transfer speed can be improved.

Here, the effect described here does not always set any limitation and any of the effects described in this specification may be obtained.

MODE FOR CARRYING OUT THE INVENTION

Hereinafter, an embodiment of an application of the present technology will be described with reference to the drawings.

First Embodiment

<Optical Disk and Striping>
Firstly, an outline of the present technology will be described.

The present technology relates to a recording medium to and from which data is recorded and read and a recording/reproducing device for recording or reproducing data to and from the recording medium. Here, the recording medium as a subject which data is written to and read from in the present technology may be any type of recording medium and, in the following, the explanation will be given on an assumption that the recording medium is an optical disk.

Figure 1:
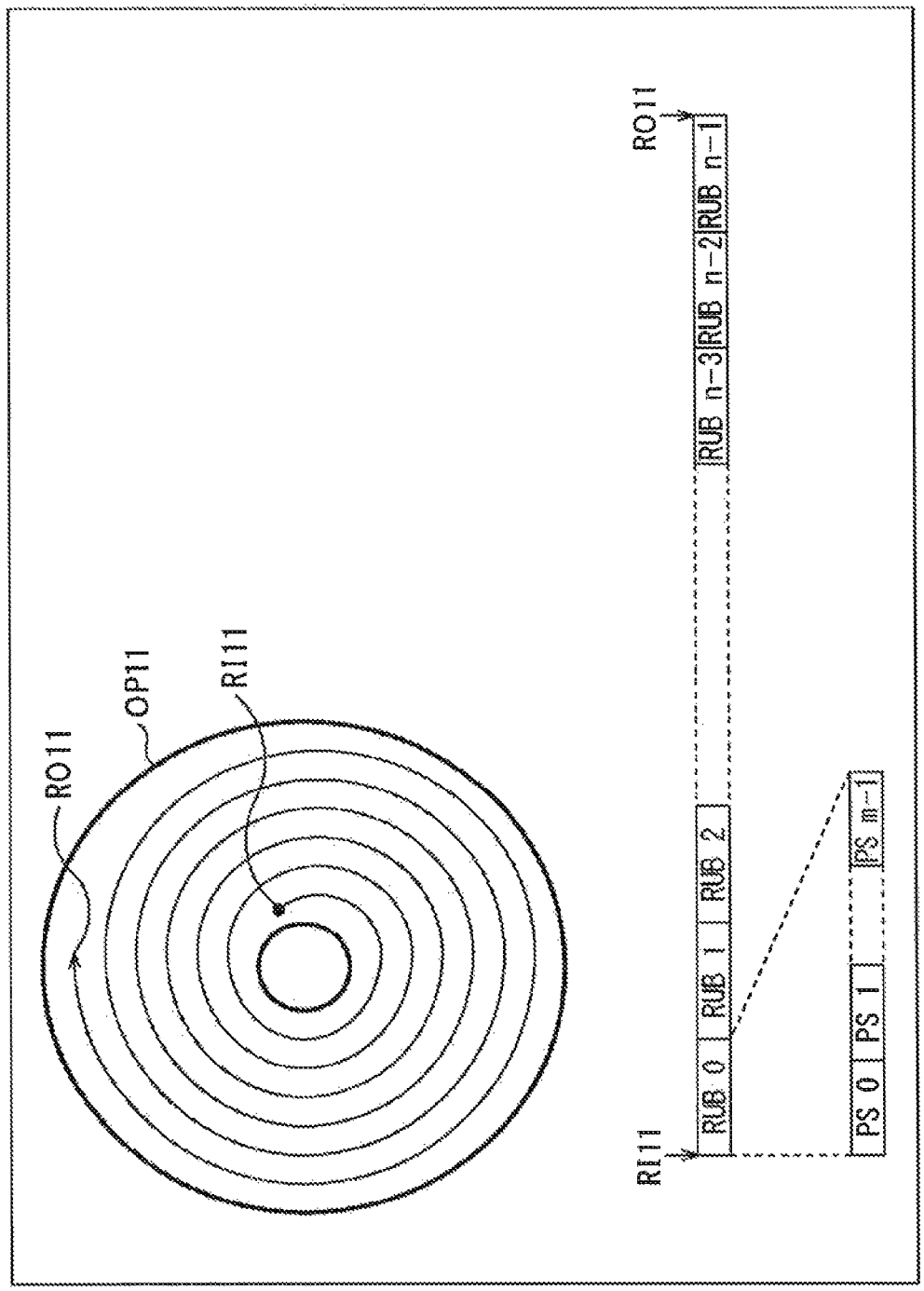
FIG. 1 is a diagram for explaining an optical disk.

For example, as illustrated in FIG. 1, a general optical disk has a spiral-shaped area (a spiral). In this example, an optical disk OP11 has a spiral from an innermost recording position RI11 near the center of the optical disk OP11 to an outermost recording position RO11 in the outer periphery of the optical disk OP11 and this spiral is a data recording area. For example, the spiral is provided on a land or a groove or on both of the land and groove of the optical disk OP11 and, when the optical disk OP11 has a plurality of recording layers, the spiral is provided to the respective recording layers.

Further, the spiral between the innermost recording position RI11 and the outermost recording position RO11 is divided into a predetermined size of recording unit blocks (RUB).

The RUB is a minimum unit of data recording or reproducing on the optical disk OP11 and an area (block) in a size of one RUB is also referred to as a cluster. In the following, an area in a size of one recording unit blocks (RUB) is simply referred to as RUB.

In general, in each recording layer of the optical disk OP11, data is recorded in a certain direction from the inner periphery side to the outer periphery side or from the outer periphery side to the inner periphery side so that the position in radius simply increases or reduces. Here, more specifically, the direction of the use of the spiral is one direction even though the spiral may be used from a midstream or recording may end in a midstream of the spiral.

When the spiral used as a recording area in this manner is extended, the spiral becomes as illustrated in the lower part of the drawing. In other words, the spiral is composed of a plurality of RUBs arranged in series from the innermost recording position RI11 to the outermost recording position RO11.

In this example, the rectangles in which letters of RUB N (here, N=0, 1, ..., n−1) represent one RUB and the spiral is composed of "n" number of RUBs. Further, recording or reproducing to or from the optical disk OP11 is executed in a unit of RUB. For example, in a case of a BD, one RUB is an area of 65536 bytes.

Each RUB is composed of a plurality of physical sectors. One physical sector corresponds to one logical sector which is a minimum unit of a logical access in data recording or reproducing to the optical disk OP11.

In this example, the rectangles in which letters of PS M (here, M=0, 1, ..., m−1) represent one physical sector and one RUB is composed of m number of serial physical sectors. For example, in a case of a BD, one RUB is composed of a 32 physical sectors and one physical sector is an area of 2048 bytes.

Further, in the optical disk OP11, physical sector numbers (PSN), which are physical addresses, are respectively allocated in a unit of physical sector and the PSNs are allocated in serial order in a direction from the inner periphery side to the outer periphery side or in a direction from the outer periphery side to the inner periphery side in the recording layer.

Figure 2:
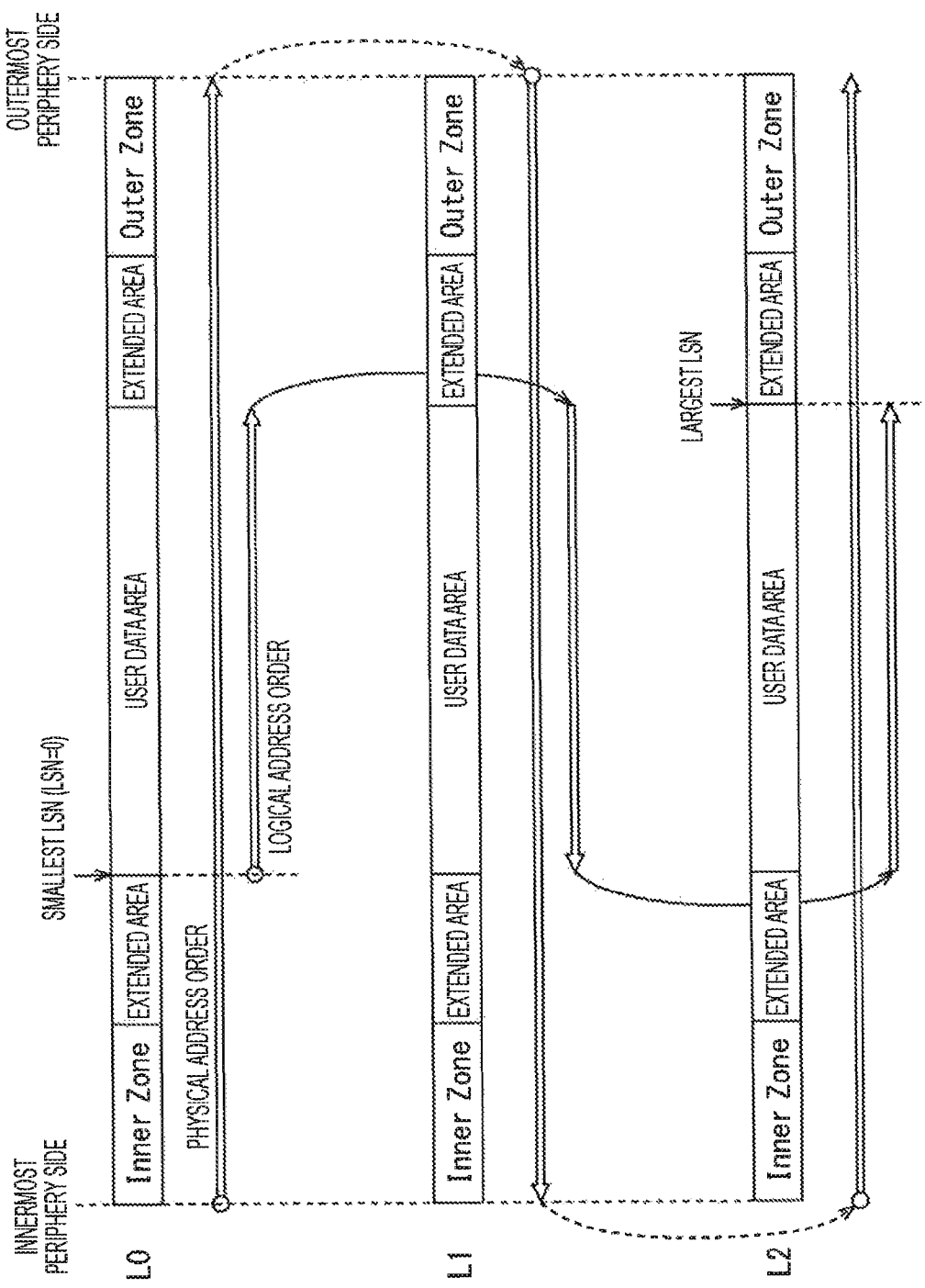
FIG. 2 is a diagram for explaining physical addresses and logical addresses of the optical disk.

Further, for example, as illustrated in FIG. 2, it is assumed that the optical disk OP11 includes, as recording layers, three layers of L0 layer to L2 layer. In this example, in the drawing of the rectangles representing the respective recording layers, the left end represents an end of the inner periphery side, which is a position corresponding to the above described innermost recording position RI11, and, in the drawing of the rectangles representing the respective recording layers, the right end represents an end of the outer periphery side, which is a position corresponding to the above described outermost recording position RO11.

In the recording area of each recording layer, there are an inner zone indicated by the letters "Inner Zone," an extended area, a user data area, an extended area, and an outer zone indicated by the letters "Outer Zone" in order from the inner periphery side to the outer periphery side.

Here, the extended area is, for example, an extended management area or an area to which a spare area as an alternation area is set, and the user data area is an area to which data that a user instructs to record is recorded. For example, to the extended management area, management information used to manage the user data area and spare area is recorded.

When there are a plurality of recording layers in the optical disk OP11, serial PSNs are allocated to serial areas in each recording layer. In this example, serial PSNs are allocated to the respective physical sectors which are arranged in a row from the innermost recording position RI11 to the outermost recording position RO11 in the L0 layer.

Similarly, serial PSNs are allocated to the respective physical sectors arranged in a row from the outermost recording position RO11 to the innermost recording position RI11 in the L1 layer, and serial PSNs are allocated to the respective physical sectors arranged in a row from the innermost recording position RI11 to the outermost recording position RO11 in the L2 layer. Here, the PSNs are not continuous between the respective recording layers.

Further, in the optical disk OP11 illustrated in FIG. 2, the user data area is defined in each recording layer and, to the user data area, serial logical sector numbers (LSN), which are logical addresses, are allocated though the user data areas in all recording layers.

In other words, the correspondence relationship between the PSNs and the LSNs is defined so that the LSNs in the optical disk OP11 become continuous. In this case, in the user data area, the logical sectors and the physical sectors correspond to each other on a one-to-one basis and serial numbers starting with 0 are allocated to the respective logical sectors as LSNs.

In this example, the position at the left end of the user data area in the L0 layer in the drawing is set as LSN=0 and, from the position of LSN=0, serial LSNs are allocated to the user data area in the L0 layer so that the LSN becomes larger as proceeding rightward in the drawing up to the position at the right end of the user data area in the L0 layer in the drawing.

Then, the LSN of the position at the right end of the user data area in the L1 layer in the drawing is continuous with the LSN at the right end of the user data area in the L0 layer in the drawing, and serial LSNs are allocated to the user data area in the L1 layer so that the LSN becomes larger as proceeding leftward from the right end to the left end of the user data area in the L1 layer in the drawing.

Similarly, the LSN at the left end of the user data area in the L2 layer in the drawing is continuous with the LSN at the left end of the user data area in the L1 layer in the drawing, and serial LSNs are allocated to the user data area in the L2 layer so that the LSN becomes larger as proceeding rightward from the left end to the right end of the user data area in the L2 layer in the drawing.

As described above, in a general optical disk, PSNs and LSNs are allocated.

When serial RUBs are defined in the user data area of the optical disk in this manner, data specified by the user (hereinafter, also referred to as user data) is recorded and the recorded user data is read from the user data area or the like in a unit of RUB.

When recording and reproducing the user data, the data transfer speed can be improved by performing a striping operation in which recording operation and reproducing operation are performed in more than one channel simultaneously.

For example, there are two optical pickups in the recording/reproducing device that performs recording and reproducing data to and from the optical disk. The recording/reproducing by one of the optical pickups is referred to as recording/reproducing by a channel A, and the recording/reproducing by the other of the optical pickups is referred to as recording/reproducing by a channel B.

Figure 3:
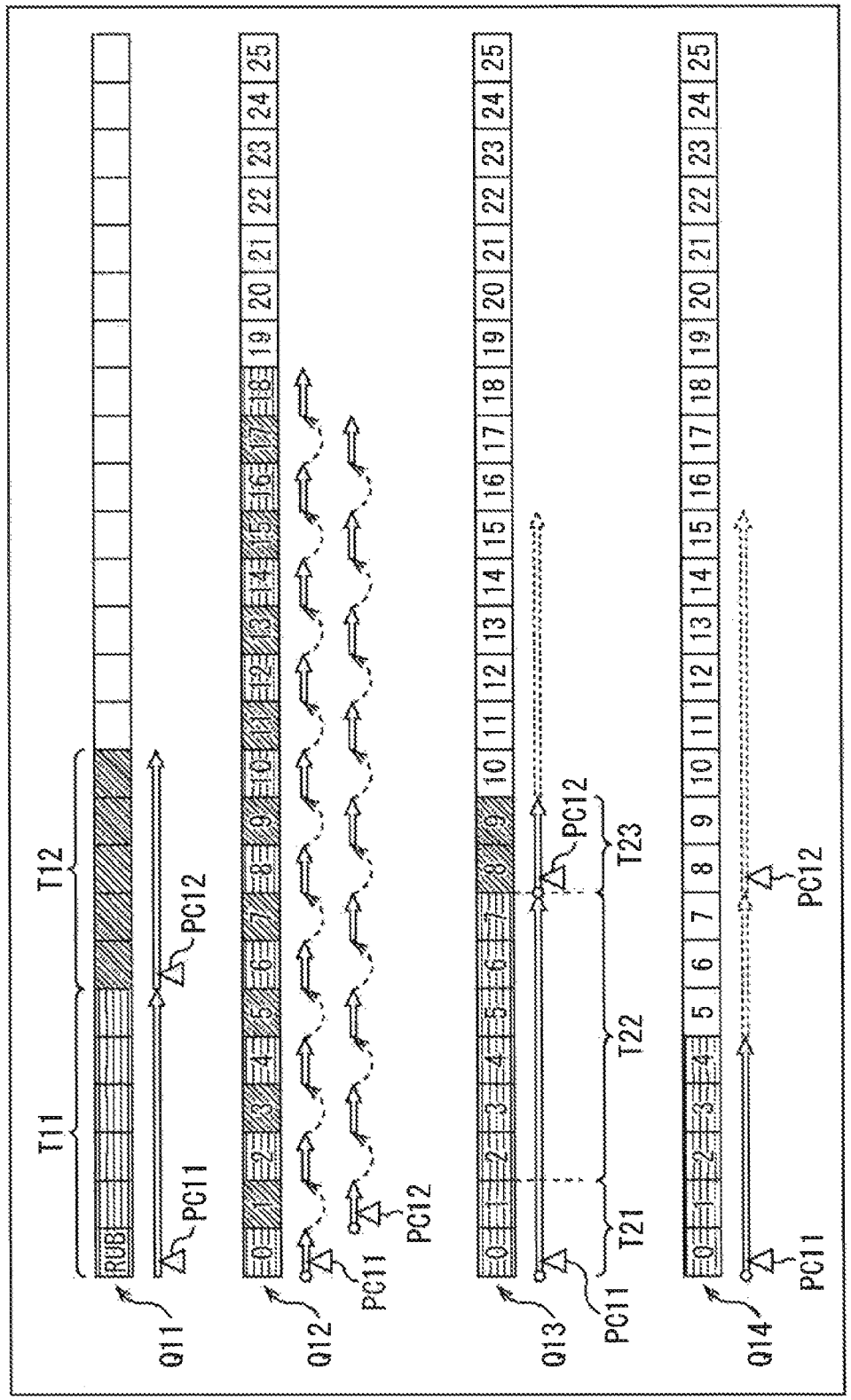
FIG. 3 is a diagram for explaining a striping operation performed in more than one channel.

Here, when it is assumed that the two optical pickups access the same recording layer, as indicated by the arrow Q11 of FIG. 3 for example, the data accesses are performed simultaneously by the optical pickup PC11 of the channel A and the optical pickup PC12 of the channel B.

Here, in FIG. 3, one rectangle represents one RUB composing the user data area, and the numerical letters in the RUBs represent the numbers of the RUBs arranged in a row. In the explanation of FIG. 3, the number of the RUBs is also referred to as a RUB number. Further, in the drawing, the solid arrows represent directions of data accesses, which are directions of data recording and directions of data reading.

In the example indicated by the arrow Q11, two channels access one piece of data. In other words, an optical pickup PC11 accesses an area T11 in the user data area and, at the same time, an optical pickup PC12 accesses an area T12 next to the area T11.

When a series of pieces of data are recorded or reproduced at the same time by a plurality of channels by being shared by the two channels in this manner, the data transfer speed can be improved compared to a case that recording and reproducing are performed by a single channel.

However, when data allocation is performed in a small unit in the striping operation, a local seek or a rotational delay frequently occurs and the data transfer speed cannot be improved.

For example, as indicated by the arrow Q12, when the series of pieces of data is divided in a unit of RUB and allocated to the two of the channels A and B, the data to be reproduced by the channel A and the data to be reproduced by the channel B are alternately arranged in the user data area.

Then, after accessing the RUB of the RUB number 0 as expressed by the solid arrow in the drawing, the optical pickup PC11 performs an seek operation and a rotational delay expressed by the dotted arrow in the drawing and accesses the RUB of the RUB number 2. After that, similarly, the optical pickup PC11 repeats to access the data of one RUB, then perform a seek operation and a rotational delay, and access data of one RUB.

Further, the optical pickup PC12 performs an operation similar to that of the optical pickup PC11 and accesses the data of one RUB respectively. Here, for example, an access to the RUB of RUB number a (here, a=0, 2, 4, . . . ) and an access to the RUB of RUB number a+1 are performed at substantially same time.

In a case that the areas allocated to the same channel are arranged every other RUBs, a seek operation and a rotational delay frequently occur during the data recording and reading, and the data transfer speed cannot be improved.

Further, for example, as indicated by the arrow Q13, when eight RUBs are set as a stripe length and an access to data in an amount of ten RUBs is performed, the part of eight-RUB length starting from the beginning of the data is allocated to the channel A and the rest of the data of two RUBs is allocated to the channel B.

Accordingly, as indicated by the arrow Q13, the optical pickup PC11 accesses from the RUB of the RUB number 0 to the RUB of the RUB number 7 in order and, at the same time, the optical pickup PC12 accesses from the RUB of the RUB number 8 to the RUB of the RUB number 9 in order.

For example, in a case of recording the data, when data to be recorded to the RUB of the RUB number 8 in the recording/reproducing device side is already being transferred from a high-order host computer or the like, recording to the RUB of the RUB number 0 and recording to the RUB of the RUB number 8 can start at substantially same time.

In this case, accesses to the areas T21 and T23 in the user data area are performed at substantially same time. In other words, the striping operation is performed.

On the other hand, while the optical pickup PC11 accesses the area T22, the optical pickup PC12 is in a state with no data to access. In other words, the striping operation is not performed. This is because the access to the data allocated to the channel B completes when the access to the area T23 is finished.

In a case that data is allocated in a large unit, that is, with a large stripe length in this manner, the striping operation is only performed partly when accessing data in a small size, and the data transfer speed cannot be sufficiently improved.

Further, for example, as indicated by the arrow Q14, in a case that eight RUBs are set as a stripe length and data of five RUBs is accessed, the striping operation is not performed at all. In this case, all the data in the five RUBs is allocated to the channel A and there is no data allocated to the channel B.

Accordingly, reading of all the data is performed by the optical pickup PC11 corresponding to the channel A and the striping operation is not performed. In this manner, when the data length is shorter than the stripe length, the striping operation is not performed at all and the data transfer speed cannot be improved.

According to the above description, when the stripe length is set to a proper length with respect to the size of data to be recorded or reproduced, striping is properly performed and this improves the data transfer speed.

However, since the size of the data to be recorded or reproduced differs depending on the data, the stripe length is sometimes too long or too short for each piece of data. Accordingly, like the above described example, the data transfer speed cannot be improved.

Further, when the stripe length is too long, sometimes recording cannot be started by more than one channel at the same time unless the data to be recorded is being buffered in a certain amount in the recording/reproducing device side.

<Simulated Zone and Access Order>

In view of the above, according to the present technology, the data transfer speed is improved by dividing sequential recording areas into small sections composed of a plurality of RUBs, using those small sections as simulated zones, using a plurality of simulated zones as one group, and interleaving the access order (switching the order) among the simulated zones composing the group.

Figure 4:
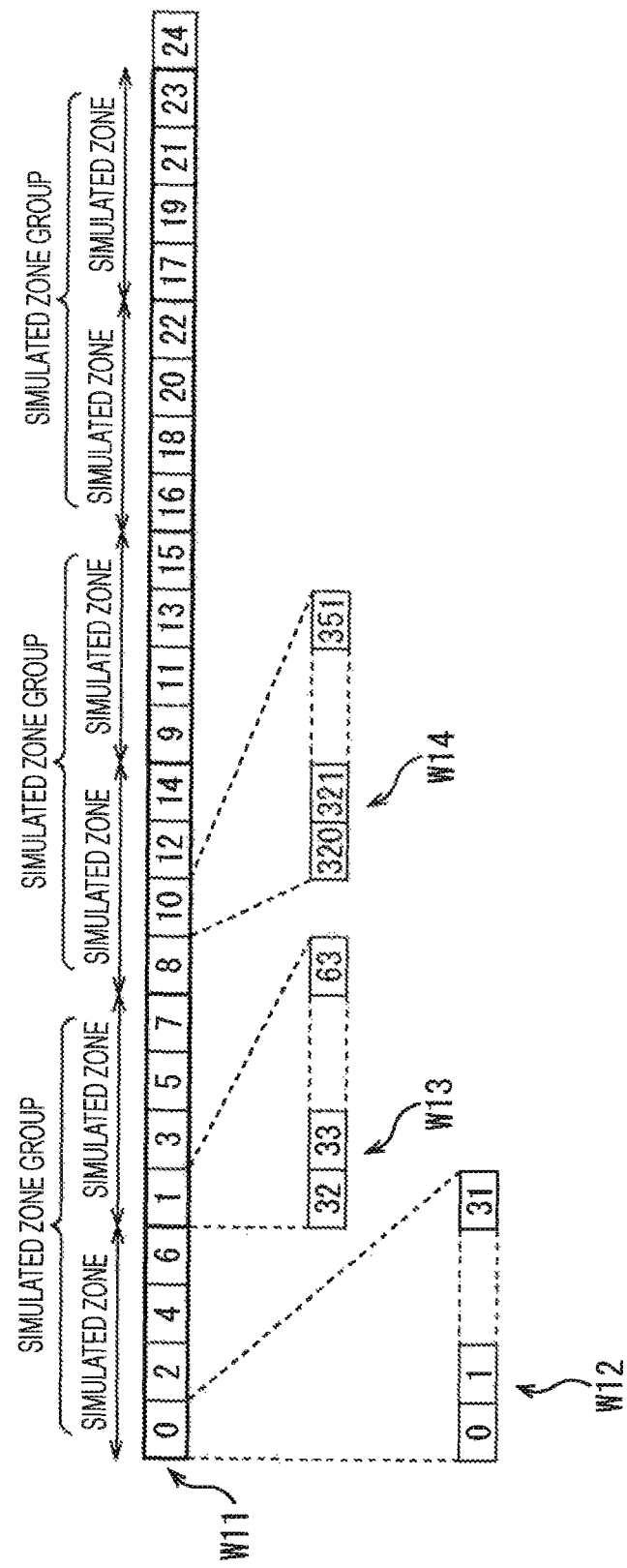
FIG. 4 is a diagram illustrating an example of simulated zone groups and simulated zones.

More specifically, for example, as illustrated in FIG. 4, it is assumed that accesses to the recording area in a single recording layer are performed in two channels.

Here, in FIG. 4, the single rectangle indicated by the arrow W11 represents a recording area, which is a user data area for example, and each rectangle in the user data area represents one RUB. Further, the number written in each RUB represents the order of the RUBs to be accessed when accessing the recording area. Hereinafter, the number indicating the order of the RUBs to be accessed is also referred to as a RUB access number.

Further, each rectangle respectively indicated by the arrows W12 to W14 represents one RUB, and each rectangle in the RUBs represents one physical sector. Further, the number written in the physical sector indicates the order of the physical sectors to be accesses. Hereinafter, the number indicating the order of the physical sector to be accessed is also referred to as a sector access number. The order of the sector access number corresponds to the order of the LSNs for example.

In the example of FIG. 4, the four RUBs arranged in a row are assumed as a simulated zone and a set of the two simulated zones arranged in a row is assumed as a simulated zone group. In other words, in this example, the simulated zone size is set as four RUBs and the two simulated zones arranged next to each other in the same recording layer are assumed as one simulated zone group. Further, one RUB is composed of 32 series physical sectors.

Here, in purpose of simplification of the explanation, the simulated zone size is set as four RUBs; however, in actual, a size is preferably hundreds of RUBs or thousands of RUBs.

In the example of FIG. 4, between the simulated zones composing a single simulated zone group, the access order of the RUBs, which are the RUB access numbers, are interleaved.

For example, in a first simulated zone group, the RUB which is to be firstly accessed and has the RUB access number of 0 is assumed to be the RUB in the beginning of the first simulated zone, and the RUB which is to be secondly accessed and has the RUB access number of 1 is assumed to be the RUB in the beginning of the second simulated zone.

Then, the RUB which is to be thirdly accessed and has the PUB access number of 2 is assumed to be the second RUB in the first simulated zone, and the RUB which is to be fourth accessed and has the RUB access number of 3 is assumed to be the second RUB in the second simulated zone.

In this manner, in each simulated zone group, the RUB access numbers are allocated to two simulated zones alternately and, in the simulated zone, the access order of the RUBs is specified so that the RUB access number becomes smaller in RUBs being closer to the beginning part.

Further, as indicated by the arrows W12 to W14, in each single RUB, it is made to be accessed from the beginning of the physical sector to the last physical sector of the RUB in order. In other words, the sector access numbers are not interleaved between the RUBs, and the physical sectors in the RUB are subsequently accessed in order of the arrangement of the physical sectors (in order).

Thus, in this example, to the respective physical sectors in the RUB having the RUB access number of 0, sector access numbers 0 to 31 are allocated. Further, to the respective physical sectors in the RUB having the RUB access number of 1 following the RUB access number of 0, sector access numbers 32 to 63 are allocated.

When accessing to the recording area, data is read or written in order of the RUB access numbers allocated in this manner, more specifically, in order of the sector access numbers.

In an optical disk, series PSNs are allocated to physical sectors, which are arranged in a row in the recording layer. Thus, when the LSNs are allocated to the respective physical sectors (logical sectors) so as to be matched with the access orders to the physical sectors, the order of the PSNs and the order of the LSNs do not match. Thus, according to the present technology, later described simulated zone area management information is used and the correspondence relationship between the PSNs and LSNs are managed.

Figure 5:
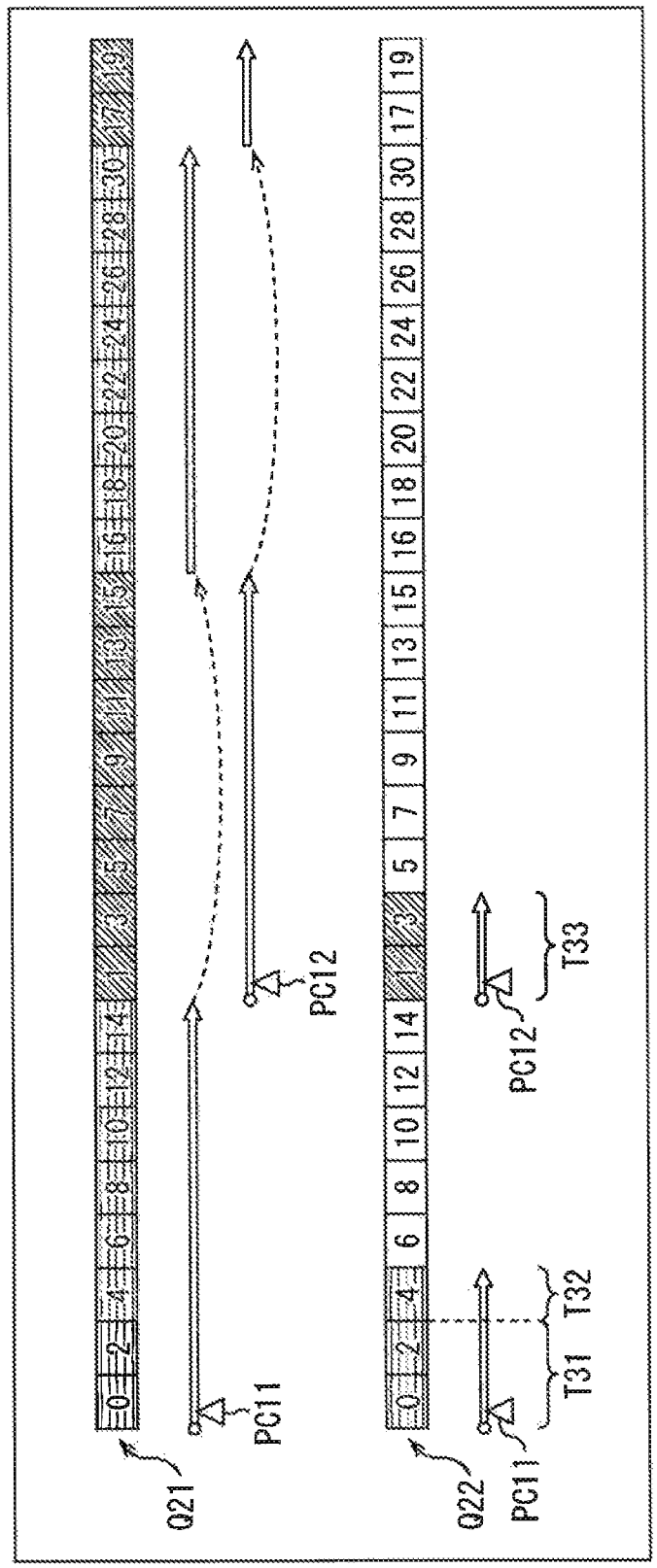
FIG. 5 is a diagram for explaining a striping operation performed in more than one channel.

As described above, the data transfer speed can be improved, for example, as illustrated in FIG. 5, by defining the simulated zones and simulated zone groups and interleaving the RUB access numbers between the simulated zones, that is, interleaving the LSNs between the simulated zones in a unit of RUB.

Here, in FIG. 5, each rectangle represents one RUB, and the numbers written in the RUBs represent RUB access numbers. Further, the solid arrows in the drawing represent data access directions (recording area), and the dotted arrows in the drawing represent a seek operation or a rotational delay. Further, in FIG. 5, same reference numerals are applied to the parts corresponding to those in the case of FIG. 3 and the explanations thereof will be omitted.

In the example of FIG. 5, eight RUBs are set as one simulated zone, and two simulated zones arranged in a row compose one simulated zone group. Then, a plurality of simulated zone groups are arranged in a row in the access direction of the recording area.

Here, it is assumed that an access to the simulated zone located in the beginning of the simulated zone group is allocated to the optical pickup PC11 and an access to the simulated zone at the end of the simulated zone group is allocated to the optical pickup PC12.

In such a case, as indicated by the arrow Q21, the optical pickup PC11 sequentially accesses the RUBs arranged in a row from the RUB having the RUB access number of 0. Then, after accessing the RUB having a RUB access number of 14, as indicated by the dotted arrow in the drawing, the optical pickup PC11 jumps to a RUB having the RUB access number of 16 by performing a seek operation or the like and sequentially accesses the RUBs arranged in a row to the RUB having the RUB access number of 30.

Further, similarly, after subsequently accessing the RUBs arranged in a row starting from the RUB having a RUB access number of 1 to the RUB having a RUB access number of 15, the optical pickup PC12 jumps to the RUB having a RUB access number of 17 and sequentially accesses the RUBs arranged in a row. Here, since the access operation by the optical pickup PC11 and the access operation by the optical pickup PC12 are executed at the same time, for example, the access to the RUB having the RUB access number of 0 and the access to the RUB having the RUB access number of 1 are executed at substantially same time.

According to the present technology, by performing such an access control to allocate simulated zones composed of a plurality of series RUBs to one channel, the occurrence of a seek operation can be kept one time for one simulated zone even when accessing data in a large size. Thus, by defining the largeness (size) of the simulated zone properly, the number of occurrence of a seek operation or the like can be reduced and the data transfer speed can be improved.

Further, according to the present technology, even when the size of the data to be accessed is small, for example, as indicated by the arrow Q22, striping is performed effectively and the data transfer speed can be improved.

In other words, in the example indicated by the arrow Q22, the size of the data to be accessed is five RUBs. Thus, striping is performed for the area T31 and the area T33, which are in the size of two RUBs and the part where striping is not performed is only a fractional part of one-RUB data, which is the part of the area T32. With this configuration, the striping efficiency can be improved and this improves the data transfer speed.

In other words, in this example, since a series of pieces of data is divided into a unit of RUB and alternately allocated to two channels, substantially the same amount of data can be allocated to the two channels. Thus, in a case that data is recorded or reproduced in the two channels at the same time, since allocated data is not unevenly distributed to only one of the channels, the striping efficiency can be improved and this improves the data transfer speed.

As described above, according to the present technology, by interleaving the access orders in a unit of RUB, that is LSNs, between the simulated zones, the data transfer speed can be improved regardless of the size of data to be recorded or reproduced. In addition, when recording data, recording in each of the respective channels can be performed at substantially same time even when a small amount of the data to be recorded is being buffered in the recording/reproducing device side.

Further, in the example illustrated in FIG. 4, an example in which the RUB access numbers are allocated alternately between the simulated zones; however, the RUB access numbers may be allocated alternately between the simulated zones in a unit of a plurality of RUBs.

Here, in actual, the RUB access numbers are not allocated and the LSNs of the respective physical sectors are determined according to the access order indicated by the RUB access numbers.

Figure 6:
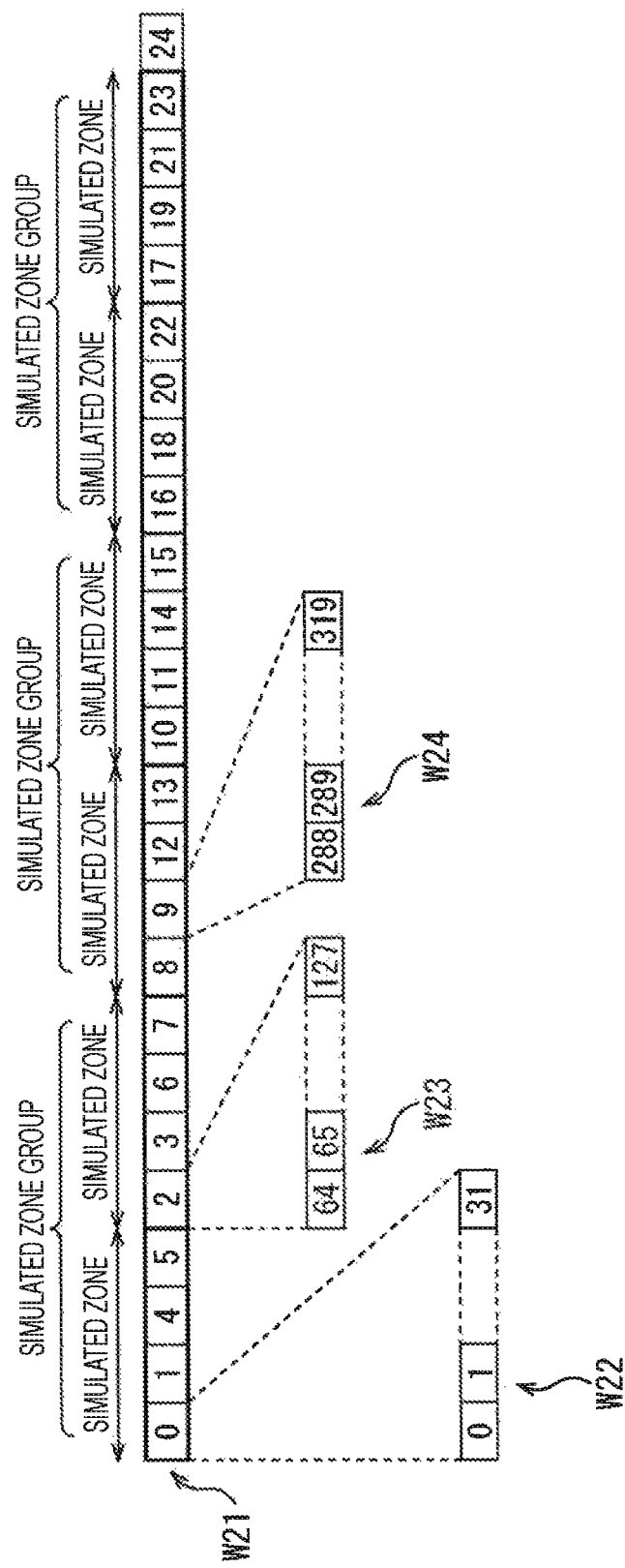
FIG. 6 is a diagram illustrating an example of simulated zone groups and simulated zones.

In this manner, when the RUB access numbers are allocated in a unit of a plurality of RUBs, the RUB access numbers are allocated to the respective RUBs as illustrated in FIG. 6 for example. Here, in FIG. 6, the rectangle indicated by the arrow W21 represents one recording area, which is a user data area for example, and each rectangle in the user data area represents one RUB. Further, the number written in each RUB represents a RUB access number.

Further, each one of the rectangles indicated by the arrows W22 to W24 represents one RUB and each rectangle in the RUB represents a physical sector. Further, the number written in each physical sector represents a sector access number.

In the example of FIG. 6, four RUBs arranged in a row are assumed to be one simulated zone and a set of two simulated zones arranged in a row is assumed as one simulated zone group. Further, one RUB is composed of 32 serial physical sectors.

In each simulated zone group, RUB access numbers are allocated in a unit of two RUBs alternately between the simulated zones.

For example, in the first simulated zone group, the RUB access numbers of the first and second RUBs in the first simulated zone are set as 0 and 1, and the RUB access numbers of the first and second RUBs in the second simulated zone are set as 2 and 3.

Further, the RUB access numbers of the third and fourth RUBs in the first simulated zone are set as 4 and 5, and the RUB access numbers of the third and fourth RUBs in the second simulated zone are set as 6 and 7.

Therefore, in each simulated zone group, after accessing the two serial RUBs in the first simulated zone, the two serial RUBs in the second simulated zone are accessed. Further, the later two serial RUBs in the first simulated zone are accessed and lastly the later two serial RUBs in the second simulated zone are accessed.

Here, in actual, since a single simulated zone is allocated to a single channel, the first simulated zone and the second simulated zone in the simulated zone group are accessed by the respective allocated channels at the same time.

As described above, in each simulated zone group, the two RUB access numbers are allocated alternately between the simulated zones and the RUB access numbers are defined so that the RUB access number becomes smaller as being closer to the beginning of the simulated zone.

Further, as indicated by the arrows W22 to W24, in one RUB, the first physical sector to the last physical sector in the RUB are sequentially accessed in order.

By allocating the two RUB access numbers alternately between the simulated zones in this manner, the possibility that an access to data (file) in a size of two RUBs can be completed by one channel can be increased. In this case, although the striping efficiency is reduced, a multithreading operation efficiency, which is the efficiency of an operation of simultaneous reading of plural files, can be improved.

Figure 7:
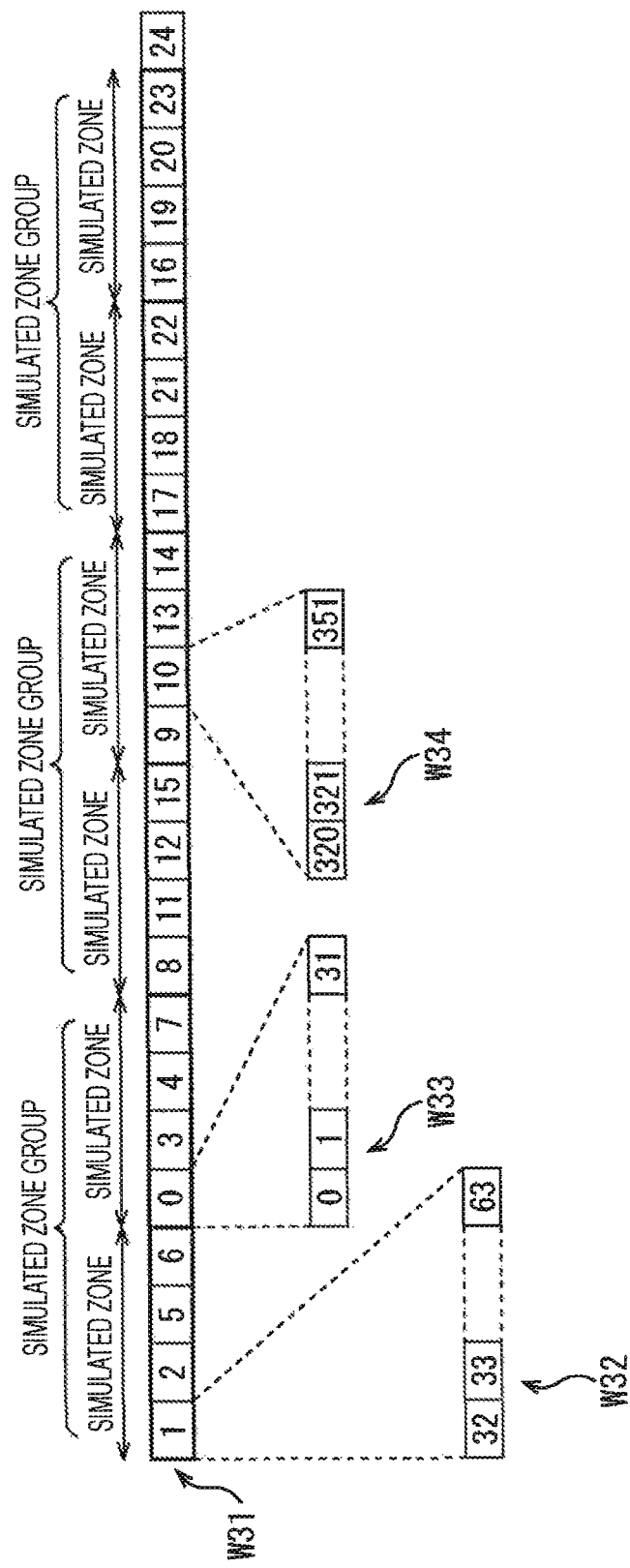
FIG. 7 is a diagram illustrating an example of simulated zone groups and simulated zones.

Further, in a case that simultaneous accesses by two channels are performed to a recording area in one recording layer, when the RUB access orders are defined as illustrated in FIG. 7 for example, this increases the possibility that the part of two serial RUBs of data to be accessed is placed in an area of two RUBs in a row in the simulated zone. Here, in FIG. 7, the rectangle indicated by the arrow W31 represents one recording area, which is a user data area for example, and each rectangle in the user data area represents one RUB. Further, the number written in each RUB represents a RUB access number.

Further, each one of the rectangles respectively indicated by the arrows W32 to W34 represents one RUB, and each rectangle in the RUB represents one physical sector. Further, the number written in each physical sector represents a sector access number.

In the example of FIG. 7, four RUBs arranged in a row are assumed as one simulated zone and a set of two serial simulated zones is assumed as one simulated zone group. Further, the single RUB is composed of 32 serial physical sectors.

In each simulated zone group, in the simulated zone, RUB access numbers are allocated alternately between the simulated zones so that serial RUB access numbers are preferably allocated to two adjacent RUBs.

For example, in the first simulated zone group, the RUB access number of the first RUB in the second simulated zone is set as 0, and the RUB access numbers of the first and second RUBs in the first simulated zone are set as 1 and 2 respectively. Then, the RUB access numbers of the second and third RUBs in the second simulated zone are set as 3 and 4 respectively, and the RUB access numbers of the third and fourth of the first simulated zone are set as 5 and 6 respectively. Further, the RUB access number of the fourth RUB in the second simulated zone, which is left, is set as 7.

Further, in each of the respective RUBs indicated by the arrows W32 to W34, the first physical sector to the last physical sector in the RUB are sequentially accessed in order.

In this manner, when the serial RUB access numbers are allocated to two RUBs next to one another in the simulated zone as possible and the RUB access numbers are allocated in a unit of RUB or two RUBs alternatively between the simulated zones, this increases the possibility that an access to data in a size of two RUBs can be completed in a single channel. With this, the multithreading operation efficiency can be improved.

Further, in the above, it has been explained an example that a set of simulated zones in a recording area in a single recording layer is set as one simulated zone group; however, the simulated zone group may be composed of simulated zones in the same recording layer and a different recording layer.

Figure 8:
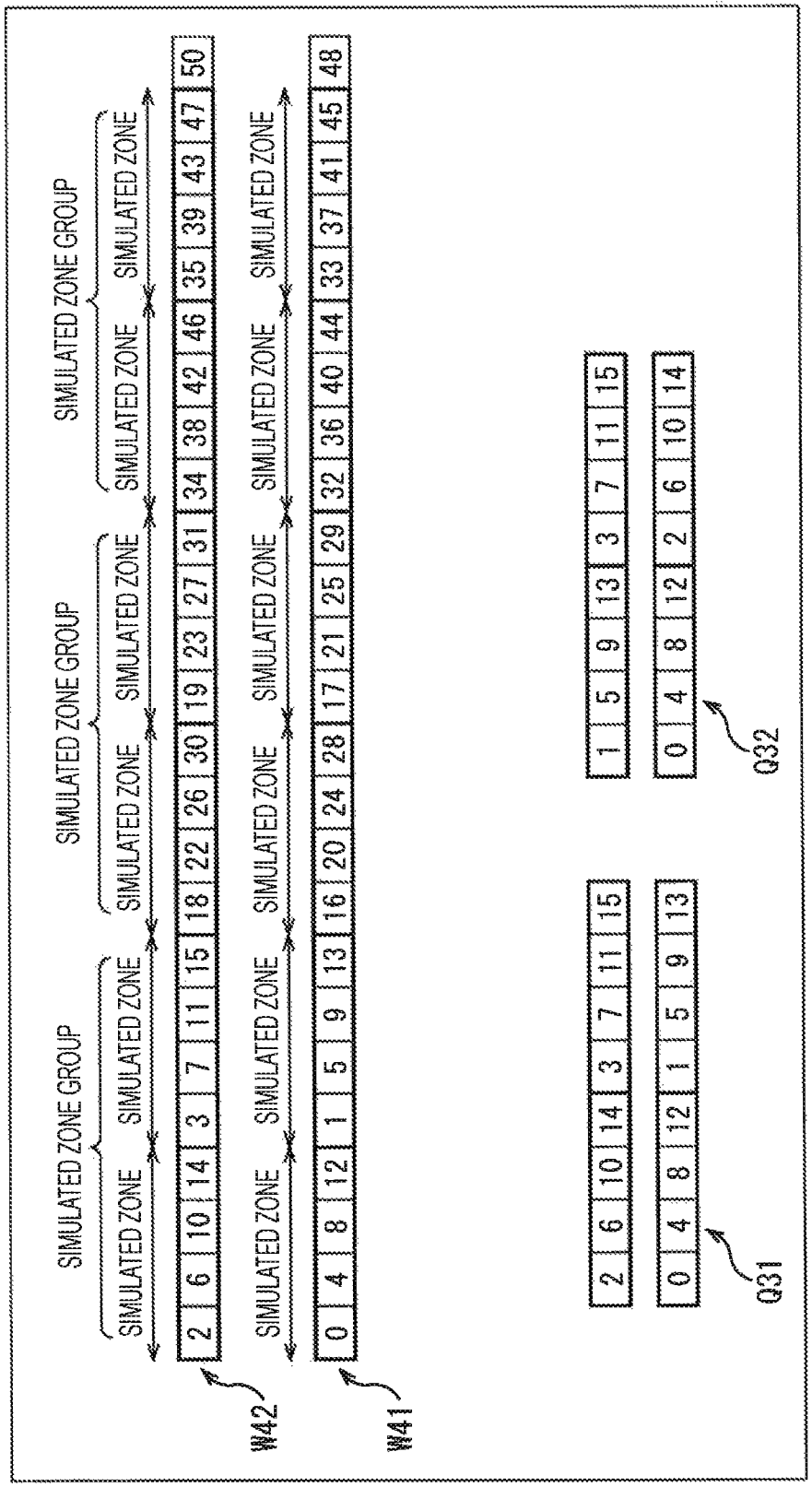
FIG. 8 is a diagram illustrating an example of simulated zone groups and simulated zones.

In such a case, the RUB access numbers are allocated to the respective RUBs as illustrated in FIG. 8 for example. Here, in FIG. 8, each of the rectangles respectively indicated by the arrows W41 and W42 represents one recording area, which is a user data area for example, and each rectangle in the user data area represents one RUB. Further, the number written in each RUB represents a RUB access number.

Here, for example, the recording area indicated by the arrow W41 is a recording area in a recording layer provided on a front side of the optical disk and the recording area indicated by the arrow W42 is a recording area in a recording layer provided on a rear side of the optical disk.

In FIG. 8, four RUBs arranged in a row are assumed to be one simulated zone, and a set of four simulated zones including two simulated zones arranged in a row in the recording layer on the front side and two simulated zones arranged in a row in the recording layer on the rear side is assumed as one simulated zone group.

In each simulated zone group, RUB access numbers are allocated in a unit of RUB in the four simulated zones in order and, in the simulated zone, RUB access orders are defined so that RUB closer to the beginning has a smaller RUB access number.

For example, in the first simulated zone group, the RUB access number of the first RUB in the first simulated zone on the front side is set as 0 and the RUB access number of the first RUB in the second simulated zone on the rear side is set as 1. Further, the RUB access number of the first RUB in the first simulated zone on the rear side is set as 2 and the RUB access number of the first RUB in the second simulated zone on the rear side is set as 3.

Further, the RUB access numbers of the second RUB in the first simulated zone on the front side, the second RUB in the second simulated zone on the front side, the second RUB in the first simulated zone on the rear side, and the second RUB of the second simulated zone on the rear size are set as 4 to 7 respectively.

Similarly, the RUB access numbers of the third RUB of the first simulated zone on the front side, the third RUB in the second simulated zone on the front side, the third RUB in the first simulated zone on the rear side, and the third RUB in the second simulated zone on the rear side are set as 8 to 11 respectively.

Further, the RUB access numbers of the fourth RUB in the first simulated zone on the front side, the fourth RUB in the second simulated zone on the front side, the fourth RUB in the first simulated zone on the rear side, and the fourth RUB in the second simulated zone on the rear side are set as 12 to 15 respectively.

Here, one RUB is, for example, composed of 32 series physical sectors and the first physical sector to the last physical sector in the RUB are sequentially accessed in order.

In this example, as indicated by the arrow Q31, serial RUB access numbers are preferably allocated to the simulated zones in the same recording layer. In other words, the RUB access numbers are allocated preferentially within a recording layer.

In this case, as indicated by the arrow Q32, the possibility that the part of adjacent RUBs of data to be accessed is placed in a same recording layer becomes higher, comparing to a case that serial RUB access numbers are allocated between recording layers (hereinafter, also referred to as inter-recording-layer priority).

Here, the two rectangles indicated by the arrow Q31 represent first simulated zone group illustrated in the upper part of the drawing and the two rectangles indicated by the arrow Q32 represent the first simulated zone group illustrated in the upper part of the drawing in which the RUB access numbers are reallocated on the basis of the inter-recording-layer priority.

In the example indicated by the arrow Q32, since RUB access numbers are allocated alternately between different recording layers, the two RUBs to be sequentially accessed are always in two different recording layers. On the other hand, in the example illustrated by the arrow Q31, the RUBs having two serial RUB access numbers are preferably arranged in the same recording layer.

Further, serial RUB access numbers may also be preferably allocated to serial RUBs in a same simulated zone even in a case that the simulated zone group is composed of simulated zones in the same recording layer and in different recording layers.

Figure 9:
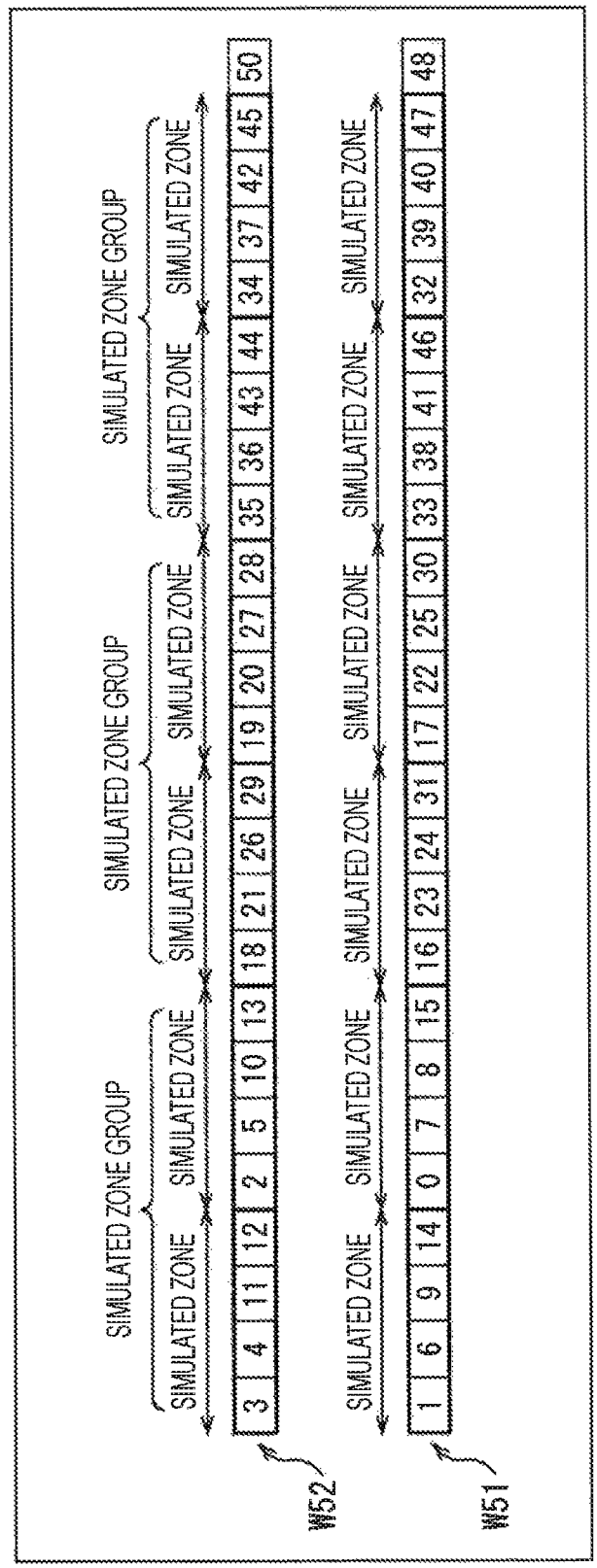
FIG. 9 is a diagram illustrating an example of simulated zone groups and simulated zones.
Figure 10:
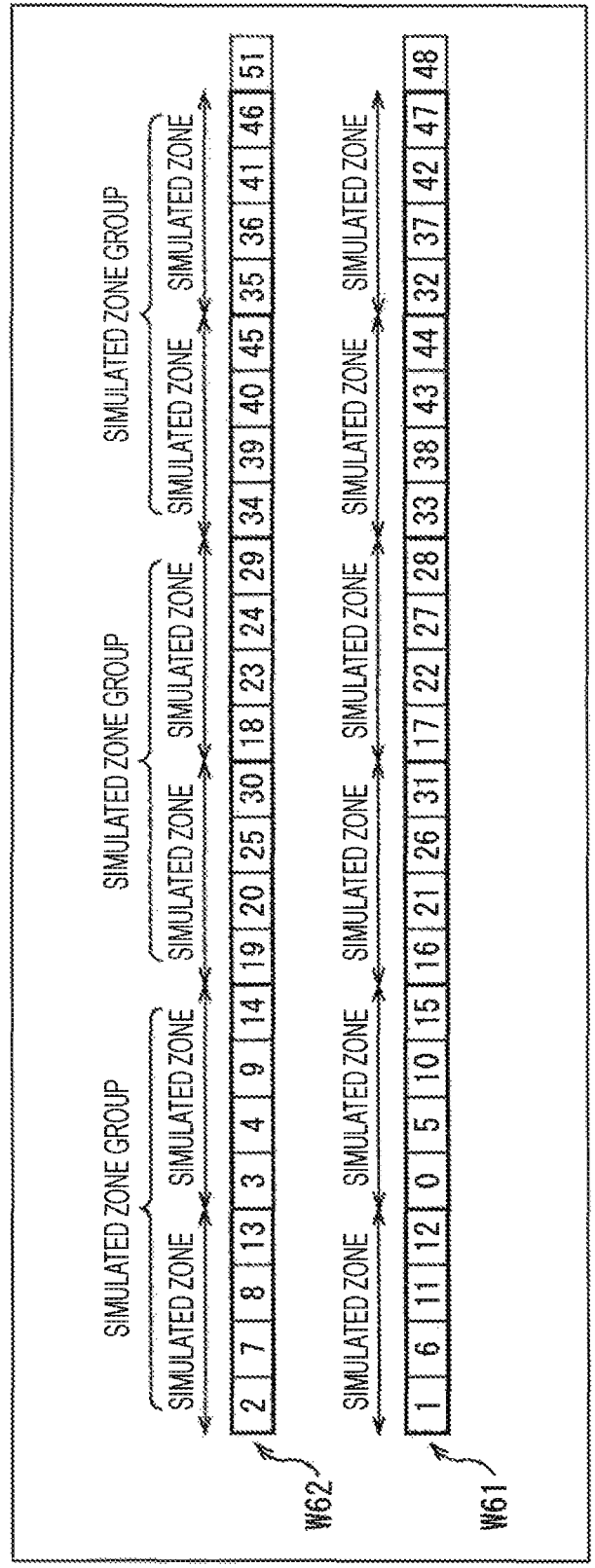
FIG. 10 is a diagram illustrating an example of simulated zone groups and simulated zones.

In such a case, RUB access numbers are allocated to the RUBs as illustrated in FIG. 9 or 10 for example.

Here, in FIGS. 9 and 10, each of the rectangles respectively indicated by the arrows W51, W52, W61, and W62 represents one recording area, which is a user data area for example, and each rectangle in the user data area represents one RUB. Further, the number written in each RUB represents a RUB access number. Further, one RUB is composed of, for example, 32 series physical sectors and the first physical sector to the last physical sector in the RUB are sequentially accessed in order.

For example, in the example illustrated in FIG. 9, it is assumed that the recording area indicated by the arrow W51 is a recording area in the recording layer provided on the front side of the optical disk and the recording area indicated by the arrow W52 is a recording area in the recording layer provided on the rear side of the optical disk.

In FIG. 9, four RUBs arranged in series are assumed one simulated zone and a set of four simulated zones in total including two simulated zones arranged in a row in the recording layer on the front side and two simulated zones in the recording layer on the rear side is assumed as one simulated zone group.

In each simulated zone group, RUB access numbers are allocated in a unit of RUB to the four simulated zones.

In this case, when moving from a simulated zone as a target of the RUB access number allocation to a simulated zone in another recording layer, the simulated zone placed in a further side from the simulated zone as the last allocation target is made to be a simulated zone as a next allocation target. Further, after a RUB access number is allocated to the RUB in the last simulated zone of all the four simulated zones, a RUB access number continuous from the last RUB access number allocated to the RUB is allocated to a RUB next to the RUB.

For example, in the first simulated zone group, the RUB access number of the first RUB in the second simulated zone on the front side is set as 0 and the RUB access number of the first RUB in the first simulated zone on the front side is set as 1. Further, the RUB access number of the first RUB in the second simulated zone on the rear side is set as 2 and the RUB access number of the first RUB in the first simulated zone on the rear side is set as 3.

Further, the RUB access numbers of the second RUB in the first simulated zone on the rear side, the second RUB in the second simulated zone on the rear side, the second RUB in the first simulated zone on the front side, and the second RUB in the second simulated zone on the front side are set as 4 to 7 respectively.

Similarly, the RUB access numbers of the third RUB in the second simulated zone on the front side, the third RUB in the first simulated zone on the front side, the third RUB in the second simulated zone on the rear side, and the third RUB in the first simulated zone on the rear side are set as 8 to 11, respectively.

Further, the RUB access numbers of the fourth RUB in the first simulated zone on the rear side, the fourth RUB in the second simulated zone on the rear side, the fourth RUB in the first simulated zone on the front side, and the fourth RUB in the second simulated zone on the front side are set as 12 to 15, respectively.

In this manner, in the example of FIG. 9, the RUBs having two serial RUB access numbers are preferably made to be placed in a same recording layer.

Further, for example, in the example illustrated in FIG. 10, the recording area indicated by the arrow W61 is a recording area in a recording layer provided on the front side of the optical disk and the recording area indicated by the arrow W62 is a recording area in the recording layer provided on the rear side of the optical disk.

In FIG. 10, four RUBs arranged in a row are assumed as one simulated zone, and a set of four simulated zones including two simulated zones arranged in a row in the recording layer on the front side and two simulated zones arranged in a row in the recording layer on the rear side is assumed as one simulated zone group.

In each simulated zone group, RUB access numbers are allocated in a unit of RUB in order in the four simulated zones.

In this case, when moving from a simulated zone as a target of the RUB access number allocation to a simulated zone in another recording layer, the simulated zone placed in a closer side to the simulated zone as the last allocation target is made to be a simulated zone as a next allocation target. Further, after a RUB access number is allocated to the RUB in the last simulated zone of all the four simulated zones, a RUB access number continuous from the last RUB access number allocated to the RUB is allocated to a RUB next to the RUB.

For example, in the first simulated zone group, the RUB access number of the first RUB in the second simulated zone on the front side is set as 0 and the RUB access number of the first RUB in the first simulated zone on the front side is set as 1. Further, the RUB access number of the first RUB in the first simulated zone on the rear side is set as 2 and the RUB access number of the first RUB in the second simulated zone on the rear side is set as 3.

Further, the RUB access numbers of the second RUB in the second simulated zone on the rear side, the second RUB in the second simulated zone on the front side, the second RUB in the first simulated zone on the front side, and the second RUB in the first simulated zone on the rear side are set as 4 to 7, respectively.

Similarly, the RUB access numbers of the third RUB in the first simulated zone on the rear side, the third RUB in the second simulated zone on the rear side, the third RUB in the second simulated zone on the front side, and the third RUB in the first simulated zone on the front side are set as 8 to 11, respectively.

Further, the RUB access numbers of the fourth RUB in the first simulated zone on the front side, the fourth RUB in the first simulated zone on the rear side, the fourth RUB in the second simulated zone on the rear side, and the fourth RUB in the second simulated zone on the front side are set as 12 to 15, respectively.

Here, in the above, it has been explained that one simulated zone group is composed of simulated zones provided in a single recording layer or in two recording layers. However, for example, one simulated zone group may be composed of simulated zones provided in four or more recording layers so that, in a case of a four-layer optical disk or the like, one simulated zone group is composed of four simulated zones provided in the respective four recording layers.

Further, as described above, the number of spirals on an optical disk may be fewer or larger than the number of channels which can be recorded or reproduced at the same time in the recording/reproducing device. For example, when the number of spirals on an optical disk is fewer than the number of channels in the recording/reproducing device, the recording area in each recording layer is divided into a plurality of simulated zones, and a plurality of simulated zones in the same recording area are preferably included in the same simulated zone group.

<About Simulated Zone Setting>

Here, it has been explained that the recording layer of the optical disk includes the inner zone, extended area, user data area, and outer zone.

Figure 11:
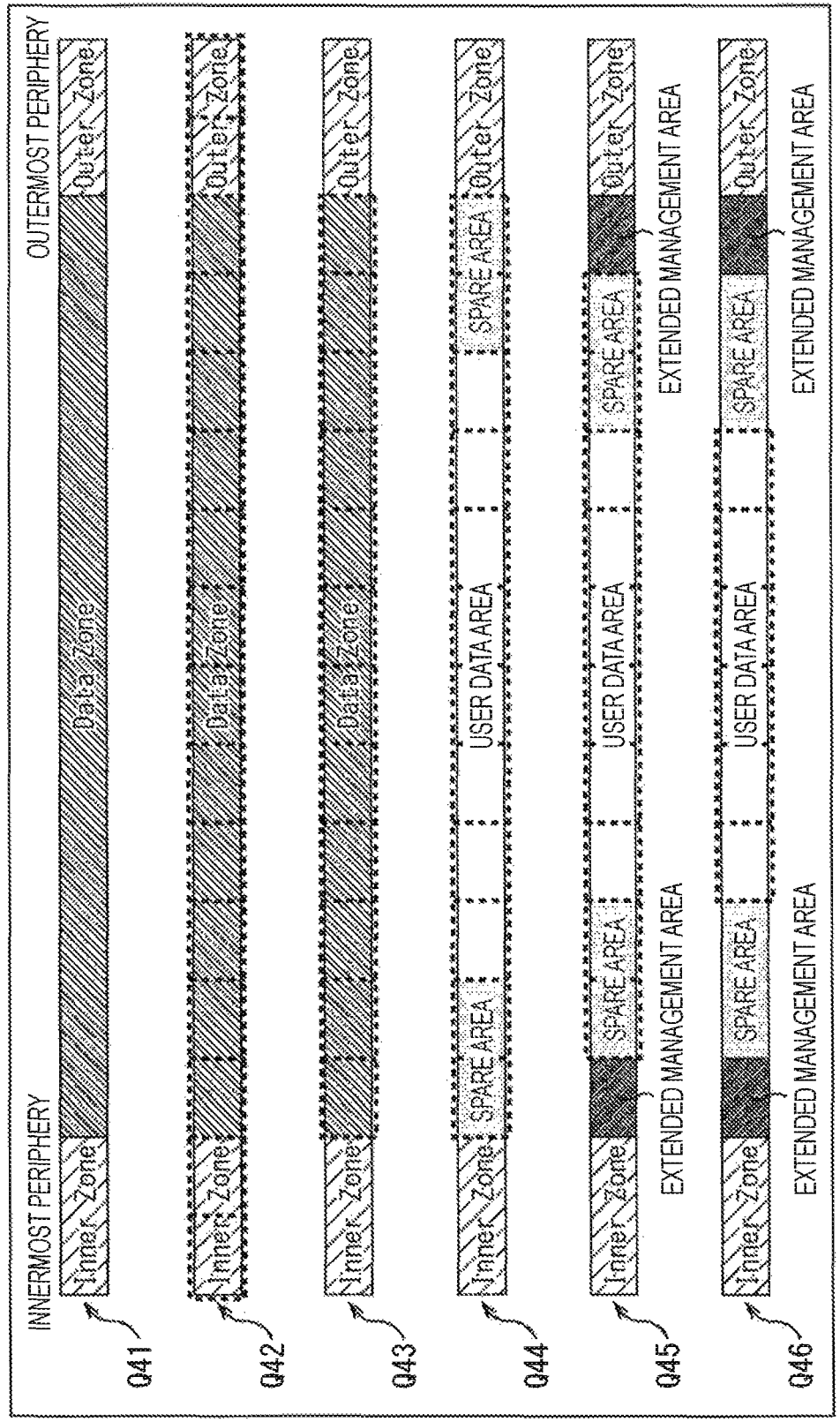
FIG. 11 is a diagram for explaining a simulated zone setting.

Now, for example, as indicated by the arrow Q41 in FIG. 11, an area including the extended area and user data area in the recording area is referred to as a data zone. In this case, the recording area in one recording layer is composed of an inner zone, a data zone, and an outer zone.

In such a case, any area in the recording area can be made as a simulated zone, in other words, a simulated zone can be set in any area in the recording area; however, some attempts are needed according to the area to be made as a simulated zone. Here, in a purpose of simplification, FIG. 11 illustrates a case that the optical disk includes only one recording layer; however, the process is similar when the optical disk includes more than one recording layer.

For example, as indicated by the arrow Q42, the entire optical disk, which includes the inner zone, data zone, and outer zone, may be made as simulated zones. It is noted that, in FIG. 1, each rectangle illustrated with dotted lines represents one simulated zone.

In this example, when the entire recording area is not in a size of an integral multiple of the size of the simulated zones, for example, there may be partially a simulated zone which is not in the defined simulated zone size or there may be an area which is not made as a simulated zone due to an its odd size, at the beginning or end of the recording area.

Further, as indicated by the arrow Q43, only the data zone can be made as simulated zones. In this case, if the size of the data zone is set as an integral multiple of the simulated zone size, the management of the simulated zones can be simplified.

Further, as indicated by the arrow Q44, spare areas may be provided in the extended area composing the data zone and the entire data zone including the spare areas and user data area may be made as simulated zones. In this case, if the respective spare areas and user data area are formed in the size of an integral multiple of the simulated zone size, the border positions of the simulated zones can be fixed. In other words, for example, the border positions between the spare areas and user data area always serve as border positions between the simulated zones and the area management of the simulated zones can be simplified.

Further, as indicated by the arrow Q45, extended management areas and spare areas are provided in the data zone and the spare areas and user data area may be made as simulated zones without using the extended management areas as simulated zones. In this case, if the sizes of the extended management areas, spare areas, and user data area are made to be in the size of an integral multiple of the simulated zone size, the border positions of the simulated zones are fixed. In other words, the border positions between the extended management areas and spare areas and the border positions between the spare areas and user data area are always serve as the border positions between the simulated zones so that the area management of the simulated zones can be simplified.

Here, in this case, when the sizes of the spare areas and user data area are made in the size of an integral multiple of the simulated zone size, the border positions between the simulated zones may be shifted in some cases; however, the border positions between the extended management areas and spare areas and the border positions between the spare areas and user data area always serves as the border posit ions between the simulated zones.

Further, as indicated by the arrow Q46, extended management areas and spare areas are provided in the data zone, but only the user data area may be used to set simulated zones without using the extended management areas and spare areas as simulated zones.

In this manner, the data zone can include extended management areas or spare areas in addition to the user data area, and the area of the simulated zones can be easily managed by setting the sizes of the extended management areas, spare areas, user data area properly.

Figure 12:
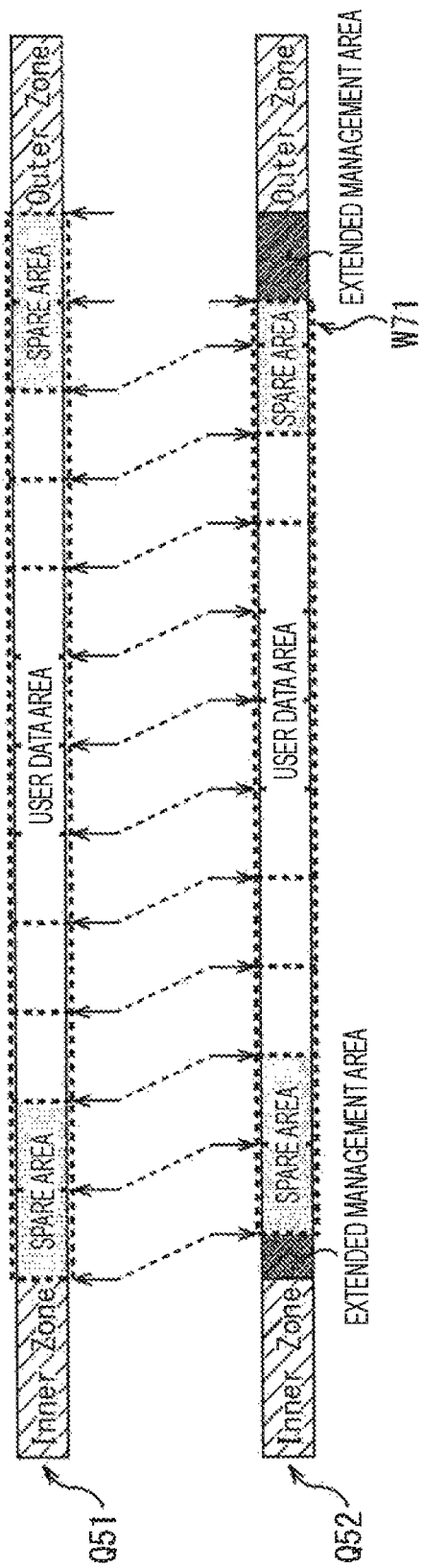
FIG. 12 is a diagram for explaining the simulated zone setting.

For example, as indicated by the arrow Q51 in FIG. 12, spare areas are provided in the data zone and the spare areas, user data area are used to make simulated zones, and it is assumed that the border positions between the simulated zones are defined as illustrated by the dotted lines in the drawing.

Here, each rectangular illustrated with dotted lines in the drawing represents one simulated zone and the arrows in the drawing represent border posit ions between the simulated zones.

In this example, since the spare areas and user data area are in size of an integral multiple of the simulated zone size, the border positions between the spare areas and user data area serve as the border positions between the simulated zones and there is not any simulated zone in an odd size.

On the other hand, as indicated by the arrow Q52, it is assumed that the extended management areas and spare areas are set in the data zone and only the spare areas and user data area are used to set the simulated zones.

In this case, when the extended management areas are not in size of an integral multiple of the simulated zone size, the border positions of the simulated zones are shifted according to whether the extended management area are provided or not, as illustrated by the dotted lines, which connect the arrows indicating the border positions between the simulated zone in the drawing. Further, as indicated by the arrow W71, a simulated zone in a fragmentary size may be generated.

Thus, according to the present technology, a variable area whose size is changeable in the data zone and, more specifically, when extended management areas, spare areas or a user data area are set, the sizes of those areas is preferably made to be in the sizes of an integral multiple of the simulated zone size. With this, shifting of the border positions between the simulated zones or occurring of a simulated zone in an odd size can be prevented and the area management can be simplified.

Figure 13:
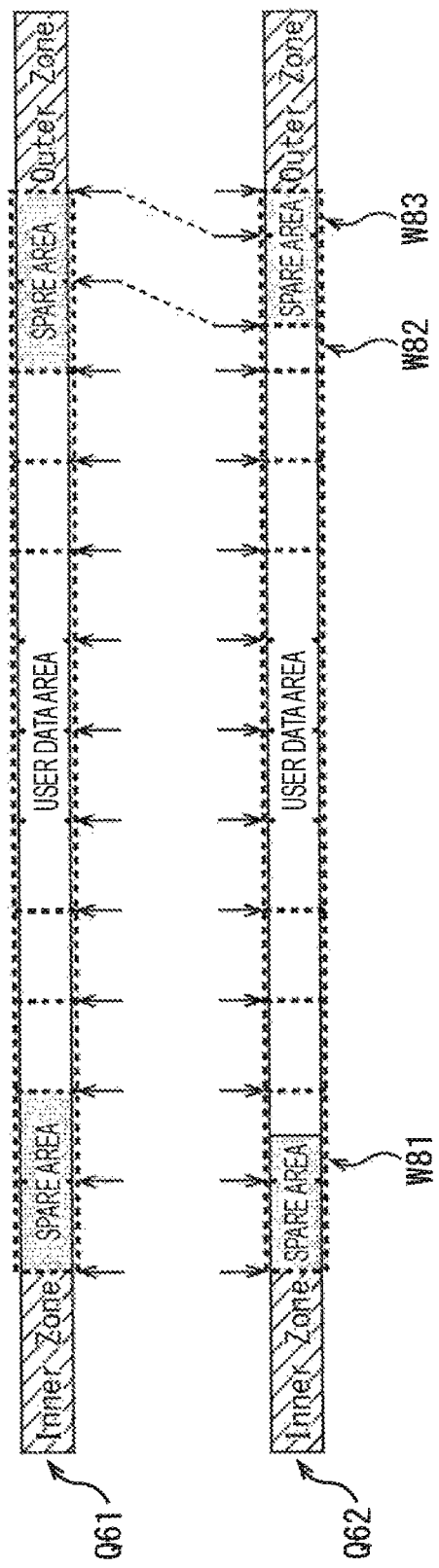
FIG. 13 is a diagram for explaining the simulated zone setting.

Specifically, as indicated by the arrow Q61 of FIG. 13, when the sizes of the spare areas and user data area are made to be in a size of an integral multiple of the simulated zone size, the border positions between the spare areas and user data area serve as the border positions between the simulated zones if the spare areas are set as the data zone. Further, a simulated zone in an odd size is not generated.

Here, each rectangle indicated by the dotted lines in FIG. 13 represents one simulated zone and the arrows in the drawing represent the border positions between the simulated zones.

Here, in a case that the size of the spare areas are not made in the size of an integral multiple of the simulated zone size, an inconvenience may occur that some border positions are shifted as indicated by the arrow Q62. For example, in the simulated zones indicated by the arrow W81, a spare area and a user data area are provided and, as the illustrated simulated zones indicated by the arrows W82 and W83, simulated zones in odd sizes may be generated or border positions between the simulated zones may be shifted.

As described above, when simulated zones are set in a recording area, the area management of the simulated zones can be simplified by making the size of the variable area to be an integral multiple of the simulated zone size.

Here, for example, when the optical disk is one called a Zone Constant Linear Velocity (ZCLV) medium or a Zone Constant Angular Velocity (ZCAV) medium, the recording area of the ZCLV medium or ZCAV medium is divided in a concentric pattern. Then, each area divided from the recording area in the ZCLV medium or ZCAV medium is referred to as a zone. In such a case, for example, the size of each zone is preferably made to be an integral multiple of the simulated zone size. This prevents one simulated zone from being set across two zones and the management of the simulated zones or the like can be simplified.

Further, in the ZCLV medium or ZCAV medium, since the relation of the rotating speed or the transfer rate may differ between the zones, it is preferable that one simulated zone group is not set across two zones. However, even in a case of the ZCLV medium or ZCAV medium, when the simulated zones composing a simulated zone group is placed in different spirals, an inconvenience may not occur in the recording operation or reproducing operation even if a simulated zone is set across two zones.

For example, when a land and a groove provided to a same recording layer respectively serve as one spiral (track), the land and groove respectively have one of simulated zones which compose a same simulated zone group. Further, it is assumed that one simulated zone is set across two zones. In this case, when accessing those simulated zones by two channels at the same time, since accesses to zone borers in those simulated zones occur at substantially same timing, concurrent processing in the two channels can be executed and a reduction of the striping efficiency hardly occurs.

Here, it has been described, as an example, that a land and a groove in a same recording layer are provided as different spirals; however, concurrent processing in more than one channel can be performed even when different simulated zones, which compose a same simulated zone group, are respectively set to the land or groove in indifferent recording layers.

<About Alternation Process>

Next, an alternation process and a spare area management will be explained.

In an alternation process, for a failure block (defective) to which data cannot be recorded due to a failure of the optical disk, that is a logical sector (physical sector) or a RUB for example, a block serving as a substitute for the failure block is allocated from a spare area maintained in advance. Then, a logical address (LSN) which is allocated to the failure block is reallocated to the substitute block.

With this, even on an optical disk having a failure block (hereinafter, simply referred to as a defective or a defective area), a dense logical address space can be proposed. In other words, the optical disk can be accessed regardless of the presence or absence or a location of the defect.

Figure 14:
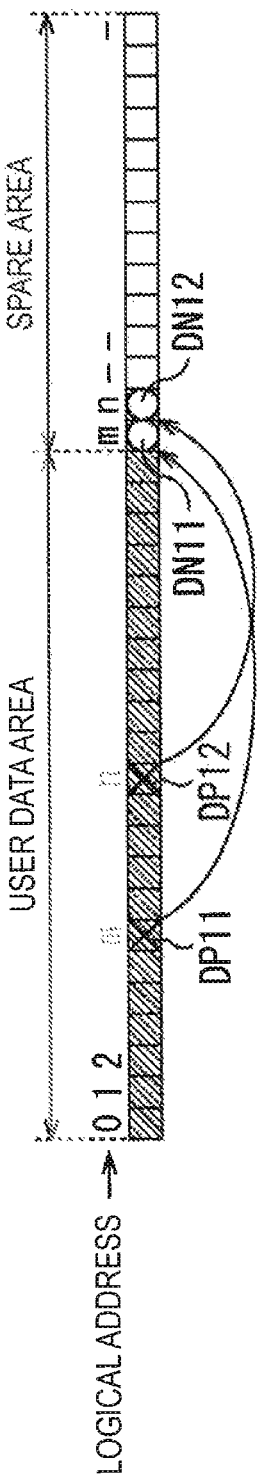
FIG. 14 is a diagram for explaining an alternation process.

More specifically, for example, as illustrated in FIG. 14, the recording area includes a user data area and a spare area, and user data specified by a user is to be recorded in the user data area.

It is noted that, in the drawing, each square represents one block. Here, one block may be, for example, a logical sector (a physical sector) or a RUB, and the following explanation will be given assuming that each block is a logical sector. Further, in the following, when the logical sector and physical sector are not needed to be particularly distinguished, they may be also simply referred to as a sector.

In this example, to each block composing the user data area, which are each sector, logical addresses (LSNs) are allocated from the left side in the drawing. Regardless of whether or not to perform striping, when recording user data, the user data is recorded in the area composed of sectors having continuous LSNs.

Now, for example, when trying to record data to a sector DP11 having a LSN of m, it is assumed that the sector DP11 is defective and data cannot be recorded, and an alternation process is performed. In other words, the sector DN11 in the spare area for example is selected as a sector which is alternative of the sector DP11 as an alternation subject, that is an alternative, the data instructed to be recorded to the sector DP11 is recorded to the sector DN11 as an alternative, and the LSN of the sector DN11 is set as m.

Further, after that, when trying to record data to a sector DP12 having a LSN of n, it is assumed that the sector DP12 is defective and data cannot be recorded, and an alternation process is performed. In other words, a sector DN12 in the spare area for example is selected as an alternative, the data instructed to be recorded to the sector DP12 is recorded to the sector DN12 as an alternative and the LSN of the sector DN12 is set as n.

Here, as described above, the LSNs are basically allocated to the user data area. Thus, an LSN is allocated to the block (sector) set as an alternative in the alternation process in the spare area; however, an LSN is not allocated to a block which is not set as an alternative, that is, a block which is not used.

Further, the timing to perform an alternation process can be arbitrary timing; however, in general, every time when a defective is found during a recording operation, an alternative block is saved in the spare area and a data recording and an LSN reallocation is performed to the alternative.

Further, when an alternation process is performed, information indicating the correspondence relationship between the alternation subject and alternative is generated and saved so that the correspondence relationship between the physical address (PSN) and the logical address (LSN) can be identified.

Such a correspondence relationship between the alternation subject and alternative is for example managed with a table called a defect list (DFL).

A general DFL stores a DFL entry including PSN of an alternation subject and a PSN of an alternative for each defect.

For example, every time an alternation process is performed, one DFL entry is generated and stored in the DFL. Further, in general, in an alternation process, sequential alternative blocks are allocated to sequential defects and the correspondence relationship between these sequential defects and the sequential alternative blocks of the sequential defects are expressed two (a pair of) DFL entries.

When the alternation process is performed in this manner, since an LSN is reallocated to a sector, the correspondence relationship between the LSN and PSN changes.

Figure 15:
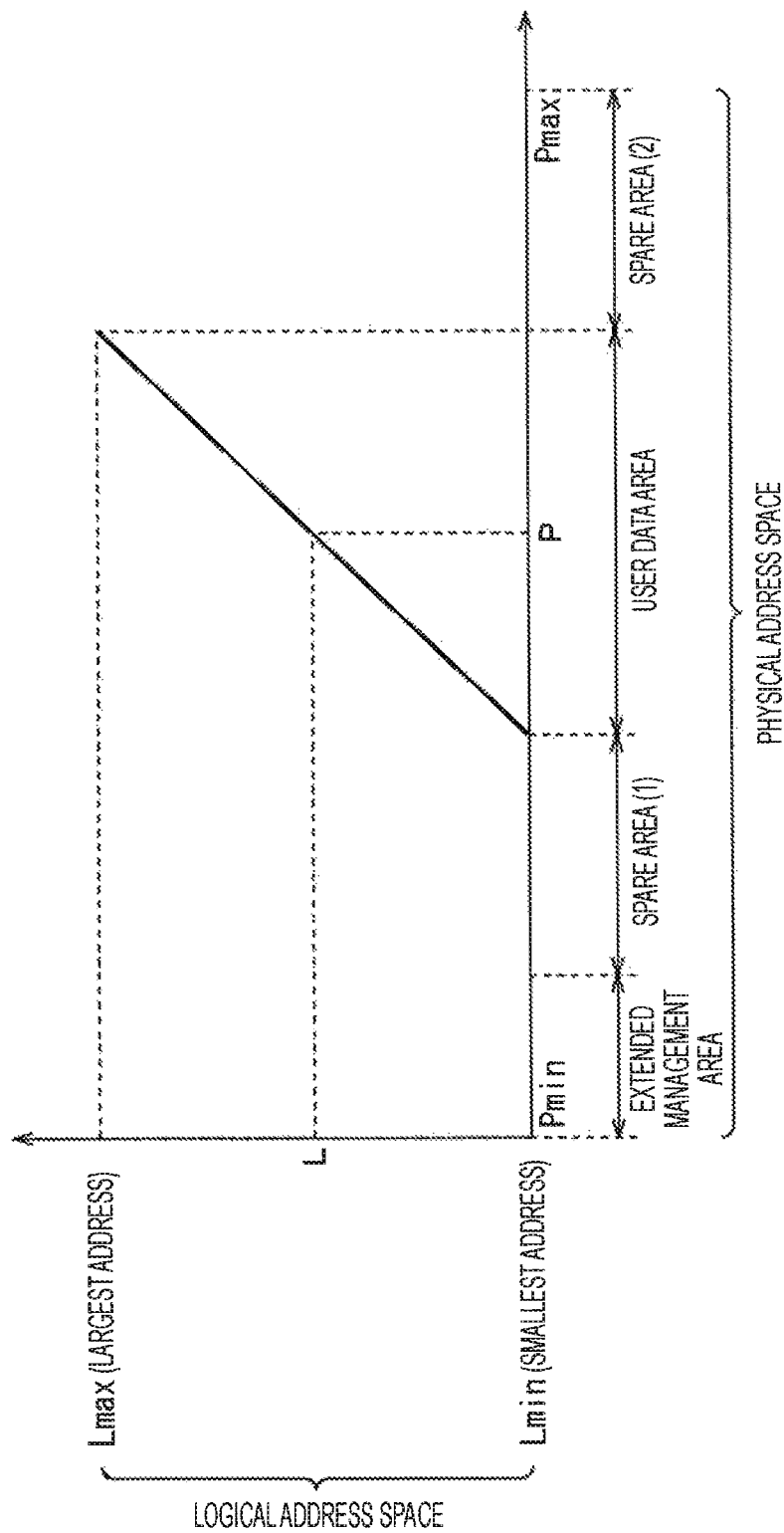
FIG. 15 is a diagram for explaining an alternation process.

For example, when the data zone includes one extended management area and two spare areas in addition to the user data area and there is no defect in the user data area, the correspondence relationship between the logical address space and physical address space becomes as illustrated in FIG. 15.

Here, in FIG. 15, the vertical axis and horizontal axis represent LSNs and PSNs respectively. In this example, since there is no defect in the user data area, the LSNs vary linearly (in a linear manner) with respect to the PSNs. Further, in this example, the extended management area and spare area to which correspondence relationship with the LSNs is not defined do not have LSNs. In other words, these extended management area and spare area are not seen from the logical address space.

Figure 16:
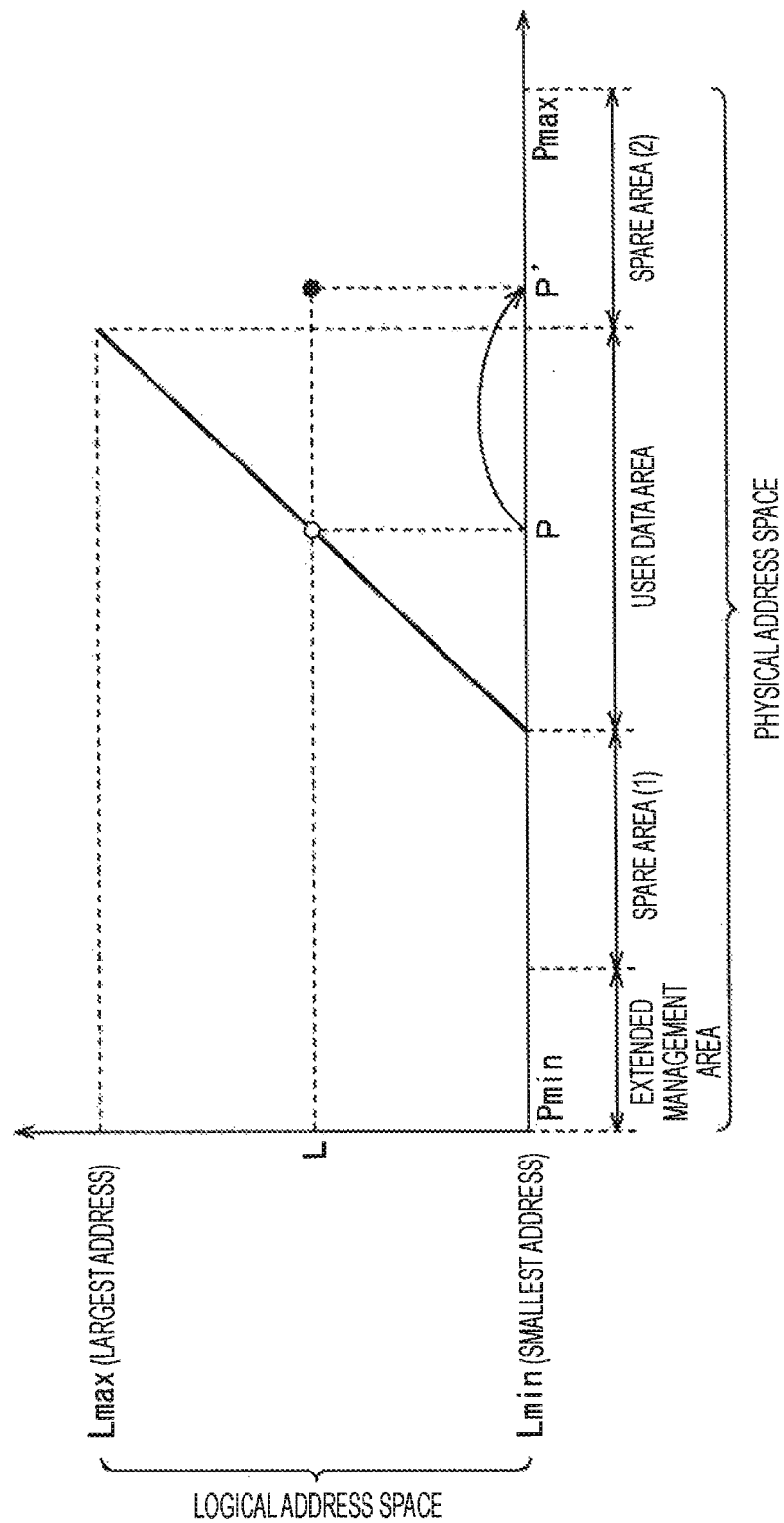
FIG. 16 is a diagram for explaining an alternation process.

On the other hand, when the data zone includes one extended management area and two spare areas in addition to the user data area and there is a defect in the user data area, the correspondence relationship between the logical address space and physical address space becomes as illustrated in FIG. 16 for example. Here, in FIG. 16, the vertical axis and horizontal axis represent LSNs and PSNs respectively.

In this example, since the area having a PSN of P in the user data area is a single defective area, an alternation process is performed in the defective area and the alternation process is not performed in other areas.

Thus, the area other than the area having a PSN of P in the user data area, the LSNs vary linearly with respect to the PSNs. Further, in the area having a PSN of P which is a defective area, an alternation process is performed and the area having a PSN of P' in the spare area serves as an alternative area of the defective area. In other words, to the area having a PSN of P' in the spare area, an LSN of L is allocated.

When an alternation process is performed in this manner, a DFL entry that indicates the PSN of P of the alternation subject and the PSN of P' of the alternative is generated and added to the DFL. In this case, the defective area having the PSN of P as an alternation subject is not seen from the logical address space.

Figure 17:
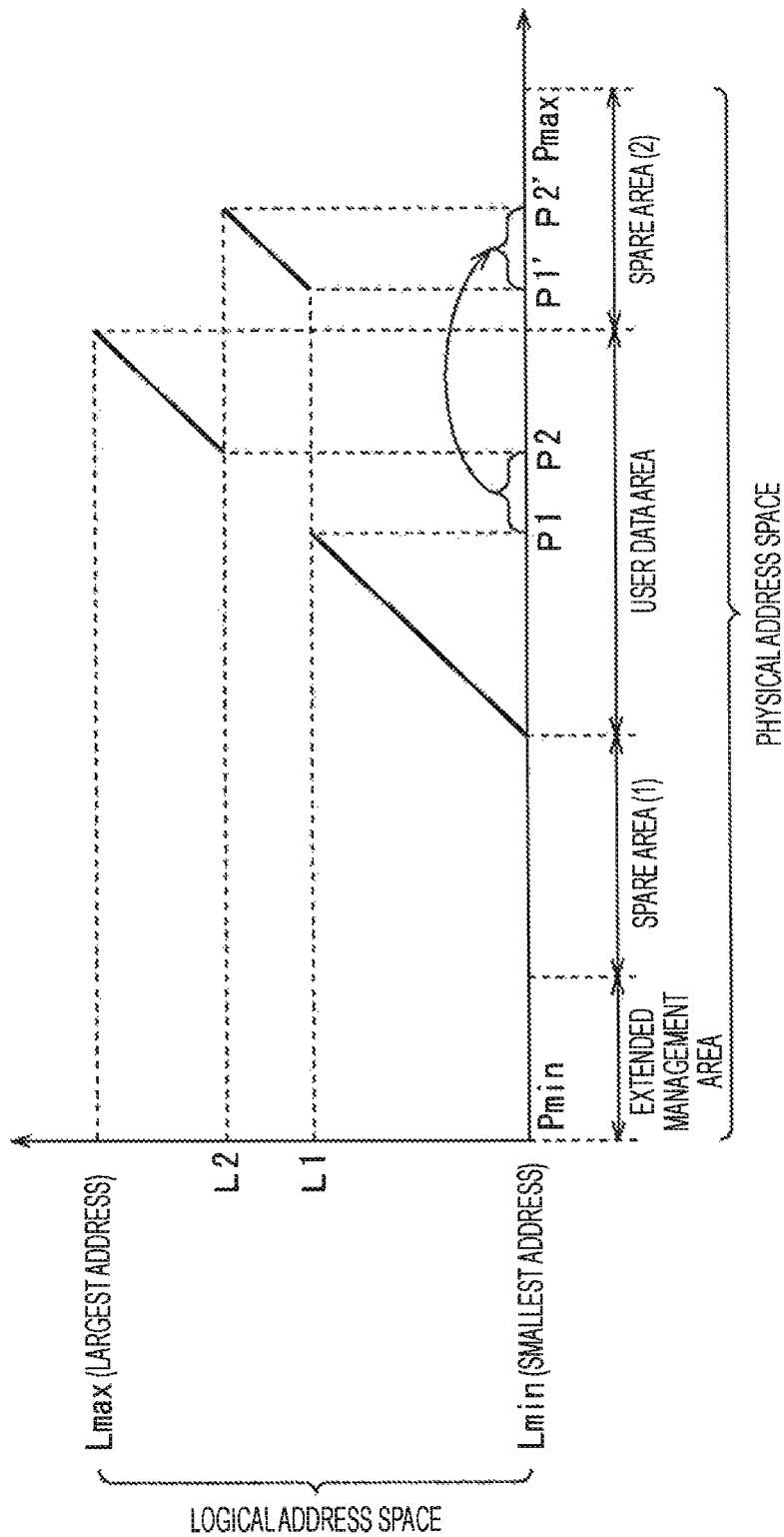
FIG. 17 is a diagram for explaining an alternation process.

Further, when one extended management area and two spare areas are provided in the data zone in addition to the user data area and there is a series defects in the user data area, the correspondence relationship between the logical address space and physical address space becomes as illustrated in FIG. 17 for example. Here, in FIG. 17, the vertical axis and horizontal axis represent LSNs and PSNs respectively.

In this example, since the areas having the PSN of P1 to P2 in the user data area are serial defective areas, an alternation process is performed in the serial defective areas and an alternation process is not performed in other areas.

Thus, the LSNs vary linearly with respect to the PSNs in the areas except for the area having the PSNs of P1 to P2 in the user data area. Further, in the areas having the PSNs of P1 to P2 which is defective areas, an alternation process is performed and the serial areas having the PSNs of P1' to P2' in the spare area serve as the alternative areas of the defective area. In other words, to the areas of the PSNs of P1' to P2' in the spare area, LSNs of L1 and L2 are allocated.

When the alternation process is performed in this manner, two (a pair of) DFL entries that indicate the areas having the PSN of P1 to P2 as alternation subjects and the areas having the PSN of P1' to P2' as alternatives are generated and added to the DFL. In this case, since the correspondence relationship between before and after the alternation of the serial defective area is expressed as a set of DFL entries regardless of the length (range) of the serial defective area, this can prevent the DFL from being expanded.

Here, when a recording operation is performed in more than one channel at the same time and defect occurs in more than one channel at the same time, there may be a problem that the spare areas are divided.

Figure 18:
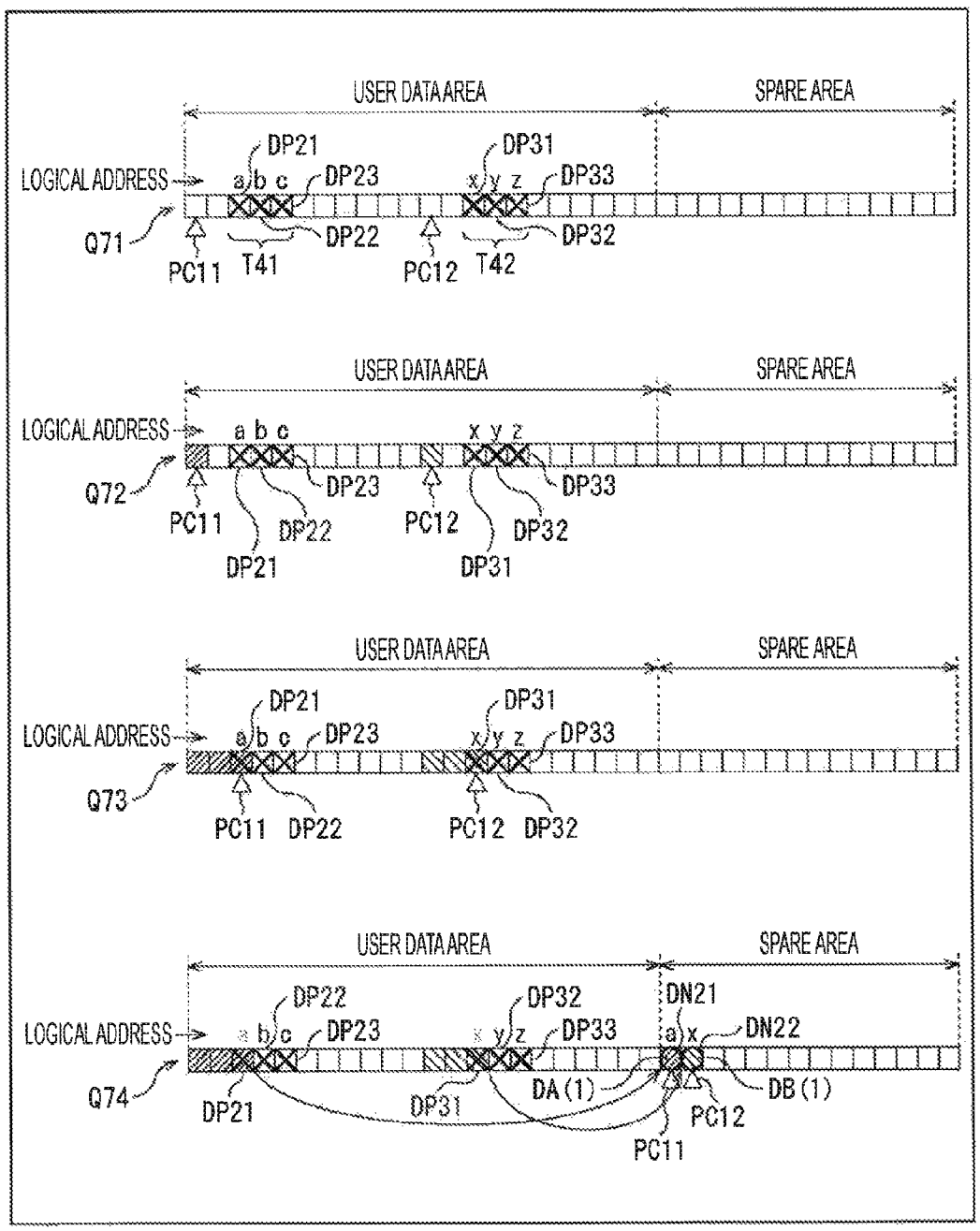
FIG. 18 is a diagram for explaining an alternation process.

For example, when the data zone includes a user data area and a spare area as indicated by the arrow Q71 of FIG. 18, it will be considered to divide one piece of data and record the data with the optical pickup PC11 of the channel A and the optical pickup PC12 of the channel B at the same time.

Here, in FIG. 18, each square represents one block in the recording area and, in this example, it is assumed that one block represents one sector. Further, in FIG. 18, the same reference numerals are applied to the parts corresponding to those in FIG. 3 and the explanation thereof will be omitted according to need.

In the example indicated by the arrow Q71, the area to which the optical pickup PC11 records data has a serial defective area T41, and similarly, the area to which the optical pickup PC12 records data has serial defective areas T42. Here, it is assumed that the optical pickups PC11 and PC12 record data toward the right side in the drawing.

Here, the serial defective area T41 are composed of three sectors DP21 to DP23 having the LSNs of a, b, and c, the serial defective area T42 is composed of three sectors DP31 to DP33 having the LSNs of x, y, and z.

In such a case, as indicated by the arrow Q72, it is assumed that the optical pickup PC11 and optical pickup PC12 write data from a predetermined sector toward the right side in the drawing at the same time. Then, as indicated by the arrow Q73, at the same time when the optical pickup PC11 finds the sector DP21 which is a defective area, the optical pickup PC12 finds the sector DP31 which is a defective area.

In such a case, as indicated by the arrow Q74, an alternation process is performed. In other words, the sector DN21 in the spare area is selected as an alternative of the sector DP21 and the data DA(1) which has been planned to be recorded to the sector DP21 as the alternation subject is recorded to the sector DN21 as an alternative by the optical pickup PC11. Further, the LSN of a which has been allocated to the sector DP21 is reallocated to the sector DN21.

Similarly, the sector DN22 in the spare area is selected as an alternative of the sector DP31 and the data DB(1) which has been planned to be recorded to the sector DP31 as an alternation subject is recorded to the sector DN22 as an alternative by the optical pickup PC12. Further, the LSN of x which has been allocated to the sector DP31 is reallocated to the sector DN22.

Figure 19:
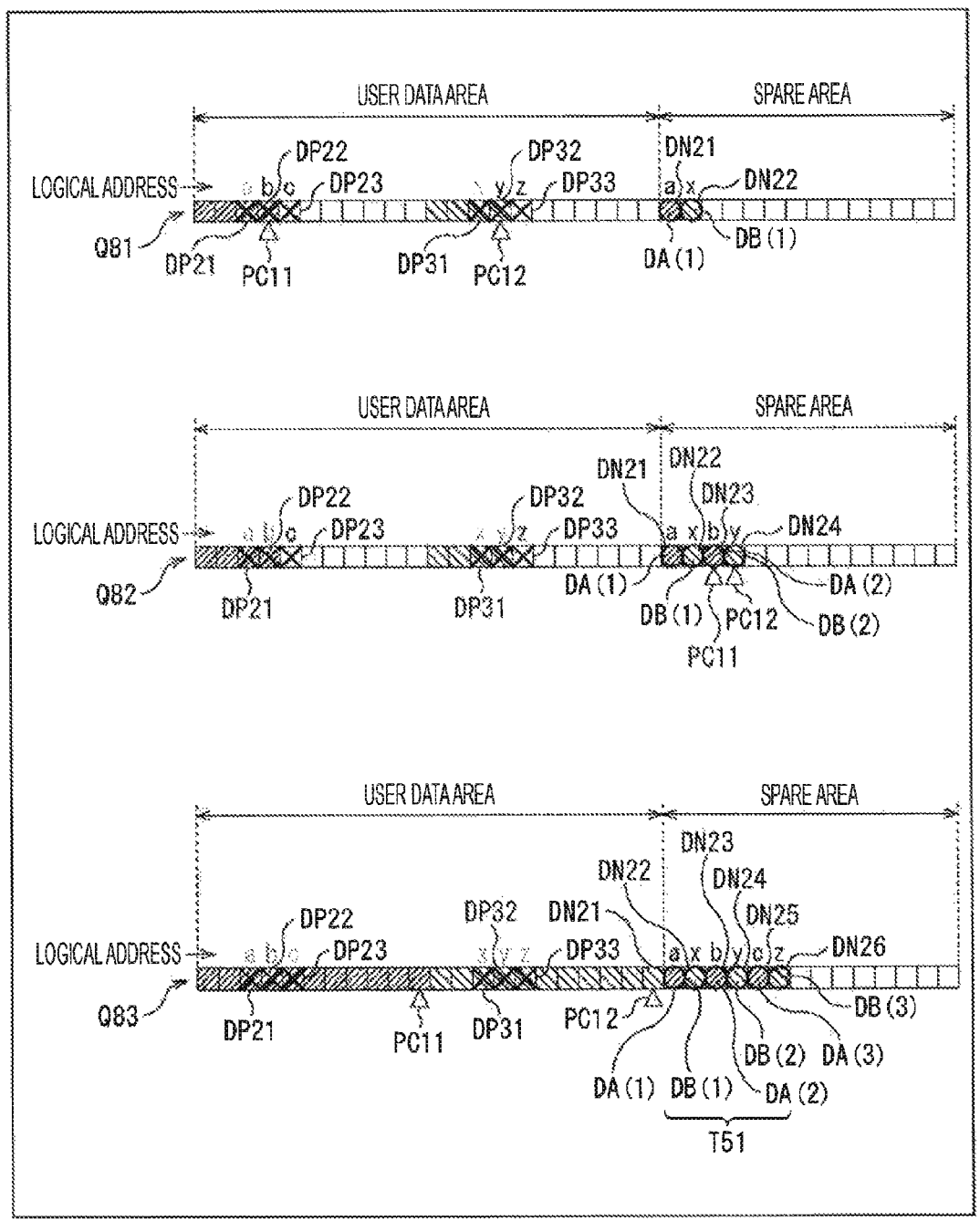
FIG. 19 is a diagram for explaining an alternation process.

When the alternation process is performed in this manner, as illustrated in FIG. 19, the optical pickup PC11 and optical pickup PC12 write data to areas after the sector DP21 and sector DP31 respectively. Here, in FIG. 19, the numeral references are applied to the parts corresponding to those in FIG. 18 and the explanation thereof will be omitted according to need.

In this example, as indicated by the arrow Q81, the optical pickups PC11 and PC12 try to write data in the sectors DP22 and DP32 respectively; however, those sectors are also defective areas, and this causes alternation processes at the same time again.

Then, as indicated by the arrow Q82, the sector DN23 in the spare area is selected as an alternative of the sector DP22, and the data DA(2) which has been planned to be recorded to the sector DP22 as the alternation subject is recorded to the sector DN23 as an alternative by the optical pickup PC11. Further, the LSN of b which has been allocated to the sector DP22 is reallocated to the sector DN23.

Similarly, the sector DN24 in the spare area is selected as an alternative of the sector DP32, and the data DB(2) which has been planned to be recorded to the sector DP32 as an alternation subject is recorded to the sector DN24 as an alternative by the optical pickup PC12. Further, the LSN of y which has been allocated to the sector DP32 is reallocated to the sector DN24.

Further, since the sectors DP23 and DP33 respectively following the sectors DP22 and DP32 are also defective areas, alternation processes are performed in those sectors and, as indicated by the arrow Q83, pieces of data of different channels are recorded alternately in the single area T51 in the spare area.

In other words, the sector DN25 in the spare area is selected as an alternative of the sector DP23 and the data DA(3) which has been planned to be recorded to the sector DP23 as an alternation subject is recorded to the sector DN25 as an alternative by optical pickup PC11. Further, the sector DN26 in the spare area is selected as an alternative of the sector DP33 and the data DB(3) which has been planned to be recorded to the sector DP33 as an alternation subject is recorded to the sector DN26 as an alternative by the optical pickup PC12.

When the serial defective areas are found in each channel at substantially same time, pieces of data of different channels are segmentalized and recorded in the single area T51 in the spare area. In other words, division of the spare area is caused.

Specifically, the data DA(1) to DA(3) are originally supposed to be continuously recorded and, similarly, the data DB(1) to DB(3) are originally supposed to be continuously recorded. However, in this example, since serial defects are found in the two channels at substantially same time, pieces of data which are originally supposed to be continuously recorded are segmentalized and recorded in the area T51.

Figure 20:
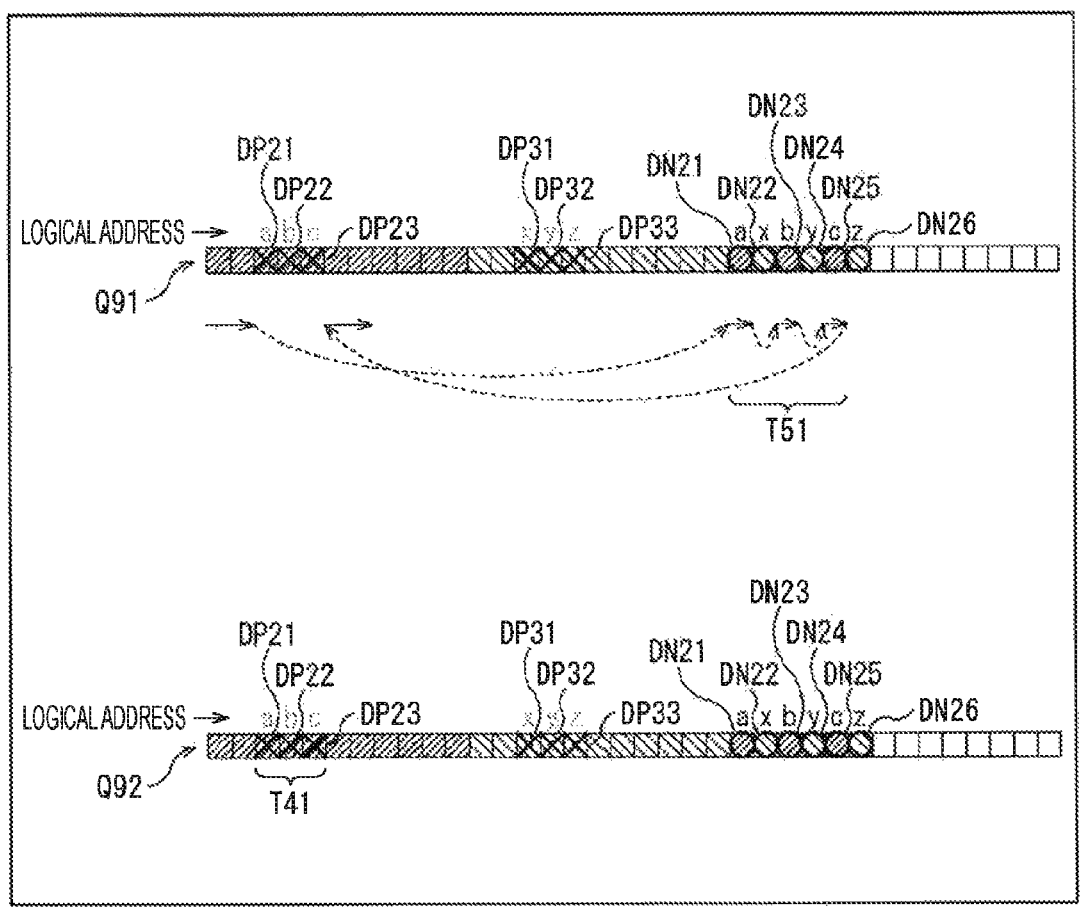
FIG. 20 is a diagram for explaining an alternation process.

When such a segmentation, which is division of data, occurs, this may cause a reduced data transfer speed or an expansion of the DFL for example, as illustrated in FIG. 20. Here, in FIG. 20, the same reference numerals are applied to the parts corresponding to those in FIG. 18 or 19 and the explanation thereof will be omitted according to need.

In this example, as indicated by the arrow Q91, among the pieces of data allocated to the channel A, the data DA(1) to DA(3) which are originally supposed to be recorded to the sectors DP21 to DP23 are recorded to the sectors DN21, DN23, and DN25 by the alternation process. Thus, when the data is reproduced in the channel A, as indicated by the solid arrows and dotted arrows in the drawing, after starting to read data and data is read from the sector immediately before the sector DP21, a seek operation for the sector DN21 is performed and data is read from the sector DN21. Further, after the seek operation to the sector DN23 is performed and data is read, a seek operation to the sector DN25 is performed and data is read, and a seek operation for a sector immediately after the sector DP23 is further performed.

When data is segmentalized in this manner, a local seek frequently occurs in the area T51 in the spare area and this reduces the data transfer speed (reproduction speed).

Further, as indicated by the arrow Q92, the alternatives of the area T41 which is composed of sequential sectors become the sectors DN21, DN23, and DN25, which are non-sequential areas so that more DFL entries are needed and the consumption of the DFL increases.

Thus, according to the present technology, sequential areas serving as alternatives are saved in each channel and, by keeping the saved sequential areas for each channel, segmentation of data by the alternation process is prevented and the data transfer speed is improved.

Figure 21:
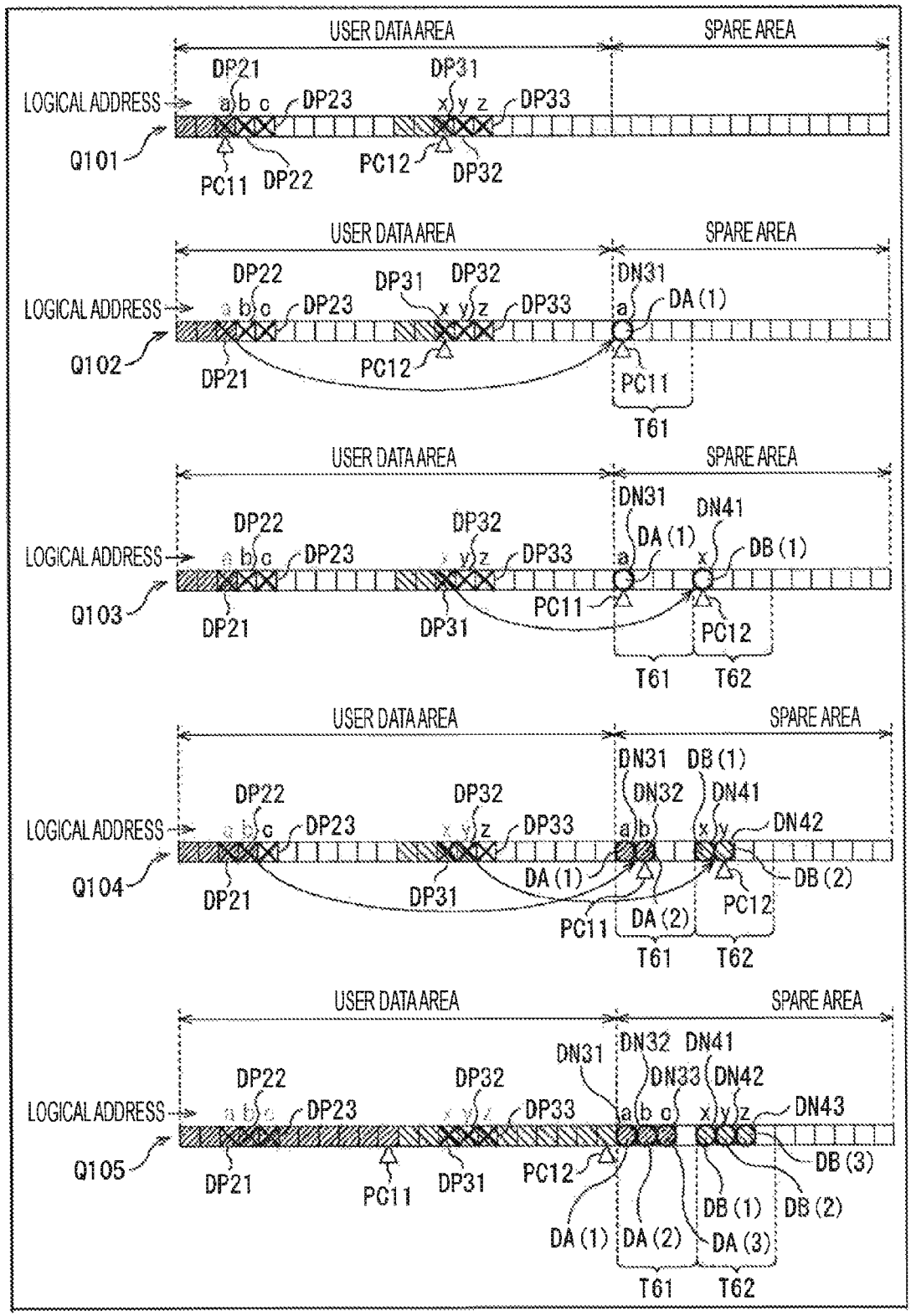
FIG. 21 is a diagram for explaining an alternation process.

For example, as indicated by the arrow Q101 of FIG. 21, in a case that the data zone includes a user data area and a spare area, one piece of data is divided and recorded by the optical pickup PC11 of the channel A and the optical pickup PC12 of the channel B at the same time. Here, in FIG. 21, the same reference numerals are applied to the parts corresponding to those in FIGS. 18 to 20 and the explanation thereof will be omitted according to need.

As indicated by the arrow Q101, it is assumed that the optical pickups PC11 and PC12 write data toward the right side in the drawing and, at the same time the optical pickup PC11 reaches the sector DP21 which is a defective area, the optical pickup PC12 reaches the sector DP31 which is a defective area.

In this case, as indicated by the arrow Q102, the sequential area T61 is saved as an alternative area for the channel A and an alternation process is performed. In other words, the sector DN31 in the beginning of the sequential area T61 is selected as an alternative of the sector DP21 and the data DA(1) which is originally supposed to be recorded in the sector DP21 is recorded to the sector DN31 as an alternative.

Further, at substantially same time with the above, as indicated by the arrow Q103, the sequential area T62 Is saved as an alternative area for the channel B and an alternation process is performed. In other words, the sector DN41 in the beginning of the sequential area T62 is selected as an alternative of the sector DP31, and the data DB(1) which is originally supposed to be recorded to the sector DP31 is recorded to the sector DN41 as an alternative.

Then, when the data writing starts again, an alternation process is performed in the channel A again since the sector DP22 following the sector DP21 is also a defective area and, similarly, an alternation process is performed also in the channel B again since the sector DP32 following the sector DP31 is also a defective area.

Then, as indicated by the arrow Q104, the sector DN32 which is in the second in the sequential area T61 is selected as an alternative of the sector DP22 and the data DA(2) which is originally supposed to be recorded to the sector DP22 is recorded to the sector DN32 as an alternative. Similarly, the sector DN42 which is in the second in the sequential area T62 is selected as an alternative of the sector DP32 and the data DB(2) which is originally supposed to be recorded to the sector DP32 is recorded to the sector DN42 as an alternative.

Further, alternation processes are performed since the sector DP23 following the sector DP22 and the sector DP33 following the sector DP32 are also defective areas. As a result, as indicated by the arrow Q105, the data DA(3) which is originally supposed to be recorded to the sector DP23 is recorded to the sector DN33 as an alternative in the sequential area T61, and the data DB(3) which is originally supposed to be recorded to the sector DP33 is recorded to the sector DN43 as an alternative in the sequential area T62.

Here, in a case that the user data is recorded to the entire area maintained in the spare area saved for a predetermined channel and the area is all consumed, when a new defect is found after that, a new area in the spare area is saved for the predetermined channel and the area is used as an alternative.

Further, the sequential spare area saved for the predetermined channel, is released when the alternation process for a single defective area or serial defective areas in the predetermined channel is finished and, after that, the spare area may be kept available for any other channels.

When a dedicated sequential area is saved for each channel for an alternation process in this manner, the serial defective area in the user data area is alternated by the sequential area in the spare area.

With this configuration, even when an alternation process is performed in more than one channel at substantially same time, since sequential defects can be alternated to sequential alternative areas, this improves the data transfer speed and prevents the DFL from being expanded.

Here in FIG. 21, a case that the simulated zones are not used in the user data area has been explained; however, even in a case that simulated zones are used in the user data area or the like, similarly, by saving sequential alternation areas for each channel, serial defective areas in simulated zones can be alternated to sequential alternation areas. This improves the data transfer speed and prevents the DFL from being expanded.

<About Spare Area>

Further, according to the present technology, it has been explained that, when an alternation process is performed, sequential areas in a spare area are saved for a channel in which an alternation process is performed; however, it can be arbitrarily determined how many areas can be saved for each channel at the same time or how the user data are recorded in the spare area.

Figure 22:
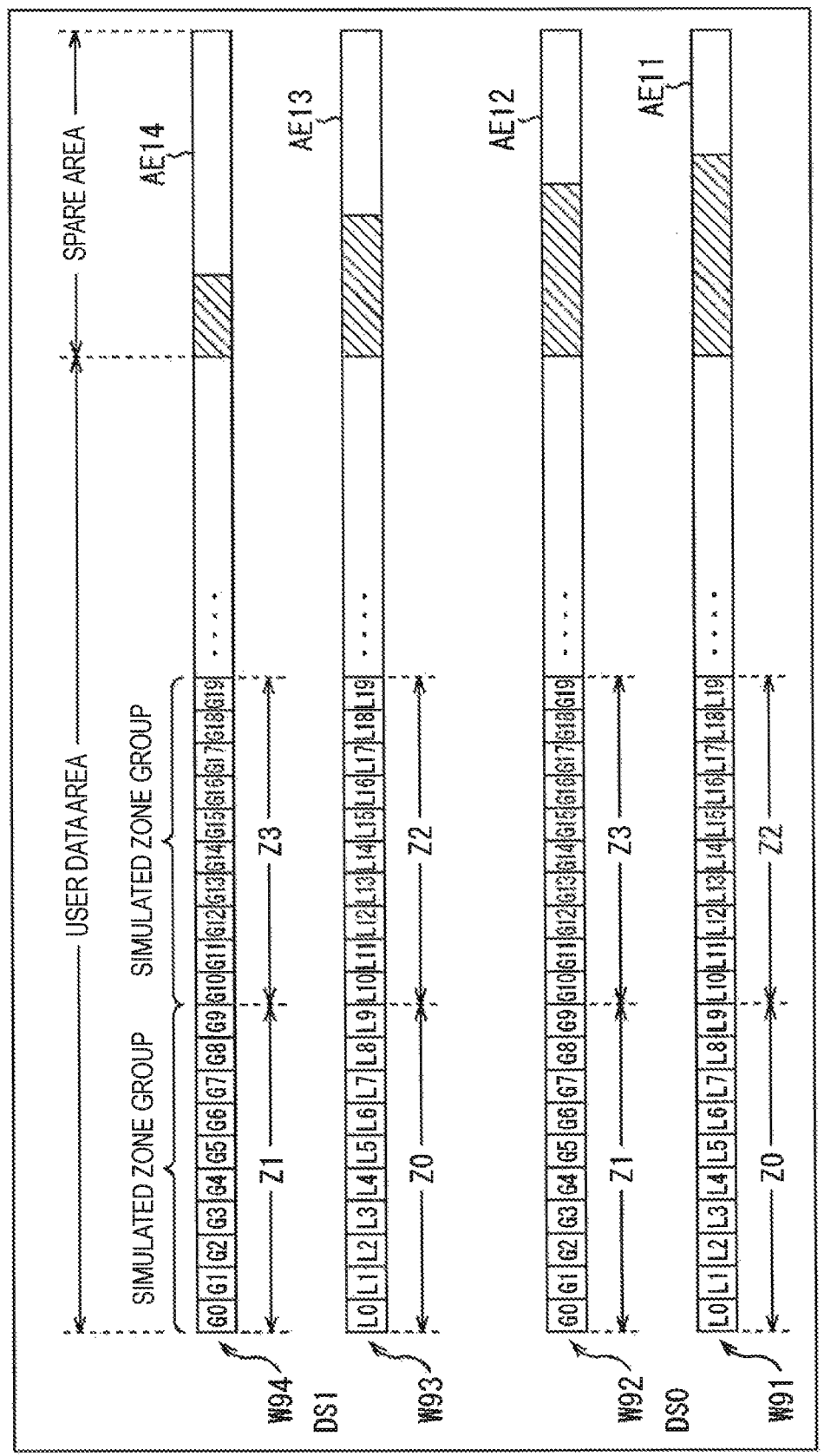
FIG. 22 is a diagram for explaining a spare area saving.

For example, in a case the optical disk as a recording/reproducing target is a write-once optical disk that has two faces in front and rear sides, which are a DS0 face and a DS1 face, and is in a land/groove format in which a recording area is provided on lands and grooves respectively, a spare area can be used as illustrated in FIG. 22.

Here, in this example, regarding the optical disk, accesses are performed to the optical disk in four channels in total including two channels on each side at the same time and the respective channels are referred to as channels A to D, respectively. Further, it is assumed that the writing and reading to and from the DS0 face of the optical disk is performed by the channels A and B and writing and reading to and from the DS1 face of the optical disk is performed by the channels C and D.

In FIG. 22, the recording areas indicated by the arrows W91 to W94 represent recording areas provided to the land on the DS0 face, the groove on the DS0 face, the land on the DS1 face, and the groove on the DS1 face respectively, and in those recording areas, a user data area and a spare area are provided. Here, in this example, a part of areas such as an inner zone or the like is not illustrated.

Here, the land on the DS0 face indicated by the arrow W91 and the groove on the DS0 face indicated by the arrow W92 are provided in a same recording layer and, similarly, the land on the DS1 face indicated by the arrow W93 and the groove on the DS1 face indicated by the arrow W94 are provided on a same recording layer.

Further, each square in the respective recording areas represents one physical sector and the numbers in each physical sector represent PSNs. In this case, to the recording areas of the land and groove in each recording layer, continuous PSNs are allocated respectively.

Further, in this example, simulated zones are set in the user data area, and simulated zones are not set in the spare area. Then, a simulated zone Z0 provided to the land on the DS0 face, a simulated zone Z1 provided to the groove on the DS0 face, a simulated zone Z0 provided to the land on the DS1 face, and a simulated zone Z1 provided to the groove on the DS1 face are set as one simulated zone group.

In such a case, for example, each optical pickup of the channels A to D writes and reads user data to and from the simulated zone Z0 on the DS0 face, the simulated zone Z1 on the DS0 face, the simulated zone Z0 on the DS1 face, and the simulated zone Z1 on the DS1 face respectively.

Further, in this example, spare areas AE11 to AE14 are proved in each recording area, and when an alternation process is performed, four spare areas at a maximum can be saved at the same time. Here, the shaded areas in the spare areas AE11 to AE14 are areas already used as alternatives, which are the areas in which user data is recorded. Thus, the position at the right side end of the shaded area in the drawing is the position where recording can be started next, which is the position of next writable address (NWA).

Further, for example, when an alternation process is performed in a predetermined channel, a spare area, among the spare areas AE11 to AE14, which has the smallest amount of recorded user data and is not currently saved is kept as a spare area (alternation area) that the predetermined channel uses.

More specifically, for example, in FIG. 22, the spare area which has the smallest amount of recorded user data, that is, a spare area having a smallest NWA, is the spare area AE14. Further, the spare area that has the second smallest amount of recorded user data is the spare area AE13.

At this time, recording the user data to each simulated zone is performed at the same time in the channels A to D. In this condition, any of the spare areas is not saved yet. Then, it is assumed that recording of the user data proceeds and an alternation process occurs in the channel A.

In such a case, the spare area AE14 having the smallest NWA is save as a spare area to be used in the channel A in the alternation process. Then, an alternative area in the spare area AE14 is defined for the area (defective area) in the simulated zone in which recording of the user data in the channel A is failed, and the user data is recorded to the alternative area by the channel A. In this case, the alternative area is an area beginning with the NWA.

In a condition that the spare area AE14 is saved for the channel A in this manner, other channels than the channel A cannot use the area in the spare area AE14 as an alternative area.

Further, while the spare area AE14 is being saved, that is, while the user data is being written to the spare area AE14 in the alternation process, it is assumed that an alternation process occurs in the channel B. In this case, among the spare areas AE11 to AE13 which are not currently saved, the spare area AE13 having the smallest NWA is saved for the channel B, and the user data is recorded to the area as an alternative in the spare area AE13 by the channel B.

After that, when the alternation process by the channel A ends, the spare area AE14 which has been saved for the channel A is released and, similarly, when the alternation process by the channel B ends, the spare area AE13 which has been saved for the channel B is released.

When the spare area is saved in this manner, the user data allocated to different channels, which is the user data which is originally supposed to be recorded in a different recording layer or simulated zone, may be recorded in a same spare area by alternation processes.

Further, for example, when a spare area is saved by a predetermined channel and an alternation process is being performed and there is no more empty area (area with no recorded data) in the spare area, a new spare area is saved for the predetermined channel. In this case, although the spare area which has been saved is released, there are few recordable areas left and the user data cannot be recorded to the spare area after that.

Here, in the example illustrated in FIG. 22, for example, in a case that recording is performed in eight channels at the same time, when an alternation process is performed at the same time in more than four channels, there may be a channel which has to stand by until one of the spare areas is released. Further, in FIG. 22, simulated zones may be set in the spare area.

Figure 23:
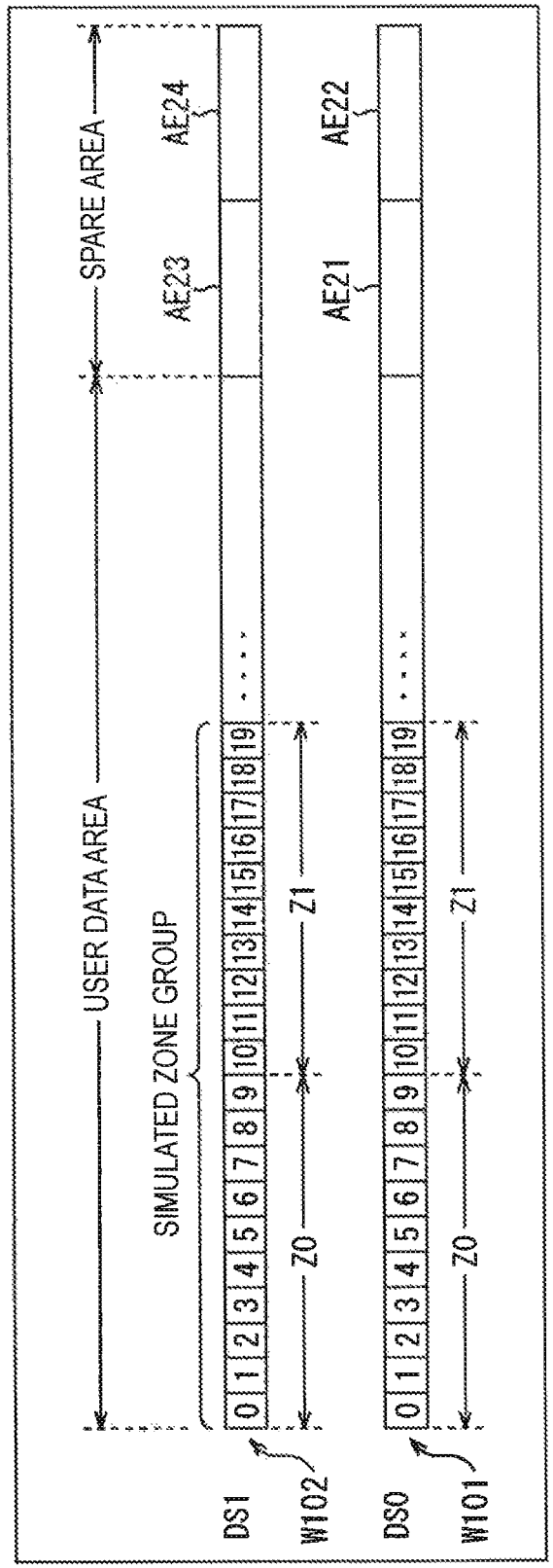
FIG. 23 is a diagram for explaining a spare area saving.

Further, for example, in a case that the optical disk as a recording/reproducing target is an optical disk which has two faces in the front and back sides of the DS0 face and DS1 face and has a recording area provided to one of the land or groove, the spare area can be used as illustrated in FIG. 23.

In FIG. 23, the recording areas indicated by the arrows W101 and W102 represent the recording areas provided on the DS0 face and DS1 face respectively, and in the recording areas, a user data area and a spare area are provided. Here, in this example, a part of areas such as an inner zone or the like is not illustrated. Further, each square in the respective recording areas represents one physical sector and the number in each physical sector represents a PSN.

Here, similarly to the case in FIG. 22, regarding the optical disk, it is assumed that accesses to the optical disk are performed at the same time in four channels in total including two channels on each face. Specifically, writing and reading on the DS0 face of the optical disk is performed by the channels A and B and writing and reading on the DS1 face of the optical disk is performed by the channels C and D.

In FIG. 23, simulated zones are set in the user data area, and simulated zones are not set in the spare area. Then, one simulated zone group is composed of a four simulated zones including simulated zones Z0 and Z1 in the recording area provided on the DS0 face and simulated zones Z0 and Z1 in the recording area on the DS1 face.

In this case, for example, by the optical pickups of the channels A to D, user data is written and read to and from the simulated zone Z0 on the DS0 face, simulated zone Z1 on the DS0 face, the simulated zone Z0 on the DS1 face, and the simulated zone Z1 on the DS1 face respectively.

Further, in this example, the entire spare area on the DS0 face is divided into two and formed as spare areas AE21 and AE22 and, similarly, the entire spare area on the DS1 face is divided into two and formed as spare areas AE23 and AE24.

Here, it is assumed that the spare areas AE21 to AE24 are saved or released similarly to the above described case of FIG. 22.

In such a case, for example, it is assumed that recording of user data to the respective simulated zones is started at the same time in the channels A to D and an alternation process occurs in the channel A.

Accordingly, a spare area having the smallest amount of the recorded user data among the spare areas AE21 to AE24 is saved and user data is recorded to the area as an alternative in the spare area by the channel A. Here, for example, it is assumed that the spare area AE21 is saved for the channel A.

Further, in a condition that the spare area AE21 is being saved, when an alternation process occurs in the channel B, a spare area having the smallest amount of recorded user data among the rest of the spare areas AE22 to AE24 is saved and the user data is recorded by the channel B.

Also in this example, similarly to the case of FIG. 22, in a case that the spare area is saved for the predetermined channel and an alternation process is performed, when there is no more empty area in the spare area, a new space area is saved for the predetermined channel.

Figure 24:
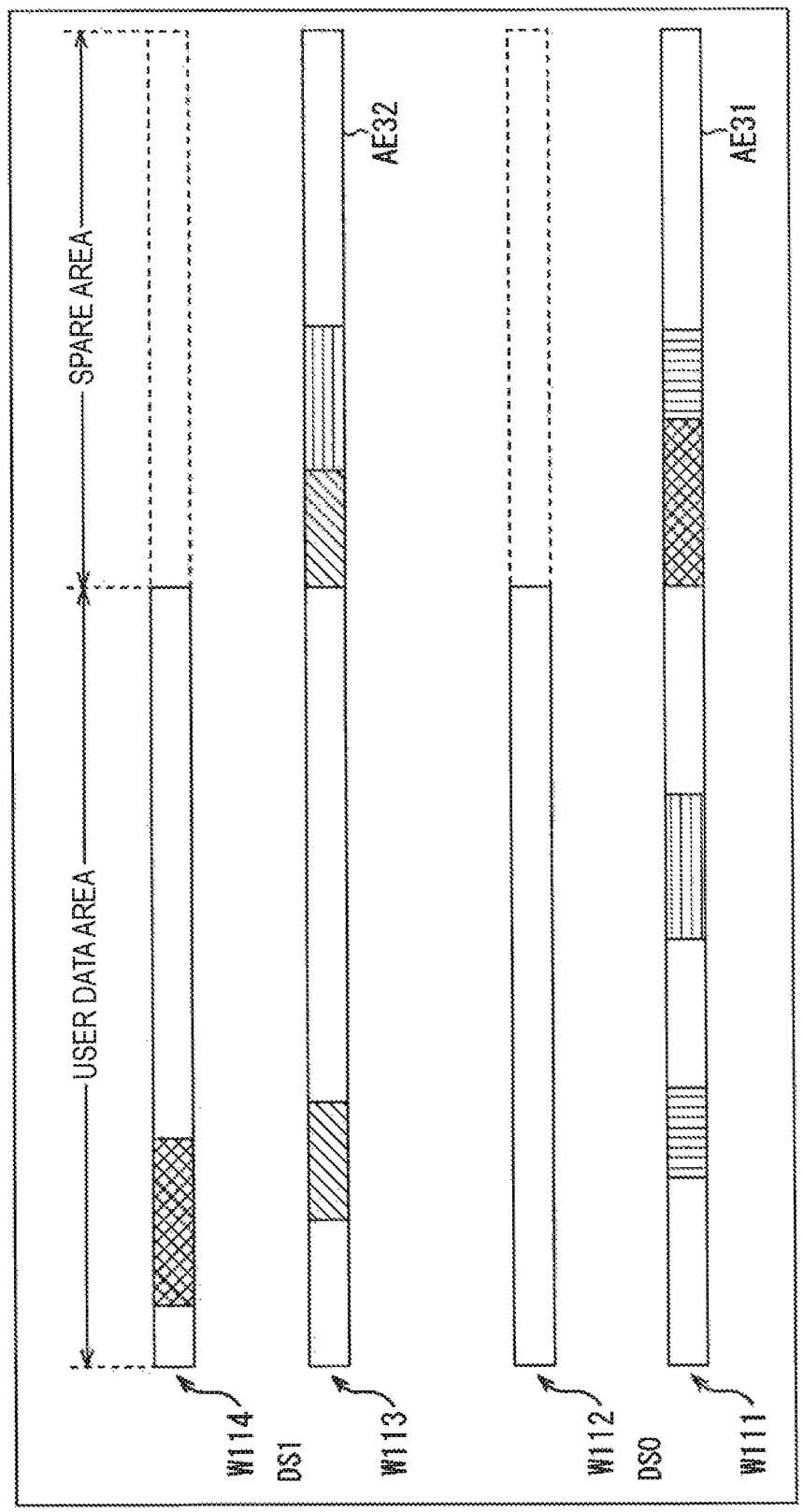
FIG. 24 is a diagram for explaining a spare area saving.

Further, for example, in a case that the optical disk is a write-once optical disk in a land/groove format similarly to the case of FIG. 22, the spare area can be used as illustrated in FIG. 24.

Also in this example, similarly to the case of FIG. 22, it is assumed that accesses to the optical disk are performed in four channels in total including the channels A to D.

In FIG. 24, the recording areas indicated by the arrows Will to W114 represent recording areas provided to the land on the DS0 face, the groove on the DS0 face, the land on the DS1 face, and the groove on the DS1 face respectively. Here, the hatched areas in the respective recording areas represent areas which are the areas as an alternation subject or an area used as an alternative.

Further, in this example, the spare area AE31 is provided to the recording area provided to the land on the DS0 face, the spare area AE32 is provided to the recording area provided to the land on the DS1 face, and the recording areas provided to the grooves are not used as spare areas. Specifically, the spare areas AE31 and AE32 are areas composed of physical sectors having continuous PSNs respectively.

Thus, in this example, during an alternation process, two spare areas at a maximum can be saved at the same time. When saving a spare area, a spare area which has a smallest amount of recorded user data (smallest NWA) and is not currently saved is saved.

For example, it is assumed that, in a condition that any of the spare areas is not saved and the spare area having the smallest NWA is the spare area AE31, user data is being recorded to the respective simulated zones at the same time in the channels A to D.

In this case, when an alternation process occurs in the channel A, the spare area AE31 is saved for the channel A, the user data is recorded to the area set as an alternative of the spare area AE31. After that, when the alternation process by the channel A ends, the spare area AE31 which has been saved for the channel A is released.

Further, in a condition that the spare areas AE31 and AE32 are being saved, when an alternation process newly occurs in a predetermined channel, the predetermined channel is kept to stand by until one of the spare areas is released.

When a spare area is saved in this manner, the user data allocated to different channels, that is, the user data which is originally supposed to be recorded to different recording layers or simulated zones may be recorded in a same spare area by alternation processes.

Further, for example, while a spare area is being saved by a predetermined channel and an alternation process is being performed, when there is no more empty area in the spare area, a new spare area is saved for the predetermined channel.

Here, in the example of FIG. 24, it has been explained that the spare area having a smallest NWA among the two spare areas is preferentially saved; however, a spare area placed in the same recording layer as the recording layer where an alternation process may be preferentially saved. This is because, when the recording layer to be recorded or reproduced is changed in general, a servo system needs to be readjusted accordingly and it is more efficient if the alternation subject and the alternative are in the same recording layer.

Further, spare areas may be saved in a unit of predetermined blocks. For example, in a case that the optical disk is a write-once optical disk having a land/groove format similarly to the case of FIG. 22, the spare area may be used as illustrated in FIG. 25.

Also in this case, similarly to the case of FIG. 22, access to the optical disk is performed by four channels in total including the channels A to D. Further, the optical pickups of the channels A and B are provided to a head A and the optical pickups of the channels C and D are provided to a head B.

Figure 25:
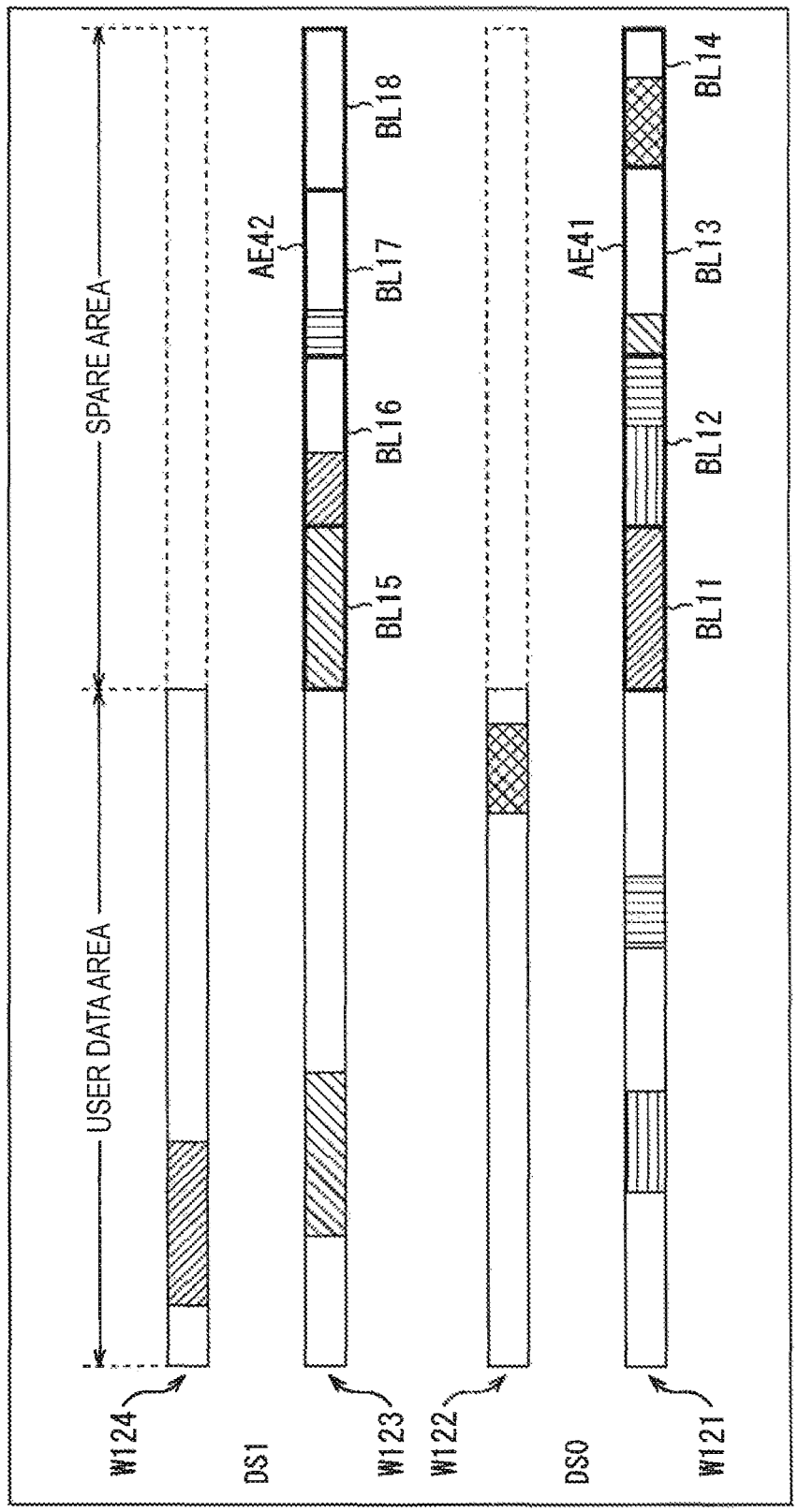
FIG. 25 is a diagram for explaining a spare area saving.

In FIG. 25, the recording areas indicated by the arrows W121 to W124 represent recording areas provided to the land on the DS0 face, the groove on the DS0 face, the land on the DS1 face, and the groove on the DS1 face respectively. Here, in this example, a part of the areas such as an inner zone or the like is not illustrated and the hatched areas in the respective recording areas represent the areas as an alternation subject or an area used as an alternative.

Further, in this example, the spare area AE41 is provided to the recording area provided to the land on the DS0 face, the spare area AE42 is provided to the recording area provided to the land on the DS1 face, and the recording areas provided to the grooves are not used as spare areas. Particularly, the spare areas AE41 and AE42 are areas composed of physical sectors having continuous PSNs respectively.

Further, the spare areas AE41 and AE42 are used by being divided into blocks in a predetermined size. In this example, the spare area AE41 is divided in four blocks BL11 to BL14, and the spare area AE42 is divided into four blocks BL15 to BL18. Then, the respective blocks are saved for the respective channels.

It is noted that to the blocks, only the data allocated to a same head can be recorded. For example, it is assumed that the block BL11 is used by the channel A and user data is recorded to the block BL11 in an alternation process. In this case, when an empty area, which is an unused recording area is in the block BL11, the user data can be written to the empty area only by the channel A or B in an alternation process and cannot be written by the channel C or D.

When the user data is written to the user data area, for example, four blocks having small NWAs are used as the savable blocks which can be saved. When an alternation process occurs in a predetermined channel, a block which can be used (can be written) by the predetermined channel and is not currently saved among those savable blocks is selected.

Further, the block having the smallest NWA among the selected blocks is saved as an alternation area that the predetermined channel uses in the alternation process. Then, the user data is recorded to the saved block in the predetermined channel by the alternation process and, when the alternation process ends, the block which has been saved is released.

In the example illustrated in FIG. 25, there is an unused recording area and the blocks BL13, BL14, BL16, and BL17 having small NWAs are savable blocks. Here, for example, in the blocks BL14 and BL17, user data which is written by the channel A or B provided to the head A is recorded. Thus, the blocks BL14 and BL17 are blocks which can be used only by the channel A or B as a spare area.

Here, for example, while a block is being saved by a predetermined channel and an alternation process is being performed, when there is no more empty area in the block, a new block is saved for the predetermined channel. Further, for example, in a case that recording is performed at the same time in eight channels and there is not a savable block when an alternation process occurs in a predetermined channel, the predetermined channel is kept to stand by until one of the blocks is released.

Figure 26:
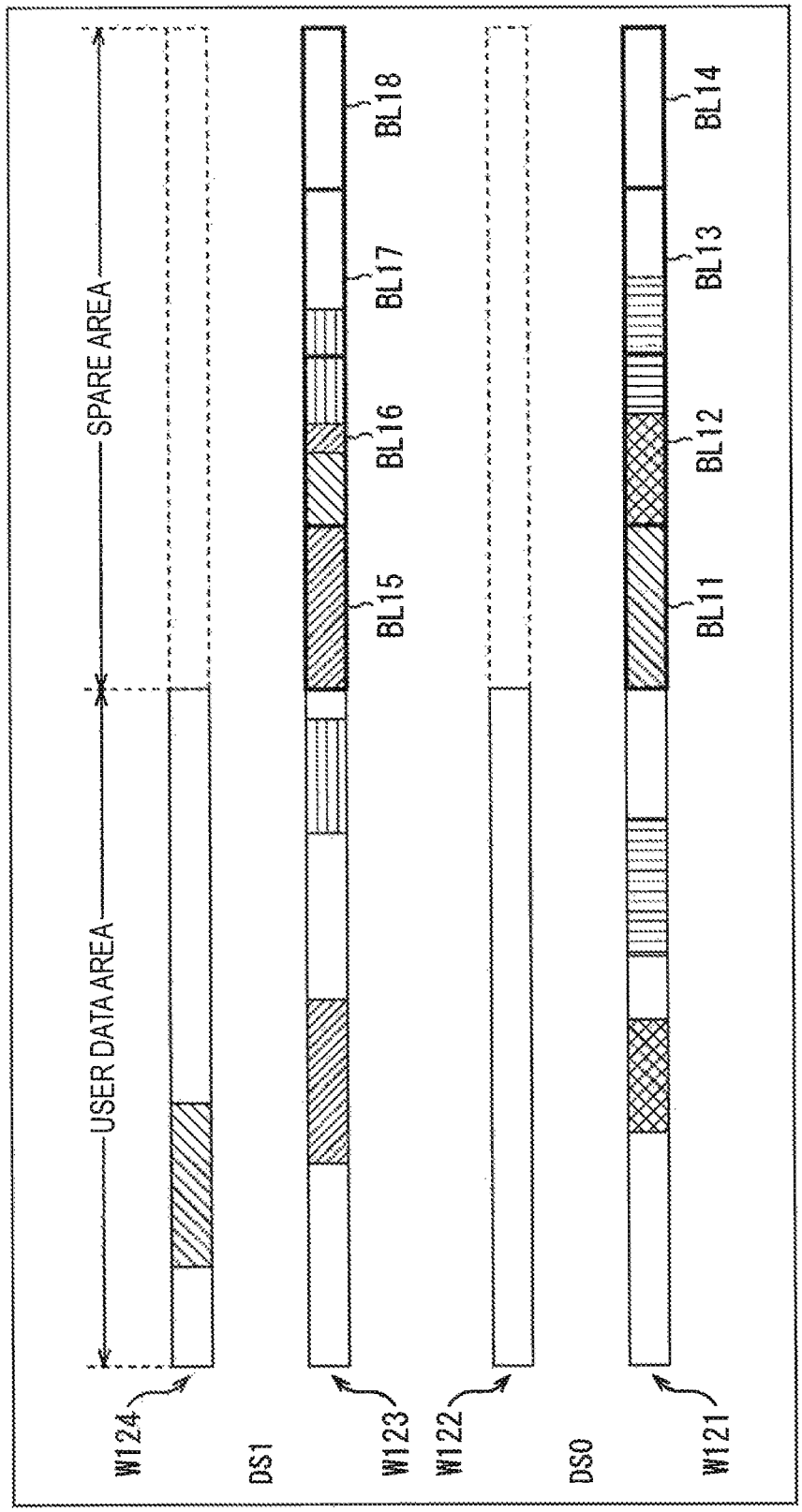
FIG. 26 is a diagram for explaining a spare area saving.

Further, in FIG. 25, it has been explained that only channels provided to a same head can use one block, however, as illustrated in FIG. 26, user data may be written to one block by all the channels.

Here, in FIG. 26, the same reference numerals are applied to the parts corresponding to those in the case of FIG. 25 and the explanation thereof will be omitted according to need. Further, the hatched areas in the respective recording areas represent the areas as an alternation subject or an area used an alternative.

In the example illustrated in FIG. 26, when user data is written to the user data area, for example, the four blocks having small NWAs are savable blocks. Then, when an alternation process occurs in a predetermined channel, a block, among the savable blocks, which has a smallest NWA and is not currently saved, is saved for the predetermined channel and the user data is recorded to the saved block by the alternation process. Further, when the alternation process ends, the block, which has been saved, is released.

In the example illustrated in FIG. 26, there is an unused recording area, and the blocks BL13, BL14, BL17, and BL18 having small NWAs are savable blocks.

Here, among the savable blocks, the block having a smallest NWA is the block BL17. Thus, for example, when an alternation process occurs in a condition that the blocks BL13, BL14, BL17, and BL18 are savable, the block BL17 is saved as an alternative area and used. At this timing, although user data written by the channel C is already recorded in the block BL17, any other channels can use the empty area in the block BL17.

Here, for example, while a block is being saved for a predetermined channel and an alternation process is being performed, when there is no more empty space in the block, a new block is saved for the predetermined channel.

Further, for example, when recording is performed in eight channels or the like, savable blocks may be prepared for the number of the channels that perform recording at the same time, or the number of the savable blocks may be fewer than the number of the channels that perform recording at the same time. In a case that the number of savable blocks is fewer than the number of the channels that perform recording at the same time, when an alternation process occurs but all the blocks are being saved, there may be a channel kept to stand by until one of the blocks is released.

<Configuration Example of Recording/Reproducing System>

Next, a specific embodiment of a recording/reproducing system to which the present technology is applied will be described. The recording/reproducing system to which the present technology is applied is configured as illustrated in FIG. 27 for example.

Figure 27:
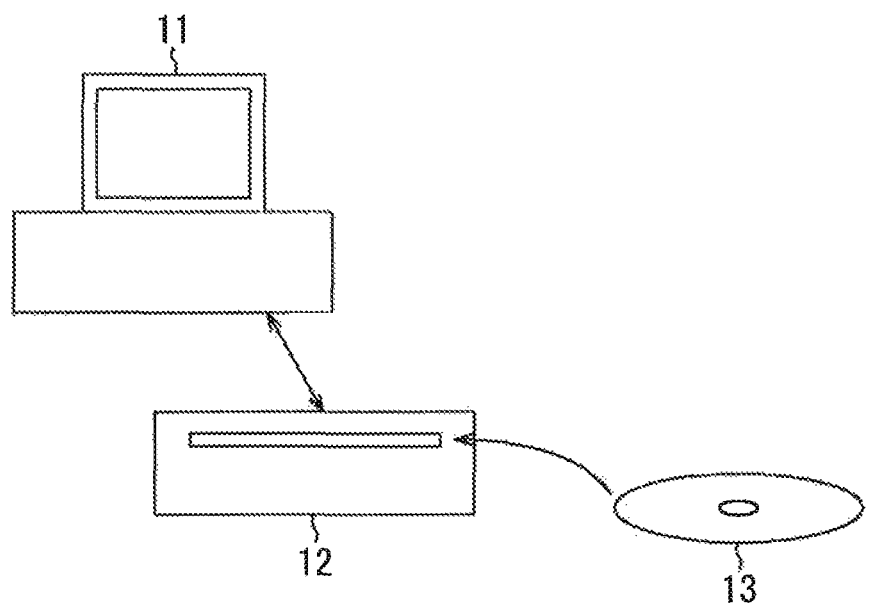
FIG. 27 is a diagram illustrating a configuration example of a recording/reproducing system.

The recording/reproducing system illustrated in FIG. 27 includes a host computer 11, a recording/reproducing device 12, and an optical disk 13.

The host computer 11 accepts an operation of an administrator or the like for example, exchanges various information or data with the recording/reproducing device 12, and instructs the recording/reproducing device 12 to record or reproduce user data to the optical disk 13. For example, the host computer 11 instructs the recording/reproducing device 12 about the size or stripe length or the like of each area such as an extended management area, a spare area, a simulated zone or the like.

The recording/reproducing device 12 records user data to an optical disk 13, which is inserted to the recording/reproducing device 12 or provides various data read from the optical disk 13 to the host computer 11, according to an instruction from the host computer 11.

The optical disk 13 is, for example, a write-once optical disk or the like which has two faces of a front side and a rear side and has a land/groove format and, as described above, in the recording area of the optical disk 13, simulated zones or simulated zone groups, which are managed by the recording/reproducing device 12, are virtually provided.

<Configuration Example of Optical Disk>

Here, a specific configuration example of the optical disk 13 will be described. For example, the optical disk 13 includes a plurality of recording layers as illustrated in FIG. 28.

Figure 28:
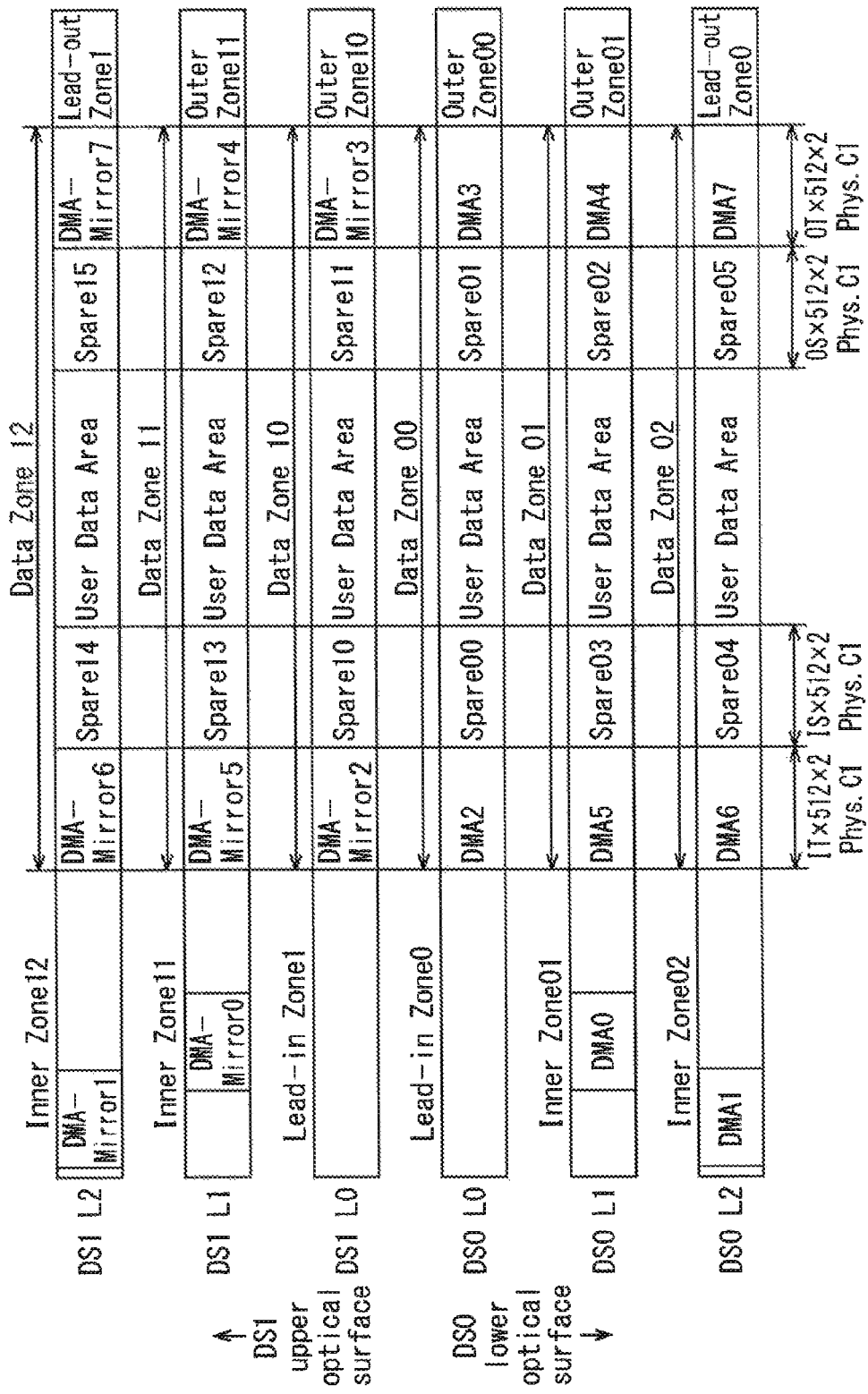
FIG. 28 is a diagram illustrating a configuration example of an optical disk.

In FIG. 28, the left side in the drawing represents an inner periphery side of the optical disk 13 and the right side in the drawing represents an outer periphery side in the optical disk 13. Further, the optical disk 13 has a DS0 face and a DS1 face and data can be written and read to and from those faces at the same time.

The DS0 face of the optical disk 13 includes an L0 layer, an L1 layer, and an L2 layer and, similarly the DS1 face includes an L0 layer, an L1 layer, and an L2 layer. In the example of FIG. 28, in order from the above to below in the drawing, there are the L2 layer on the DS1 face, the L1 layer on the DS1 face, the L0 layer on the DS1 face, the L0 layer on the DS0 face, the L1 layer on the DS0 face, and the L2 layer on the DS0 face.

It is noted that, hereinafter, when it is not particularly needed to distinguish if each layer is on the DS0 face or the DS1 face, it is also simply referred to as a layer. Thus, for example, when it is referred to as L1 layer, it represents the L1 layer on the DS0 face, the L1 layer on the DS1 face, or the L1 layers on the DS0 face and DS1 face.

Each layer on the DS0 face and DS1 face mainly include a user data area, a spare area, and a disk management area (DMA) or a DMA-Mirror area. Here, the spare area and a part of the DMA area and DMA-Mirror area are variable areas which can be arbitrarily set by an administrator or the like and are not necessarily provided.

The user data area is an area in which user data which is data specified by a user is recorded and, in general, the user data to be recorded according to a user's instruction is recorded to the areas having sequential LSNs in the user data area. In FIG. 28, the areas indicated by the letters "User Data Area" are the user data areas.

Further, the spare area is where the user data is recorded when an alternation process is performed, that is, an alternation area used as an alternative of the user data area.

In FIG. 28, "Spare00" to "Spare05" of the DS0 face and "Spare10" to "Spare15" of the DS1 face represent the spare areas respectively, and these twelve areas at a maximum can be set as the spare areas on the optical disk 13.

On the optical disk 13, when sequential defects are detected in the user data area, the sequential defective areas can be alternated to sequential spare areas by the alternation process.

Here, the sizes of the spare areas are, for example, defined on the basis of a value of Inner Spare Area Size or Outer Spare Area Size recorded in a management area or an extended management area when the optical disk 13 is formatted.

For example, the sizes of the Spare00, Spare03, Spare04, Spare10, Spare13, and Spare14 in the inner zone side are defined by Inner Spare Area Size. Further, the sizes of the Spare01, Spare02, Spare05, Spare11, Spare12, and Spare15 in the outer zone side are defined by Outer Spare Area Size.

Further, the DMA areas and DMA-Mirror areas provided to the optical disk 13 are management areas or extended management areas in which management information for managing the user data area or spare area is recorded. The DMA areas are provided to each layer on the DS0 face and the DMA-Mirror areas are provided to each layer on the DS1 face.

In the example of FIG. 28, the "DMA0" to "DMA7" of the DS0 face respectively represent the DMA areas and the "DMA-Mirror0" to "DMA-Mirror7?" of the DS1 face respectively represent the DMA-Mirror areas.

Specifically, the DMA0 provided to the inner zone of the L1 layer on the DS0 face, the DMA1 provided to the inner zone of the L2 layer on the DS0 face, the DMA-Mirror0 provided to the inner zone of the L1 layer on the DS1 face, and the DMA-Mirror1 provided to the inner zone of the L2 layer on the DS1 face are fixed management areas, which are defined in advance.

On the other hand, the DMA2 and DMA-Mirror2 provided in the inner periphery side of the L0 layer and the DMA3 and DMA-Mirror3 provided in the outer periphery side of the L0 layer are placed on the DS0 face and DS1 face as the extended management areas, which can be set by the user.

Similarly, on the DS0 face and DS1 face, there are DMA4 and DMA-Mirror4 provided in the outer periphery side of the L1 layer, the DMA5 and DMA-Mirror5 provided in the inner periphery side of the L1 layer, the DMA6 and DMA-Mirror6 provided in the inner periphery side of the L2 layer, and the DMA7 and DMA-Mirror7 provided in the outer periphery side of the L2 layer as the extended management area, which can be set by the user.

Each DMA area is an area which is provided on the DS0 face and used to perform an alternation process, and the DMA areas on the DS0 face manages alternation information, which is information related to the alternation process, more specifically, the above described DFLs, of the entire optical disk 13, that is, the DS0 face and DS1 face. Further, each DMA area records simulated zone management information for specifying a simulated zone or a simulated zone group, which is virtually set to the user data areas, DMA areas, spare areas or the like which compose a data zone. The information recorded in the DMA areas is also recorded to the DMA-Mirror areas on the DS1 face so that the information is duplicated.

Further, the DMA0 and DMA1 among the DMA areas are set in a fixed size. On the other hand, the sizes of the DMA areas other than the DMA0 and DMA1 can be defined on the basis of the setting when the optical disk 13 is formatted. In other words, the sizes of the DMA2 to DMA7 are variable.

In this case, the sizes of the DMA areas are defined on the basis of a value of Inner DMA/DMA-Mirror Area Size or Outer DMA/DMA-Mirror Area Size, which are recorded in the management area or extended management area when the optical disk 13 is formatted.

For example, the sizes of the DMA2, DMA5, and DMA6 in the inner zone side are defined by Inner DMA/DMA-Mirror Area Size. Further, the sizes of the DMA3, DMA4, and DMA7 in the outer zone side are defined by Outer DMA/DMA-Mirror Area Size.

Similarly to the DMA area, each DMA-Mirror area is an area which is provide on the DS1 face and is used to perform an alternation process, and the DMA-Mirror area on the DS1 face manages alternation information related to the alternation process of the entire optical disk 13, that is, the DS0 face and DS1 face. Further, in each DMA-Mirror area, simulated zone management information is also recorded. The information recorded in the DMA-Mirror areas is information same as the information recorded in the DMA areas on the DS0 face so that the information is duplicated.

The sizes of the DMA-Mirror0 and DMA-Mirror1 among the DMA-Mirror areas are fixed. Further, the sizes of the DMA-Mirror areas other than the DMA-Mirror0 and DMA-Mirror1 can be defined on the basis of the setting when the optical disk 13 is formatted.

In this case, the sizes of the DMA-Mirror areas are defined on the basis of a value of Inner DMA/DMA-Mirror Area Size or Outer DMA/DMA-Mirror Area Size recorded in the management area when the optical disk 13 is formatted.

For example, the sizes of the DMA-Mirror2, DMA-Mirror5, and DMA-Mirror6 in the inner zone side are defined by Inner DMA/DMA-Mirror Area Size. Further, the sizes of the DMA-Mirror3, DMA-Mirror4, and DMA-Mirror7 in the outer zone side are defined by Outer DMA/DMA-Mirror Area Size.

Further, on the optical disk 13, an unillustrated DMA anchor area is provided. In the DMA anchor area, segmentation information of the DMA area and DMA-Mirror area is recorded when an alternation process occurs in the DMA area and DMA-Mirror area. In other words, every time a segmentation (alternation process) occurs due to a defective or the like in the DMA area or DMA-Mirror area, information related to the segmentation is recorded.

Here, in this example, the configuration illustrated in FIG. 28 has been described as the configuration of the optical disk 13; however, when the present technology is applied to an optical disk, any configuration may be employed as long as sequential PSNs are allocated to sequential recording area in the optical disk. In other words, the layer configuration of the optical disk 13 or the area configuration in each recording layer may be in any configuration.

For example, in the example illustrated in FIG. 28, the DMA areas are provided on the DS0 face and the DMA-Mirror areas are provide on the DS1 face; however, the DMA areas and DMA-Mirror areas may be provided on one of the DS0 face or DS1 face. Further, the DMA-Mirror areas are not provided to the optical disk 13 and only the DMA areas may be provided. In such a case, for example, the DMA areas are provided on both or one of the DS0 face and DS1 face, and same information is recorded in some of the DMA areas to duplicate the information.

<Configuration Example of Recording/Reproducing Device>

Figure 29:
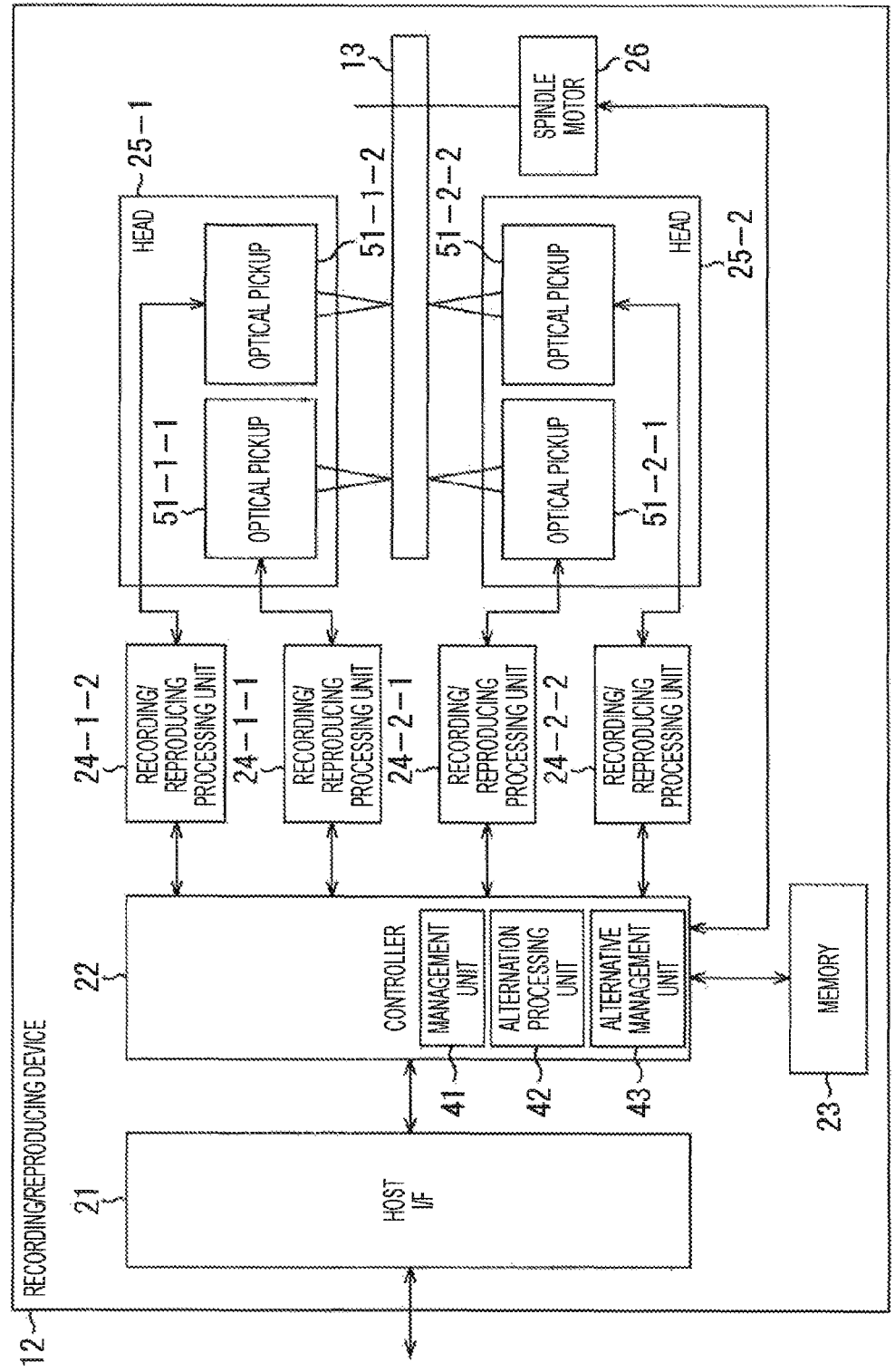
FIG. 29 is a diagram illustrating a configuration example of a recording/reproducing device.

Next, a more detailed configuration example of the recording/reproducing device 12 illustrated in FIG. 27 will be described. The recording/reproducing device 12 is an optical disk drive that writes and reads data to and from the optical disk 13, and the recording/reproducing device 12 has a configuration, for example, as illustrated in FIG. 29.

The recording/reproducing device 12 includes a host interface (I/F) 21, a controller 22, a memory 23, recording/reproducing processing units 24-1-1 to 24-2-2, heads 25-1 and 25-2, and a spindle motor 26.

The host I/F 21 communicates with the host computer 11 to exchange data or commands. For example, the host I/F 21 provides various commands and data provided from the host computer 11 to the controller 22. Further, the host I/F 21 provides various information provided from the controller 22 or various information read from the optical disk 13 to the host computer 11.

The controller 22 controls the entire operation of the recording/reproducing device 12. For example, the controller 22 is a drive controller composed of one control chip.

For example, the controller 22 provides data provided from the host I/F 21 to the recording/reproducing processing units 24-1-1 to 24-2-2 and provides data provided from the recording/reproducing processing units 24-1-1 to 24-2-2 to the host I/F 21.

Further, for example, the controller 22 controls the recording/reproducing processing units 24-1-1 to 24-2-2 and the spindle motor 26 on the basis of a command provided from the host I/F 21 to record data such as user data to the optical disk 13 or read data such as user data from the optical disk 13.

The controller 22 includes a management unit 41, an alternation processing unit 42, and an alternative management unit 43.

The management unit 41 manages each area of the optical disk 13. Further, the alternation processing unit 42 performs an alternation process when there is a defect or the like in the user data area, DMA area, DMA-Mirror area, or the like on the optical disk 13 and data cannot be recorded. The alternative management unit 43 selects or saves an area to be used as an alternative in an alternation process.

The memory 23 gives and receives various data to and from the controller 22 and functions as a work area of the controller 22. For example, the data which is provided from the host computer 11 and recorded to the optical disk 13 is also temporarily recorded in the memory 23.

The recording/reproducing processing units 24-1-1 to 24-2-2 control optical pickups 51-1-1 to 51-2-2 according to the control by the controller 22 and perform signal processing or a servo operation for recording or reproducing data. In other words, the recording/reproducing processing units 24-1-1 to 24-2-2 control the recording to the optical disk 13 and the reproducing of the data recorded in the optical disk 13.

For example, the recording/reproducing processing units 24-1-1 and 24-1-2 provide data provided from the controller 22 to the optical pickups 51-1-1 and 51-1-2 provided to the head 25-1 and record the data to the optical disk 13.

Further, for example, the recording/reproducing processing units 24-1-1 and 24-1-2 provide data, which is read from the optical disk 13 and provided from the optical pickups 51-1-1 and 51-1-2, to the controller 22.

Here, in the following, when it is not particularly needed to distinguish the recording/reproducing processing units 24-1-1 and 24-1-2, they are also simply referred to as the recording/reproducing processing unit 24-1. Further, in the following, when it is not particularly needed to distinguish the optical pickups 51-1-1 and 51-1-2, they are also simply referred to as the optical pickup 51-1.

Further, for example, the recording/reproducing processing units 24-2-1 and 24-2-2 provide data provided from the controller 22 to the optical pickups 51-2-1 and 51-2-2 provided to the head 25-2 to record the data to the optical disk 13.

Further, for example, the recording/reproducing processing units 24-2-1 and 24-2-2 provide data, which is read from the optical disk 13 and provided from the optical pickups 51-2-3 and 51-2-2, to the controller 22.

Here, in the following, when it is not particularly needed to distinguish the recording/reproducing processing units 24-2-1 and 24-2-2, they are also simply referred to as the recording/reproducing processing unit 24-2 and, when it is not particularly needed to distinguish the recording/reproducing processing units 24-1 and 24-2, they are also simply referred to as the recording/reproducing processing unit 24. Further, in the following, when it is not particularly needed to distinguish the optical pickups 51-2-1 and 51-2-2, they are also simply referred to as the optical pickup 51-2 and, when it is not particularly needed to distinguish the optical pickups 51-1 and 51-2, they are also simply referred to as the optical pickup 51. Further, in the following, when it is not particularly needed to distinguish the heads 25-1 and 25-2, they are also simply referred to as the head 25.

To the head 25-1, the optical pickups 51-1-1 and 51-1-2 are provided and the head 25-1 is driven according to the control by the recording/reproducing processing unit 24-1.

According to the control by the recording/reproducing processing unit 24-1, the optical pickup 51-1 emits laser light corresponding to the data supplied from the recording/reproducing processing unit 24-1 onto the optical disk 13 and records the data. Further, according to the control by the recording/reproducing processing unit 24-1, the optical pickup 51-1 emits laser light onto the optical disk 13, receives reflected-light of the laser light, and provides the data obtained by receiving the light to the recording/reproducing processing unit 24-1 as read data.

Similarly, to the head 25-2, the optical pickups 51-2-1 and 51-2-2 are provided and the head 25-2 is driven according to the control by the recording/reproducing processing unit 24-2.

According to the control by the recording/reproducing processing unit 24-2, the optical pickup 51-2 emits laser light corresponding to the data provided from the recording/reproducing processing unit 24-2 onto the optical disk 13 to record data. Further, according to the control by the recording/reproducing processing unit 24-2, the optical pickup 51-2 emits laser light on to the optical disk 13, receives reflected light of the laser light, and provides data obtained by receiving the light to the recording/reproducing processing unit 24-2 as read data.

Here, for example, in the optical disk 13, the face on which data is recorded or reproduced by the optical pickup 51-1 is the above described DS1 face, and the face on which data is recorded or reproduced by the optical pickup 51-2 is the above described DS0 face.

In this manner, in the recording/reproducing device 12, each of the four optical pickups 51 serves as one recording/reproducing channel respectively, and the four channels can perform recording and reproducing data at the same time.

The spindle motor 26 rotates the optical disk 13 attached to a spindle by rotary-driving the spindle according to the control by the controller 22.

<Explanation of Simulated Zone Setting Process>

Next, a specific operation of the recording/reproducing device 12 will be described.

For example, when the optical disk 13 is Injected (inserted) to the recording/reproducing device 12 and it is instructed to format the optical disk 13, the recording/ reproducing device 12 formats the optical disk 13 and, at this timing, also performs a simulated zone setting process to set the simulated zone at the same time. Here, the simulated zone setting process may be performed at any timing, for example before or after the optical disk 13 is shipped.

Figure 30:
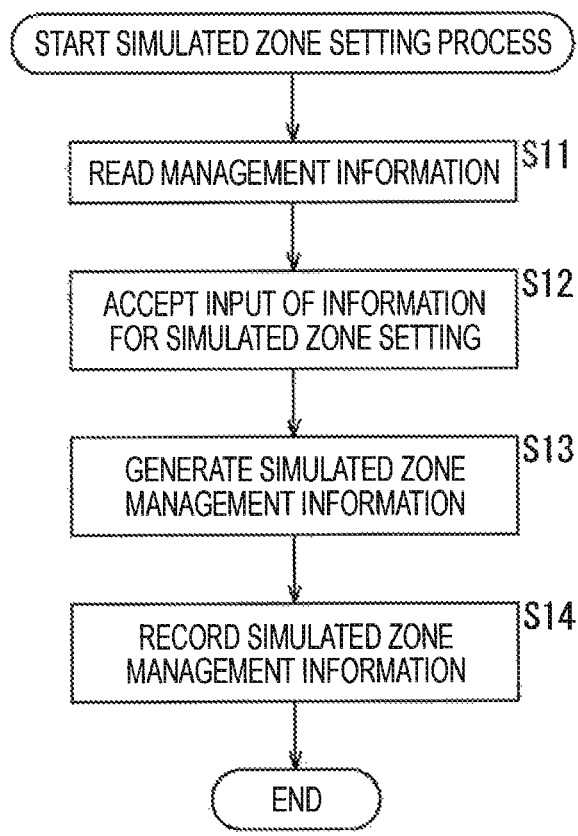
FIG. 30 is a flowchart explaining a simulated zone setting process.

In the following, with reference to the flowchart of FIG. 30, the simulated zone setting process by the recording/reproducing device 12 will be described.

In step S11, the management unit 41 controls the recording/reproducing processing unit 24 to read management information from the optical disk 13.

In other words, the management unit 41 instructs the recording/reproducing processing unit 24 to read management information, and the recording/reproducing processing unit 24 controls the optical pickup 51 according to the instruction from the management unit 41 to read the management information from the DMA area or DMA-Mirror area of the optical disk 13.

According to the control by the recording/reproducing processing unit 24, the optical pickup 51 emits laser light onto the optical disk 13, receives reflected light from the optical disk 13, and provides the management information obtained by a photoelectric conversion to the management unit 41 via the recording/reproducing processing unit 24.

In step S12, the management unit 41 receives an input of information for setting simulated zones.

For example, the administrator operates the host computer 11 and specifies a target area for setting simulated zones in the recording area of the optical disk 13, a size of the simulated zone, the number of simulated zones to compose a simulated zone group, and how to allocate LSNs in the simulated zone group, according to need. Then, the host computer 11 provides a signal corresponding to the operation by the administrator to the management unit 41 of the controller 22 via the host I/F 21.

In step S13, the management unit 41 generates simulated zone management information on the basis of the information provided from the host computer 11 in the process of step S12.

For example, the management unit 41 generates target area information for specifying a target area for setting simulated zones in the recording area of the optical disk 13, simulated zone size information for specifying a size of the simulated zone, simulated zone number information for specifying the number of simulated zones to compose a simulated zone group, and address order information for specifying how to allocate LSNs in the simulated zone group. Then, the management unit 41 sets the information including the target area information, simulated zone size information, simulated zone number information, and address order information as the simulated zone management information.

With the simulated zone management information, the configuration of the simulated zone group and the LSNs of each area in the simulated zone group, which is an access order to the sectors, can be defined and managed.

Here, the number of simulated zones to compose one simulated zone group and how to allocate LSNs in the simulated zone group may be determined in advance. In such a case, the simulated zone management information may be made not to include the simulated zone number information and address order information. Further, as a substitute for the simulated zone size information, information for specifying the size of the simulated zone group may be included in the simulated zone management information.

In the following, the explanation will be given under an assumption that the number of simulated zones to compose one simulated zone group and how to allocate LSNs in the simulated zone group are determined in advance.

More specifically, for example, the management unit 41 sets, as the target area information, what is needed from Inner Spare Area Size, Outer Spare Area Size, Inner DMA/DMA-Mirror Area Size, and Outer DMA/DMA-Mirror Area Size of the management Information.

Here, Inner Spare Area Size and Outer Spare Area Size are information indicating the size of the spare area in the inner zone side and outer zone side respectively. Further, Inner DMA/DMA-Mirror Area Size and Outer DMA/DMA-Mirror Area Size are information that indicates the size of the DMA area or DMA-Mirror area in the inner zone side and outer zone side respectively.

Thus, on the basis of these pieces of information, the size and location of each area such as the DMA area, DMA-Mirror area, spare area, and user data area provided in the data zone can be specified.

For example, in a case that the spare area and user data area are target areas for setting simulated zones, an area from the beginning position of the spare area in the inner zone side to the end position of the spare area in the outer zone side can be specified on the basis of Inner DMA/DMA-Mirror Area Size and Outer DMA/DMA-Mirror Area Size.

Further, for example, in a case that only the user data area is a target area for setting simulated zones, the location and size of the user data area can be specified on the basis of Inner Spare Area Size, Outer Spare Area Size, Inner DMA/DMA-Mirror Area Size, and Outer DMA/DMA-Mirror Area Size.

Here, the size of the extended management area (DMA area and DMA-Mirror area), the size of the spare area, and the size of the user data area are set to be an integral multiple of the simulated zone size respectively.

Further, the management unit 41 generates simulated zone size information on the basis of the size of the simulated zone specified by the administrator for example.

Further, the number of simulated zone to compose the simulated zone group is defined as illustrated in FIG. 22 for example.

When the example illustrated in FIG. 22 is applied to the optical disk 13 illustrated in FIG. 28, the number of simulated zones composing the simulated zone group is set as four. Further, the four simulated zones in total including two simulated zones in an Lk layer (here, k=0, 1, or 2) on the DS0 face and two simulated zones in an Lk layer on the DS1 face are set as one simulated zone group. Further, in the simulated zone group, between the respective simulated zones, for example, LSNs are allocated to sectors that compose each simulated zone so that the respective RUBs are accessed in an order similar to the order of the RUB access numbers illustrated in FIG. 8 and the respective sectors are accessed in the order of the PSNs in each RUB.

The configuration of the simulated zone group or the LSNs of each area can be specified on the basis of the simulated zone management information including the target area information and simulated zone size information, which is generated as described above, and the number of simulated zones in the simulated zone group and LSN allocation in the simulated zone group, which are specified in advance. In other words, the simulated zone groups and simulated zones are set.

In step S14, the management unit 41 provides the simulated zone management information to the recording/reproducing processing unit 24 and controls the recording/reproducing processing unit 24 to record the simulated zone management information to the management area or extended management area of the optical disk 13. The recording/reproducing processing unit 24 controls the optical pickup 51 according to the simulated zone management information provided from the management unit 41 to record the simulated zone management information to the management area or extended management area, which are the DMA area and DMA-Mirror area, of the optical disk 13.

When the simulated zone management information is recorded, the simulated zone setting process ends.

As described above, the recording/reproducing device 12 sets simulated zones and simulated zone groups in the recording area of the optical disk 13 and records simulated zone management information for specifying the simulated zone groups and the simulated zones composing the simulated zone groups to the optical disk 13.

With this, since the plurality of simulated zones is assumed as one set and access orders can be interleaved between the simulated zones in a predetermined unit, the striping efficiency can be improved. As a result, the data transfer speed can be improved. In other words, regardless of the size of the user data to be recorded or reproduced, the data is substantially evenly allocated to all the plurality of channels and data can be accessed in sequential areas in each channel except for border parts between the simulated zones in a case of recording or reproducing.

In addition, since the size of each area composing the data zone is made to be an integral multiple of the simulated zone size, the simulated zones can be managed more easily.

<Explanation of Recording Process>

Figure 31:
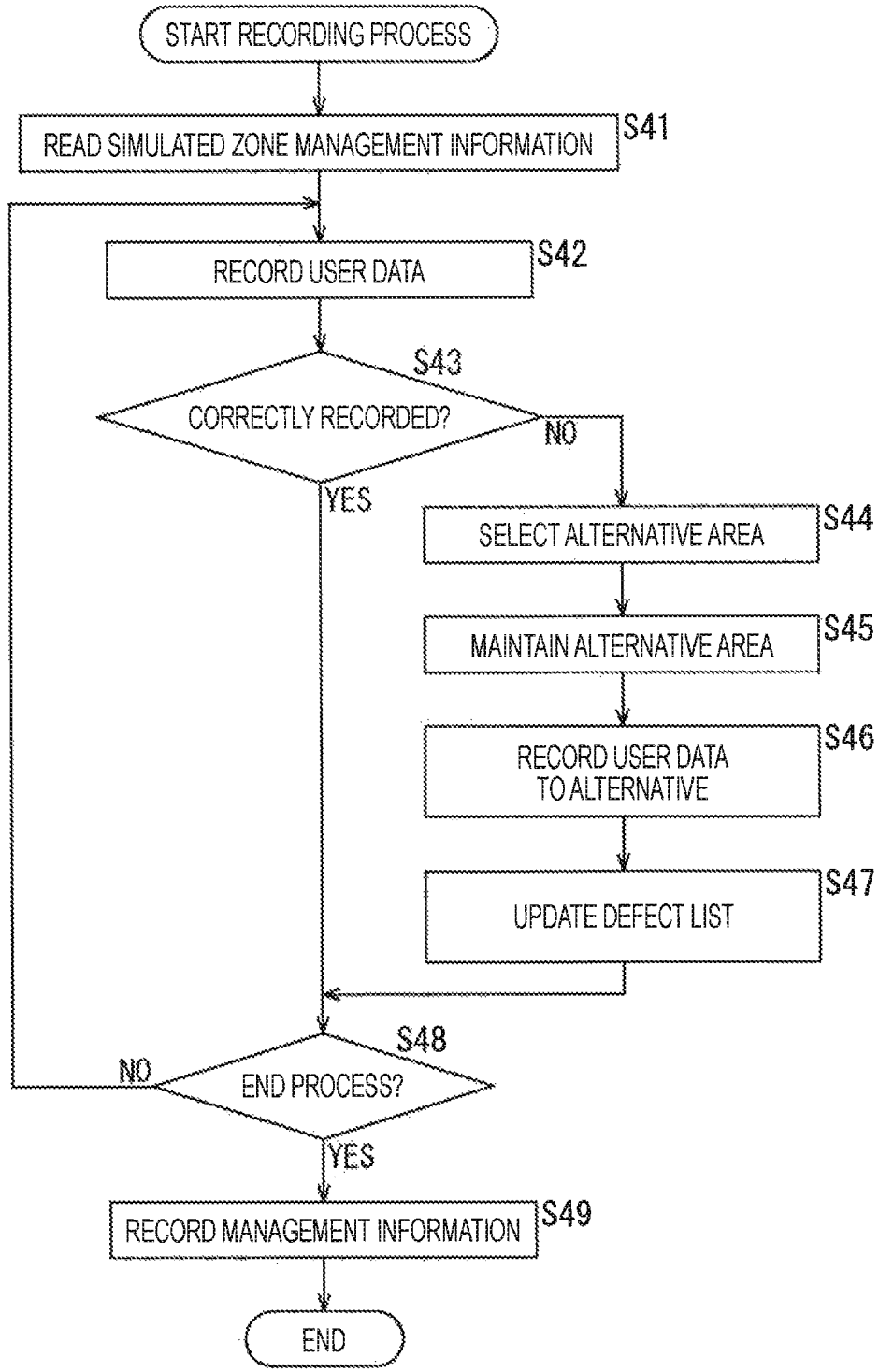
FIG. 31 is a flowchart explaining a recording process.

When the simulated zone management information is recorded to the optical disk 13, user data can be recorded by using the four channels at the same time in the recording/reproducing device 12. In the following, with reference to the flowchart of FIG. 31, the recording process by the recording/reproducing device 12 will be described.

The recording process is performed in each recording/reproducing channel at the same time and the host computer 11 starts to record user data in a condition that the optical disk 13 is inserted in the recording/reproducing device 12. Further, in the following, the channel which is being focused is also referred to as a process target channel, and the recording process explained with reference to FIG. 31 below is a recording process for a process target channel.

In step S41, the management unit 41 controls the recording/reproducing processing unit 24 to read simulated zone management information from the optical disk 13.

In other words, the management unit 41 instructs the recording/reproducing processing unit 24 to read the simulated zone management information, and the recording/reproducing processing unit. 24 controls the optical pickup 51 to read the simulated zone management information from the DMA area or DMA-Mirror area of the optical disk 13 according to the instruction from the management unit 41.

According to the control by the recording/reproducing processing unit 24, the optical pickup 51 emits laser light onto the optical disk 13, reads the simulated zone management information by receiving and photoelectrically converting reflected light from the optical disk 13, and provides the simulated zone management information to the management unit 41 via the recording/reproducing processing unit 24.

On the basis of the read simulated zone management information, the controller 22 can recognize which area in the data zone simulated zones are set, a configuration of the simulated zone group, and the correspondence relationship between PSNs and LSNs. Here, the simulated zone management information may be previously read before the recording process starts. Further, as the process in step S41, one process which is common in the respective recording/reproducing channels is performed.

In step S42, the controller 22 provides the user data provided with a write command from the host computer 11 via the host I/F 21 to the recording/reproducing processing unit 24 as including a PSN of a recording destination and records the user data to the user data area.

In this case, the controller 22 divides the user data on the basis of the LSNs and allocates the data to each channel, according to the order to access to sectors in the simulated zone group. Then, the controller 22 provides data of a divided part of the user data, which is to be allocated to the process target channel and a PSN corresponding to an LSN to which data is to be recorded to the recording/reproducing processing unit 24 corresponding to the process target channel.

On the basis of the user data and the PSN of the recording destination of the user data provided from the controller 22, the recording/reproducing processing unit 24 controls the optical pickup 51 to record the user data to the area specified by the user data area, which is the area specified by the PSN.

Thus, the user data is recorded in the areas having sequential LSNs in the logical address space; however, in the physical address space, the data is recorded as striped according to the configuration of the simulated zone groups and the LSNs of each area in the simulated zones.

In step S43, the controller 22 determines whether or not the user data is recorded correctly.

For example, it is determined that the user data is not recorded correctly when an error such as a servo error occurs during a user data recording operation or, upon verifying the user data, the user data read from the optical disk 13 just after being recorded does not much the user data instructed to record.

In step S43, when is it determined that the user data is recorded correctly, the process proceeds to step S48.

On the other hand, when it is determined in step S43 that the user data is not recorded correctly, the process proceeds to step S44 and an alternation process is performed.

In other words, in step 344, the alternative management unit 43 selects an alternative area for the process target channel in the spare area.

For example, as illustrated in FIG. 22, it is assumed that there are four spare areas including the spare areas AE11 to AE14 as alternative areas. In this case, the alternative management unit 43 selects a spare area having a smallest NWA, among spare areas of the spare areas AE11 to AE14 which are not currently saved for another channel, as an alternative area for the process target channel.

In step S45, the alternative management unit 43 saves the alternative area selected in the process of step S44 as a process target alternative area.

In step S46, the alternation processing unit 42 performs an alternation process and records the user data, which has been failed to record, to the alternative area saved in the process of step S45.

In other words, the alternation processing unit 42 provides the user data, which has been failed to record, and a PSN of the saved alternative area to the recording/reproducing processing unit 24 corresponding to the process target channel, and instructs the recording/reproducing processing unit 24 to record the user data to the alternative. Then, the recording/reproducing processing unit 24 controls the optical pickup 51 on the basis of the user data and the PSN of the alternative provided from the alternation processing unit 42 to record the user data to the specified area in the spare area, that is, the area identified by the specified PSN.

Further, when an alternation process for a single defective area or sequential defective areas in the user data area, where it has been failed to record the user data and the user data is correctly recorded to a single alternative area or sequential alternative areas, the alternative management unit 43 releases the spare area saved for the process target channel.

In step S47, the management unit 41 generates a DFL entry that indicates the alternation subject and alternative in response to the alternation process and updates the defect list (DFL) by adding the generated DFL entry to the DFL, and then, the process proceeds to step S48.

After it is determined in step S43 that the user data is correctly recorded or the DFL is updated in step S47, the controller 22 determines whether to end the recording process in step S48. For example, when the user data instructed by the host computer 11 has been all recorded, it is determined to end the process.

When it is determined not to end the process in step S48, the process returns to step S42 and the above described processes are repeated.

On the other hand, when it is determined to end the process in step S48, in step S49, the management unit 41 generates new management information and records the information to the DMA area or DMA-Mirror area of the optical disk 13.

For example, the management unit 41 updates the management information by adding modification or adding new information to the management information, which is read from the optical disk 13 in advance, in response to a user data recording or a DFL update.

Then, the management unit 41 provides the updated management information to the recording/reproducing processing unit 24, and the recording/reproducing processing unit 24 manages the optical pickup 51 on the basis of the management information provided from the management unit 41 to record the management information to the DMA area or DMA-Mirror area of the optical disk 13. Here, as the process of step S49, the common process is performed in each recording/reproducing channel.

When the management information is recorded, after that, the optical disk 13 is ejected (removed) from the recording/reproducing device 12 and the recording process ends.

As described above, the recording/reproducing device 12 records the user data to each of the respective simulated zones composing the simulated zone group in a particular access order. This can improve the striping efficiency and improve the data transfer speed.

Further, when an alternation process occurs, by saving sequential area in the spare area as alternative areas of the process target channel and recording the user data, sequential defectives can be simply alternated to sequential alternative areas even when alternation process occurs in a plurality of channels at the same time. This prevents the data from being segmentalized by the alternation process, improves the data transfer speed, and reduces the consumption amount of the DFL.

Here, even when an alternation process occurs during recording management information or the like to a management area or an extended management area, the data transfer speed can be improved similarly to the case of user data by performing the processes similar to those of steps S44 to S46 to record the management information to an alternative.

<Explanation of Reproducing Process>

Further, in the recording/reproducing device 12, user data can be reproduced by using four channels at the same time.

Figure 32:
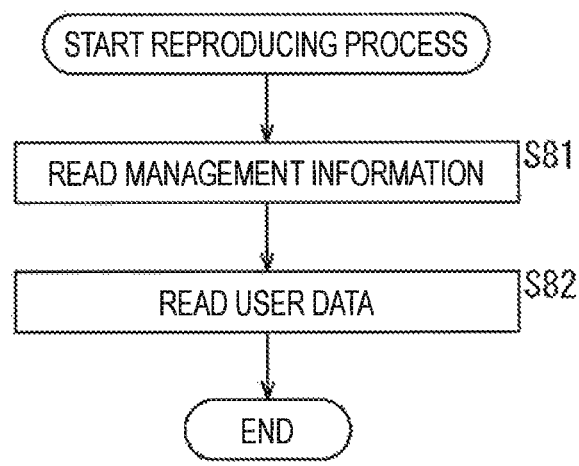
FIG. 32 is a flowchart explaining a reproducing process.

In the following, with reference to the flowchart of FIG. 32, a reproducing process by the recording/reproducing device 12 will be explained.

This reproducing process is started when the host computer 11 instructs to reproduce the user data in a condition that the optical disk 23 is inserted in the recording/reproducing device 12.

In step S81, the management unit 41 controls the recording/reproducing processing unit 24 to read management information from the optical disk 13.

In other words, the management unit 41 instructs the recording/reproducing processing unit 24 to read the management information, and the recording/reproducing processing unit 24 controls the optical pickup 51 to read the management information from the DMA area or DMA-Mirror area of the optical disk 13, according to the instruction by the management unit 41.

According to the control by the recording/reproducing processing unit 24, the optical pickup 51 emits laser light onto the optical disk 13 and provides the management information read by receiving and photoelectrically converting reflected light from the optical disk 13 to the management unit 41 via the recording/reproducing processing unit 24.

By reading the management information in this manner, the correspondence relationship between PSNs and LSNs can be recognized from simulated zone management information included in the management information. Here, the management information may be read in advance before the reproducing process is started.

In step S82, the controller 22 reads instructed user data from the optical disk 13 in response to a read command provided from the host computer 11 via the host I/F 21.

In other words, the controller 22 provides a PSN corresponding to an LSN specified by the read command to each recording/reproducing processing unit 24 and controls the recording/reproducing processing unit 24 to read user data from the user data area, according to the access number to the sectors in the simulated zone group, that is, according to the correspondence relationship between LSNs and PSNs.

In this case, the controller 22 provides PSNs from which data is to be read to the recording/reproducing processing unit 24 corresponding to each channel so that the data allocated to each channel can be read respectively in each channel.

The recording/reproducing processing unit 24 controls the optical pickup 51 on the basis of the PSN provided from the controller 22 to read user data from the area identified by the specified PSN. Then, the recording/reproducing processing unit 24 provides the read user data to the controller 22. With this configuration, data is read from each simulated zone composing the simulated zone group in four channels at the same time.

Further, the controller 22 reconfigures the divided user data provided from the recording/reproducing processing unit 24 corresponding to each channel into one piece of user data and provides the obtained user data to the host computer 11 via the host I/F 21.

When the user data is read in this manner, the reproducing process is ended.

As described above, the recording/reproducing device 12 reads the user data from each of the simulated zones composing the simulated zone group in a particular access order. This improves the data transfer speed.

Here, in the above explanation, it has been described, as an example, a case that one piece of data is divided into a plurality of pieces of data and recorded or reproduced in more than one channel at the same time. However, the data transfer speed can be improved by the above described simulated zone setting process, recording process, and reproducing process even when more than one piece of user data, that is, a plurality of streams are recorded or reproduced in more than one channel at the same time.

Further, in the above described recording process, a case that the recording operation is performed in four channels at the same time has been explained; however, for example, recording and reproducing may be performed at the same time such that, while the optical pickup 51-1-2 is recording data, the optical pickup 51-1-1 reads recorded data. In this case, for example, the number of the channels to perform recording at the same time and the number of channels to perform reproducing at the same time may be set as the same number. For example, while recording in one of the channels of the head 25, the recorded data can be read and verified or the like in the other of the channels.

Further, for example, the number of the channels to record or reproduce may be an integral multiple of the number of simulated zones composing the simulated zone group. For example, when the number of the channels to record or reproduce at the same time is eight channels and the number of simulated zones composing the simulated zone group is four, by using the eight channels, recording and reproducing to eight simulated zones composing the two simulated zone groups can be performed at the same time.

On the other hand, for example, the number of the channels to record or reproduce at the same time may be the number of a divisor (except for one) of the number of simulated zones composing the simulated zone group. As such an example, for example, there may be an example that the number of the channels to record or reproduce at the same time is two channels and the number of simulated zones composing a simulated zone group is four. In such a case, for example, by the two channels, recording or reproducing may be performed to one simulated zone at the same time.

In this case, the two optical pickups 51 corresponding to the two channels respectively access different areas in one simulated zone at the same time. Here, for example, the controller 22 needs to use the memory 23 to properly arrange read data or data to be recorded.

Further, when data is recording and reproduced in one or more channels at the same time, one channel is allocated to two adjacent simulated zones and performs recording and reproducing data to those two simulated zones. In this case, also, the controller 22 needs to use the memory 23 or the like to properly arrange the data.

Further, in addition to the case that recording or reproducing are performed in more than one channel at the same time, the present technology can provide similar effects in a case that recording is performed to a plurality of recording parts in a single channel.

Here, the above described series of processes can be executed by hardware or executed by software. When the series of processes is executed by software, a program composing the software is installed to an unillustrated non-volatile memory of the controller 22 or recording/reproducing processing unit 24 for example.

In such a case, for example, the above described series of processes is executed by that the controller 22 or recording/reproducing processing unit 24 executes the program recorded in the unillustrated memory.

Here, the program executed by the controller 22 or recording/reproducing processing unit 24 may be a program that executes the processes in chronological order according to the order described this specification, or may be a program that executes the processes in parallel or at a necessary timing when a request is sent.

Further, the embodiments of the present technology are not limited to the above described embodiments and various changes may be made within a scope of the technology.

Further, each step explained in the above flowcharts may be executed by one device or may be shared and executed by a plurality of devices.

Further, when one step includes more than one process, the plurality of processes included in the step may be executed by one device or shared and executed by a plurality of devices.

Further, the effects described in this specification may only be examples and there may be other effects.

Further, the present technology may have the following configurations.

(1)

A recording medium, wherein sequential recording areas are divided into a plurality of simulated zones in a predetermined size, and addresses are set to the respective areas of the simulated zones so that a set of the plurality of simulated zones composes a simulated zone group and the addresses are interleaved between the plurality of simulated zones composing the simulated zone group.

(2)

The recording medium according to (1), wherein the addresses are logical addresses, and sequential physical addresses are set to sequential areas in the recording area.

(3)

The recording medium according to (1) or (2), wherein a block, which is a smallest unit of recording or reproducing in the simulated zone, includes a plurality of sectors, which is a smallest unit of a logical access, and the sequential addresses are set to the sequential sectors in the block.

(4)

The recording medium according to any one of (1) to (3), wherein the recording medium records, as management information, at least one of information for specifying an area to be set as a simulated zone, information for specifying a size of the simulated zone, information for specifying a number of simulated zones composing the simulated zone group, and information for specifying the address of each area in the simulated zones composing the simulated zone group.

(5)

The recording medium according to any one of (1) to (4), wherein the recording medium is an optical disk.

(6)

The recording medium according to (5), wherein the optical disk has two faces and, on each face, one or more recording layers including the recording areas are provided.

(7)

The recording medium according to any one of (1) to (6), wherein the recording area includes a user data area for recording user data and a variable area which is different from the user data area and is variable in its size.

(8)

The recording medium according to (7), wherein the variable area is at least one of areas of an extended management area for recording management information to manage the recording area and an alternation area used as an alternative of a defective area.

(9)

The recording medium according to (7) or (8), wherein a size of the variable area is an integral multiple of the size of the simulated zones.

(10)

An information processing device including:

a plurality of access processing units configured to record or reproduce data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and a control unit configured to control the plurality of the access processing units so that accesses to the recording medium according to the control by the plurality of access processing units are performed at the same time.

(11)

The information processing device according to (10), wherein the addresses are logical addresses, and sequential physical addresses are set to sequential areas in the recording area.

(12)

The information processing device according to (10) or (11), wherein a block, which is a smallest unit of recording or reproducing in the simulated zones, includes a plurality of sectors, which is a smallest unit of a logical access, and the sequential addresses are set to the sequential sectors in the block.

(13)

The information processing device according to any one of (10) to (12), wherein the recording medium records, as management information, at least one of information for specifying an area as a target for setting simulated zones, information for specifying a size of the simulated zone, information for specifying a number of simulated zones composing the simulated zone group, and information for specifying the address of each area in the simulated zones composing the simulated zone group.

(14)

The information processing device according to any one of (10) to (13), wherein the recording medium is an optical disk.

(15)

The information processing device according to any one of (10) to (14), wherein a number of the access processing units that perform an access control to the recording medium at the same time is an integral multiple of the number of the simulated zones composing the simulated zone group.

(16)

The information processing device according to any one of (10) to (14), wherein a number of the access processing units that perform an access control to the recording medium at the same time is a divisor of the number of the simulated zones composing the simulated zone group.

(17)

The information processing device according to any one of (10) to (16), wherein the control unit controls the plurality of access processing units so that, while some of the plurality of access processing units record data to the recording medium at the same time, other of the plurality of access processing units reproduce data recorded in the recording medium at the same time.

(18)

The information processing device according to (17), wherein the number of the access processing units that record data at the same time is same as the number of the access processing units that reproduce data at the same time.

(19)

An information processing method including the steps of:

by a plurality of access processing units, recording or reproducing data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and controlling the plurality of the access processing units so that accesses to the recording medium according to the control by the plurality of access processing units are performed at the same time.

(20)

A program that causes a computer to execute a process including the steps of:

by a plurality of access processing units, recording or reproducing data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and controlling the plurality of the access processing units so that accesses to the recording medium according to the control by the plurality of access processing units are performed at the same time.

REFERENCE SIGNS LIST

12 Recording/reproducing device
13 Optical disk
22 Controller
24-1-1 to 24-2-2, 24 Recording/reproducing processing unit
25-1, 25-2, 25 Head
41 Management unit
42 Alternation processing unit
43 Alternative management unit
51-1-1 to 51-2-2, 51 Optical pickup

The invention claimed is:

1. A recording medium, wherein
sequential recording areas are divided into a plurality of simulated zones in a predetermined size, and
addresses are set to the respective areas of the simulated zones so that a set of the plurality of simulated zones composes a simulated zone group and the addresses are interleaved in order to switch an access order between the plurality of simulated zones composing the simulated zone group.

2. The recording medium according to claim 1, wherein the addresses are logical addresses, and sequential physical addresses are set to sequential areas in the recording area.

3. The recording medium according to claim 1, wherein a predetermined size of a recording unit block, which is a smallest unit of recording or reproducing in the simulated zone, includes a plurality of sectors, which is a smallest unit of a logical access, and the sequential addresses are set to the sequential sectors in the block.

4. The recording medium according to claim 1, wherein the recording medium records, as management information, at least one of information for specifying an area to be set as a simulated zone, information for specifying a size of the simulated zone, information for specifying a number of simulated zones composing the simulated zone group, and information for specifying the address of each area in the simulated zones composing the simulated zone group.

5. The recording medium according to claim 1, wherein the recording medium is an optical disk.

6. The recording medium according to claim 5, wherein the optical disk has two faces and, on each face, one or more recording layers including the recording areas are provided.

7. The recording medium according to claim 1, wherein the recording area includes a user data area for recording user data and a variable area which is different from the user data area and is variable in its size.

8. The recording medium according to claim 7, wherein the variable area is at least one of areas of an extended management area for recording management information to manage the recording area and an alternation area used as an alternative of a defective area.

9. The recording medium according to claim 7, wherein a size of the variable area is an integral multiple of the size of the simulated zones.

10. An information processing device comprising:
   a plurality of access processing units configured to record or reproduce data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and
   a control unit configured to control the plurality of the access processing units so that accesses to the recording medium according to the control by the plurality of access processing units are performed at the same time.

11. The information processing device according to claim 10, wherein the addresses are logical addresses, and sequential physical addresses are set to sequential areas in the recording area.

12. The information processing device according to claim 10, wherein a block, which is a smallest unit of recording or reproducing in the simulated zones, includes a plurality of sectors, which is a smallest unit of a logical access, and the sequential addresses are set to the sequential sectors in the block.

13. The information processing device according to claim 10, wherein the recording medium records, as management information, at least one of information for specifying an area as a target for setting simulated zones, information for specifying a size of the simulated zone, information for specifying a number of simulated zones composing the simulated zone group, and information for specifying the address of each area in the simulated zones composing the simulated zone group.

14. The information processing device according to claim 10, wherein the recording medium is an optical disk.

15. The information processing device according to claim 10, wherein a number of the access processing units that perform an access control to the recording medium at the same time is an integral multiple of the number of the simulated zones composing the simulated zone group.

16. The information processing device according to claim 10, wherein a number of the access processing units that perform an access control to the recording medium at the same time is a divisor of the number of the simulated zones composing the simulated zone group.

17. The information processing device according to claim 10, wherein the control unit controls the plurality of access processing units so that, while some of the plurality of access processing units record data to the recording medium at the same time, other of the plurality of access processing units reproduce data recorded in the recording medium at the same time.

18. The information processing device according to claim 17, wherein the number of the access processing units that record data at the same time is same as the number of the access processing units that reproduce data at the same time.

19. An information processing method comprising:
   by a plurality of access processing units, recording or reproducing data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and
   controlling the plurality of the access processing units so that accesses to the recording medium according to the control by the plurality of access processing units are performed at the same time.

20. A non-transitory computer-readable medium having embodied thereon a program, which when executed by a computer causes the computer to execute a method, the method comprising:
   by a plurality of access processing units, recording or reproducing data by performing an access control to a recording medium in which sequential recording areas are divided into a plurality of simulated zones in a predetermined size and addresses are set for the respective areas of the simulated zones so that a set of the plurality of simulated zones composes a simulated zone group and the addresses are interleaved between the plurality of simulated zones composing the simulated zone group; and
   controlling the plurality of the access processing units so that accesses to the recording medium according to the control by the plurality of access processing units are performed at the same time.

* * * * *